March 23, 1954 C. E. LOMAX 2,673,244

COMMUNITY AUTOMATIC EXCHANGE NETWORK

Filed June 29, 1950

13 Sheets-Sheet 1

INVENTOR.
Clarence E. Lomax
BY
Smith, Olsen + Baird
Attys.

INVENTOR.
Clarence E. Lomax
BY
Smith, Olsen & Baird
Attys.

March 23, 1954 C. E. LOMAX 2,673,244

COMMUNITY AUTOMATIC EXCHANGE NETWORK

Filed June 29, 1950

13 Sheets-Sheet 3

INVENTOR.
Clarence E. Lomax
BY
Smith, Olsen + Baird
Attys.

March 23, 1954 C. E. LOMAX 2,673,244

COMMUNITY AUTOMATIC EXCHANGE NETWORK

Filed June 29, 1950 13 Sheets-Sheet 4

INVENTOR.
Clarence E. Lomax
BY
Smith, Olsen & Baird
Attys.

INVENTOR.
Clarence E. Lomax
BY
Smith, Olsen + Baird
Attys.

March 23, 1954 C. E. LOMAX 2,673,244

COMMUNITY AUTOMATIC EXCHANGE NETWORK

Filed June 29, 1950 13 Sheets-Sheet 6

INVENTOR.
Clarence E. Lomax

BY
Smith, Olsen & Baird
Attys.

March 23, 1954 C. E. LOMAX 2,673,244

COMMUNITY AUTOMATIC EXCHANGE NETWORK

Filed June 29, 1950

13 Sheets-Sheet 7

INVENTOR.
Clarence E. Lomax
BY
Smith, Olsen & Baird
Attys.

INVENTOR.
Clarence E. Lomax
BY
Smith, Olsen & Baird
Attys.

March 23, 1954 C. E. LOMAX 2,673,244

COMMUNITY AUTOMATIC EXCHANGE NETWORK

Filed June 29, 1950

13 Sheets-Sheet 9

INVENTOR.
Clarence E. Lomax
BY
Smith, Olsen & Baird
Attys.

March 23, 1954 C. E. LOMAX 2,673,244

COMMUNITY AUTOMATIC EXCHANGE NETWORK

Filed June 29, 1950 13 Sheets-Sheet 10

INVENTOR.
Clarence E. Lomax
BY
Smith, Olsen & Baird
Attys.

March 23, 1954 C. E. LOMAX 2,673,244

COMMUNITY AUTOMATIC EXCHANGE NETWORK

Filed June 29, 1950 13 Sheets-Sheet 11

INVENTOR.
Clarence E. Lomax
BY
Smith, Olsen & Baird
Attys.

INVENTOR.
Clarence E. Lomax.
BY
Smith, Olsen + Baird
Attys.

March 23, 1954

C. E. LOMAX 2,673,244

COMMUNITY AUTOMATIC EXCHANGE NETWORK

Filed June 29, 1950

13 Sheets-Sheet 13

INVENTOR.
Clarence E. Lomax
BY
Smith, Olsen + Baird
Attys.

Patented Mar. 23, 1954

2,673,244

UNITED STATES PATENT OFFICE 2,673,244

COMMUNITY AUTOMATIC EXCHANGE NETWORK

Clarence E. Lomax, Chicago, Ill., assignor to Automatic Electric Laboratories, Inc., Chicago, Ill., a corporation of Delaware Application June 29, 1950, Serial No. 170,965

39 Claims. (Cl. 179—18)

Figure 1:
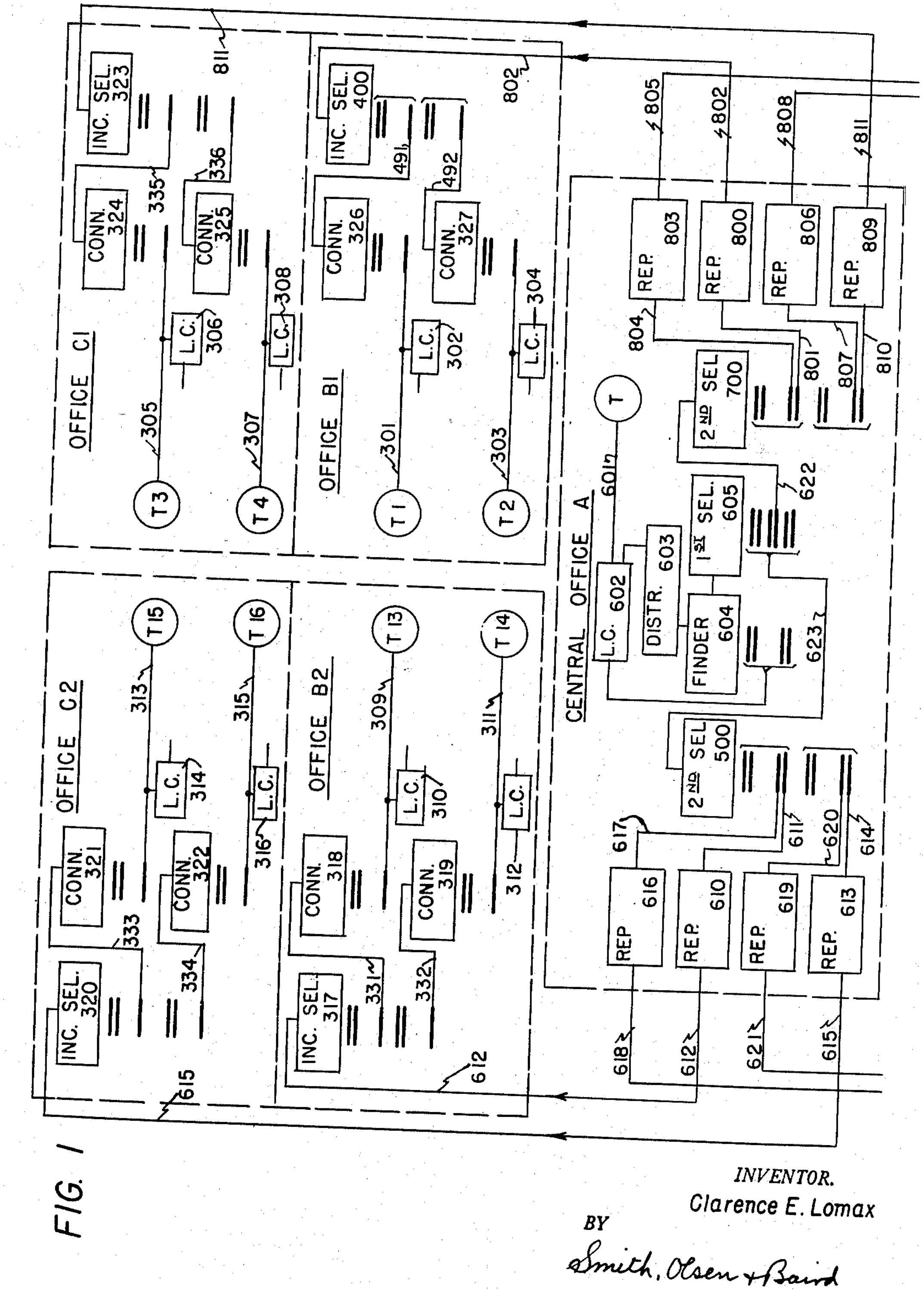

The present invention relates to telephone systems, and more particularly to community automatic exchange (C. A. X) networks.

In a C. A. X network, there is usually provided a central office and a plurality of satellite offices interconnected by trunk lines, the satellite offices frequently serving different numbers of subscriber lines. Both the different locations and the different sizes of the satellite offices tend to complicate the trunking plan, whereby large C. A. X networks normally have a complicated directory numbering system and frequently employ an inordinate number of switching stages in the automatic switch train.

It is a general object of the present invention to provide in a C. A. X network of the character described, improved switching apparatus that is so connected and arranged that both the variation in the directory numbers of the different subscriber substations in the different satellite offices and the number of switching stages in the automatic switch train are minimized.

Another object of the invention is to provide in an automatic telephone system, an arrangement wherein a first automatic switch in a first switching stage responds to one or more routing digits not only to effect the selection of a second automatic switch in a second switching stage but to determine, incident to the selection, the operation of the second automatic switch when the second automatic switch subsequently responds to one or more additional routing digits.

Another object of the invention is to provide in an automatic telephone system, an arrangement of the character noted, wherein the first automatic switch determines that the second automatic switch will subsequently extend the connection over a particular one of its pair of wiper sets.

Another object of the invention is to provide in an automatic telephone system, an arrangement of the character noted, wherein the first automatic switch determines that the second automatic switch will subsequently ring over one or the other of the line conductors of a two-party subscriber line subsequently selected by the second automatic switch for the purpose of selectively signalling the two-party subscriber substations connected to the two-party subscriber line.

Another object of the invention is to provide in an automatic telephone system, an arrangement of the character noted, wherein the first automatic switch determines that the second automatic switch will subsequently perform or prevent an automatic trunk-hunting operation therein, in order that the second automatic switch may be selectively controlled to render either regular service or night service to a group of P. B. X trunks accessible thereto and extending to an associated B. P. X.

A further object of the invention is to provide in an automatic telephone system, an arrangement of the character noted that includes a repeater disposed between the first automatic switch and the second automatic switch for the purpose or repeating the determining signal established in the first automatic switch to the second automatic switch.

A further object of the invention is to provide an improved automatic switch that is selectively controllable both to perform a wiper switching operation therein and to establish a switching control for a succeeding automatic switch.

A still further object of the invention is to provide an improved automatic switch that is selectively controlled jointly by a switching control established in a preceding automatic switch and by one or more routing digits transmitted thereto.

Further features of the invention pertain to the particular arrangement of the elements of the telephone system, whereby the above-outlined and additional operating features thereof are attained.

*Section 1.—The general arrangement of the telephone system*

Figure 2:
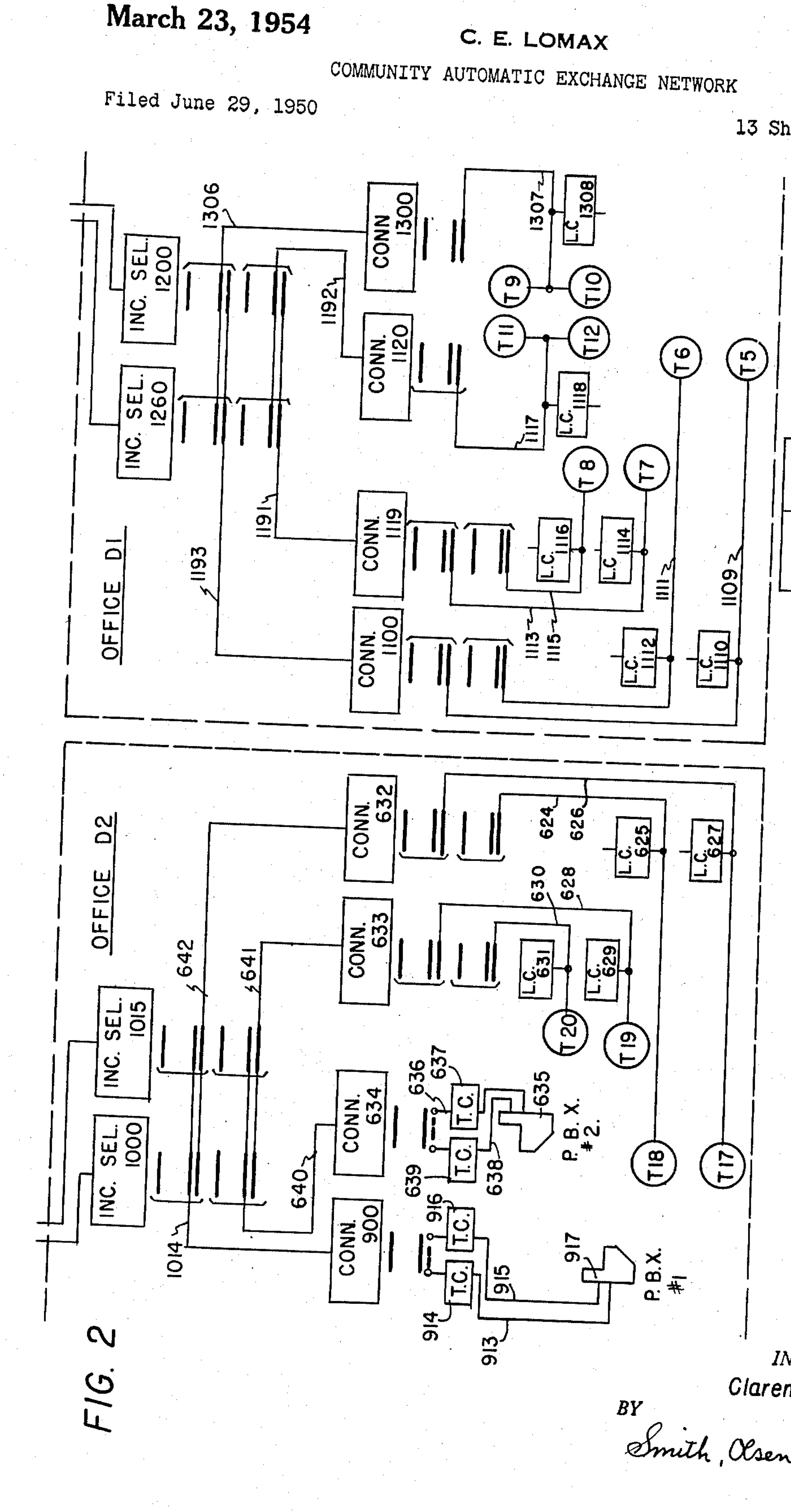
Figure 14:
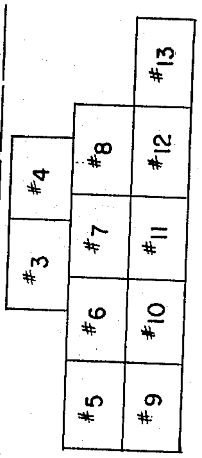
Figure 3:
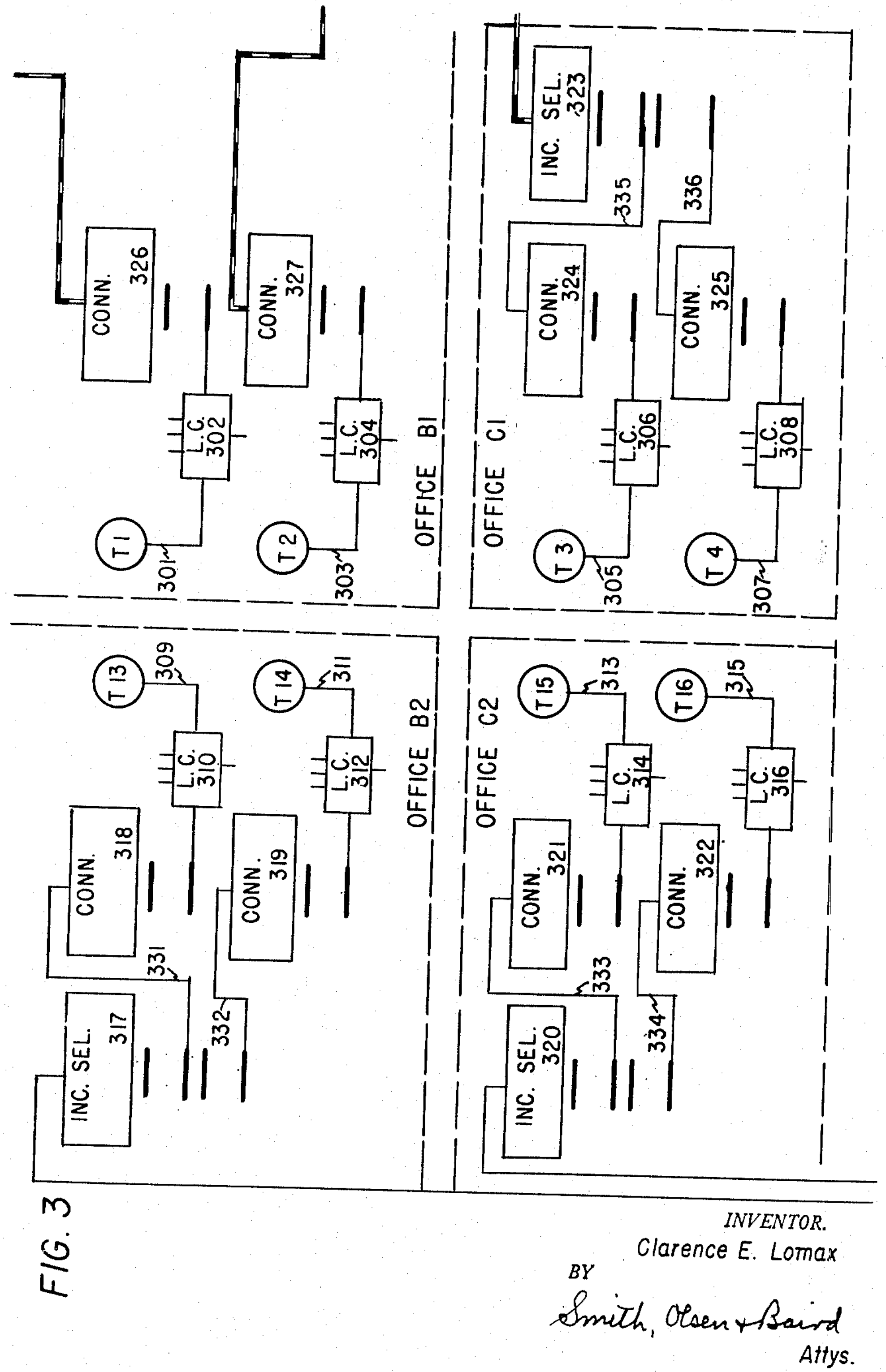

The invention, both as to its organization and method of operation, together with further objects and advantages thereof, will best be understood by reference to the following specification taken in connection with the accompanying drawings in which Figures 1 and 2, taken together, are a schematic diagram of the area served by a telephone system embodying the present invention and illustrating the general arrangement of the apparatus incorporated in several of the offices therof; Figs. 3 to 13, inclusive, taken together, illustrate the details of certain of the apparatus incorporated in the telephone system, which apparatus has embodied therein the features of the invention as briefly outlined above; and Fig. 14 illustrates diagrammatically the manner in which Figs. 3 to 13, inclusive, should be arranged in order to form a unified diagram.

Figure 4:
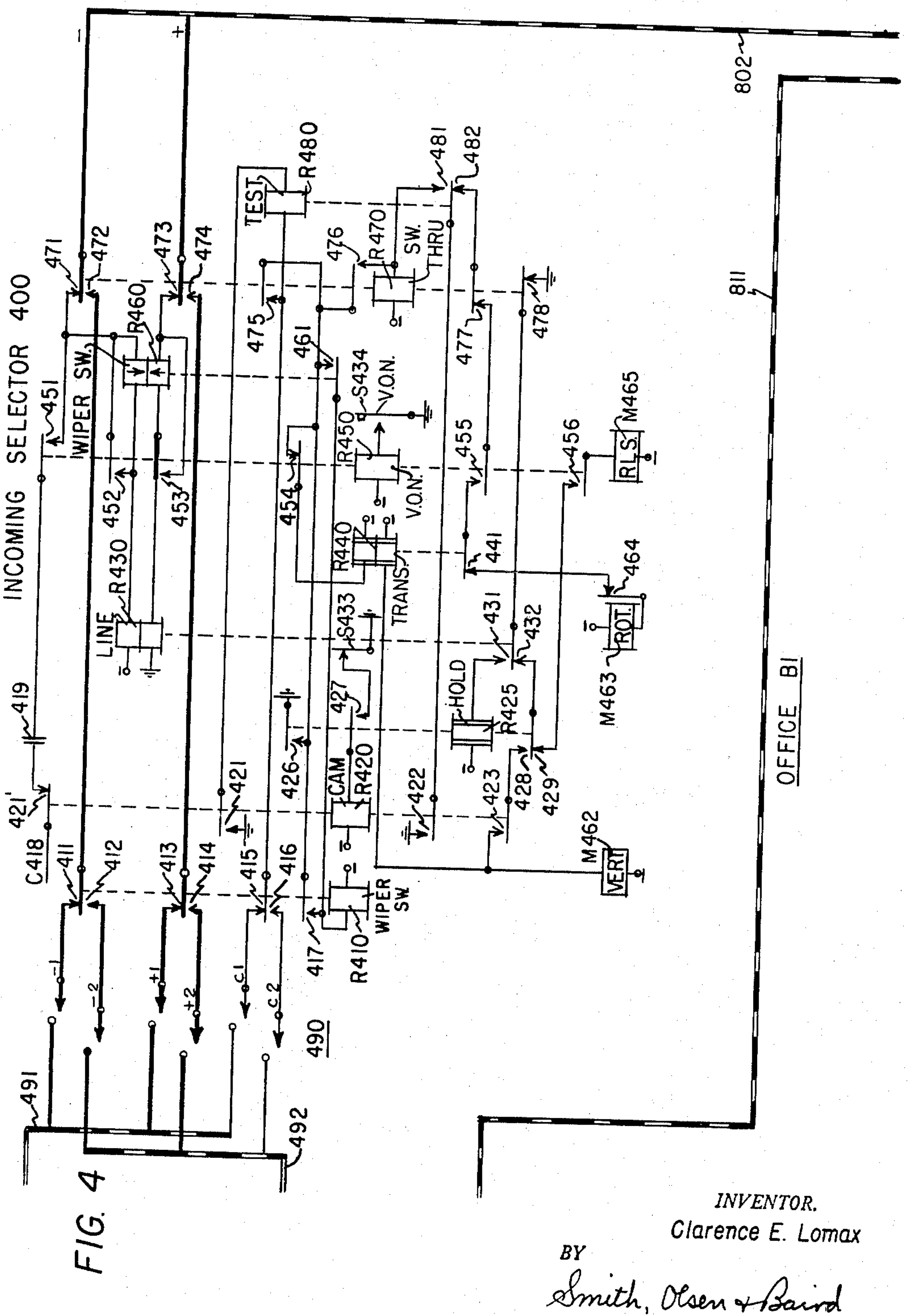
Figure 5:
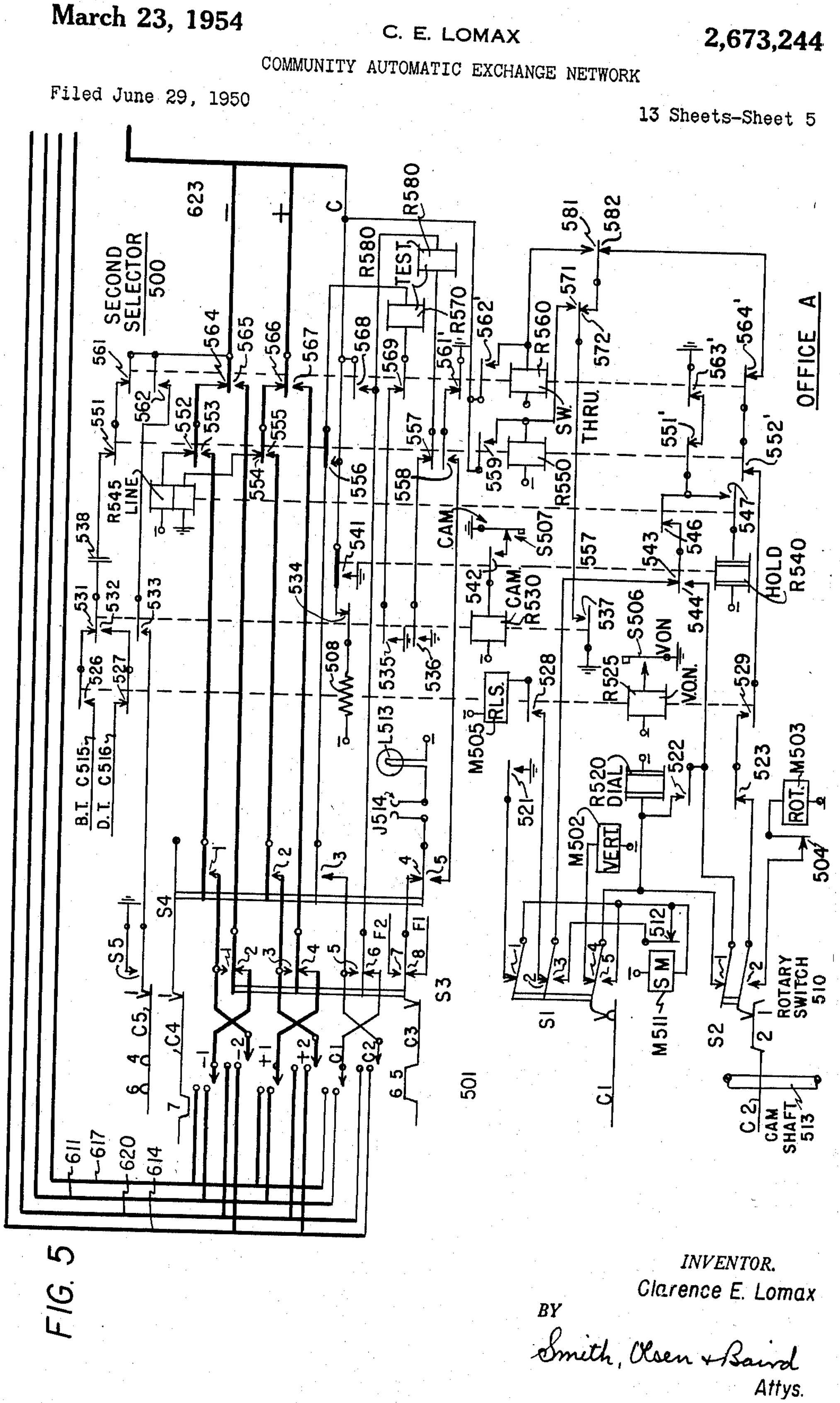
Figure 6:
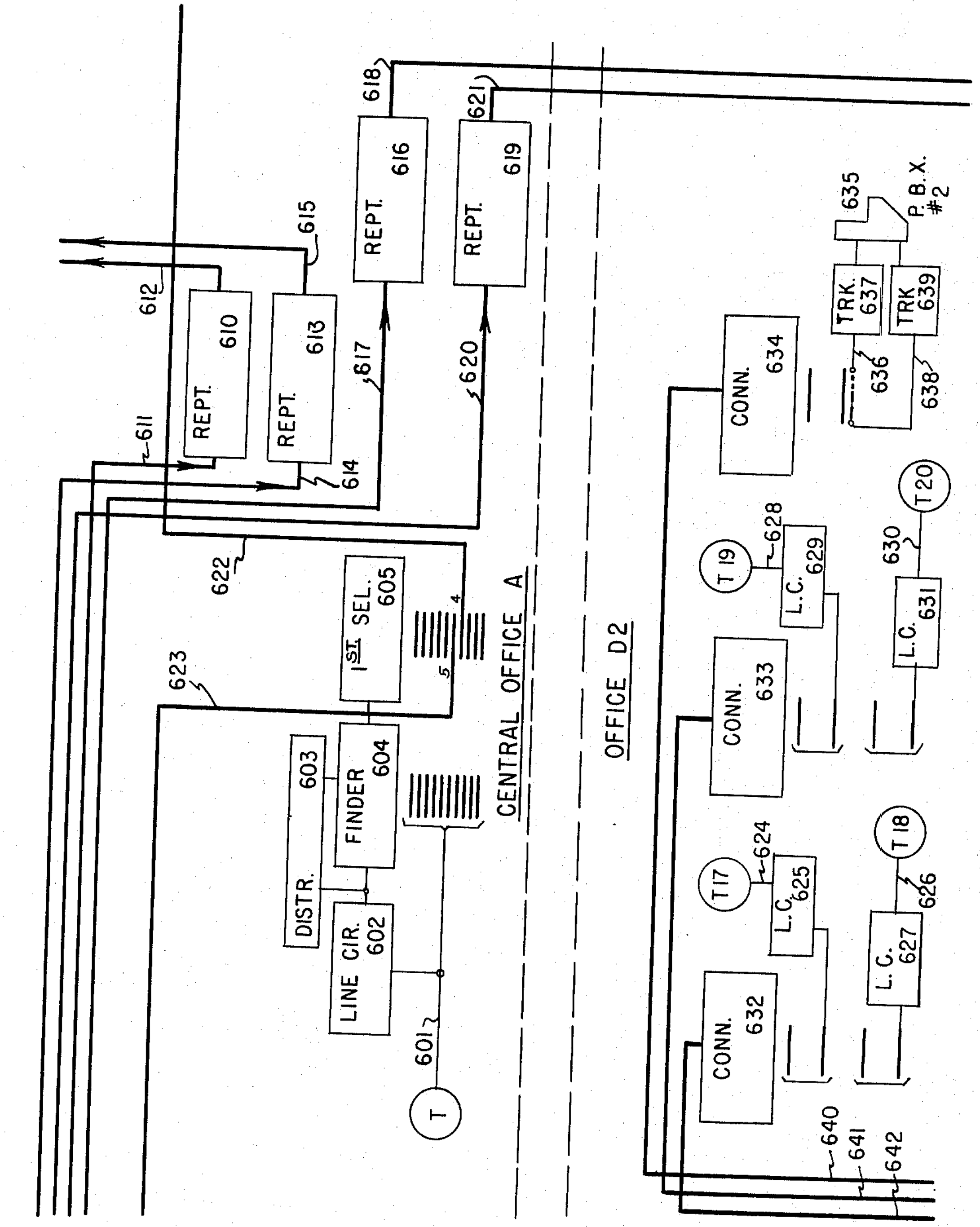
Figure 7:
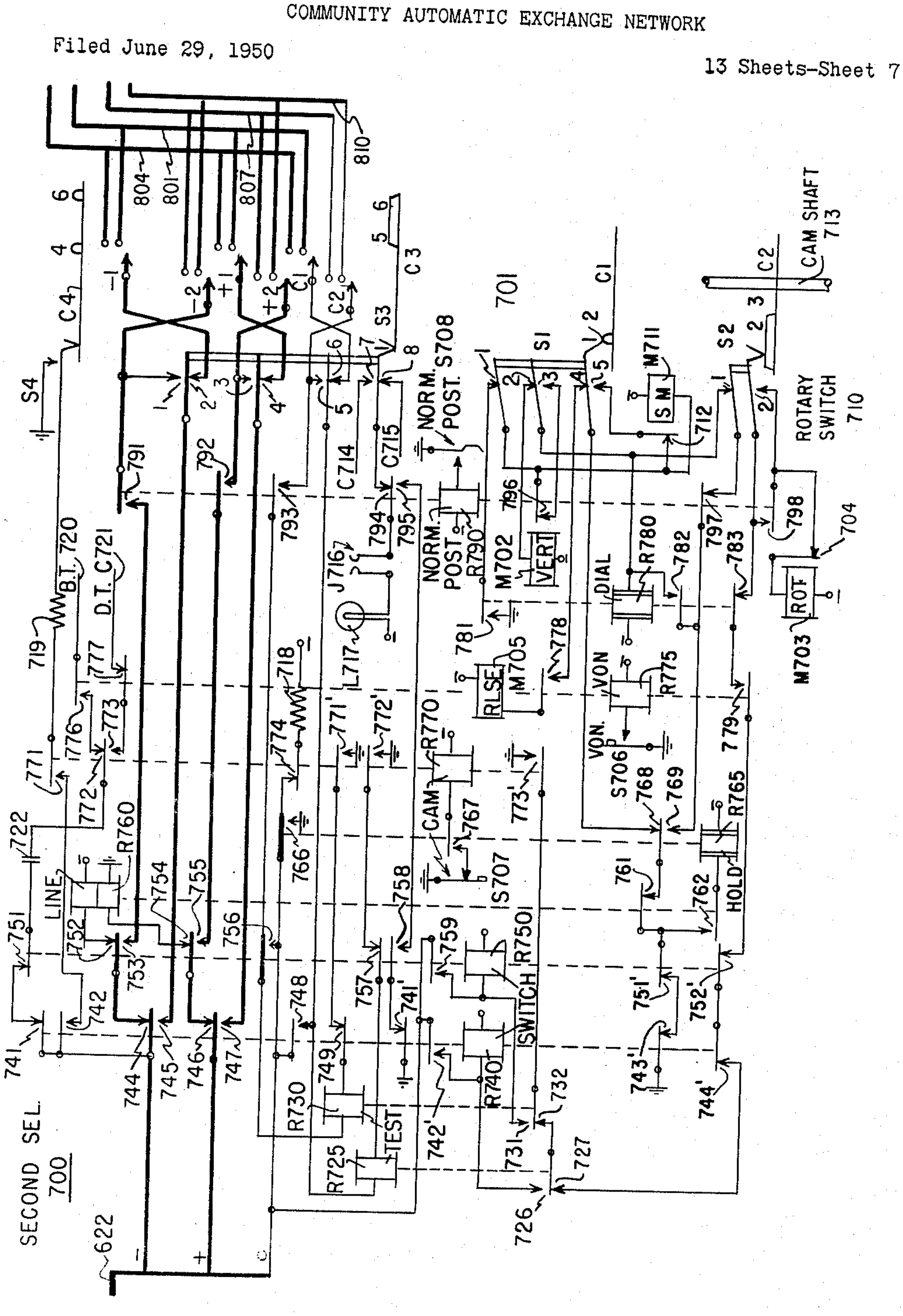
Figure 8:
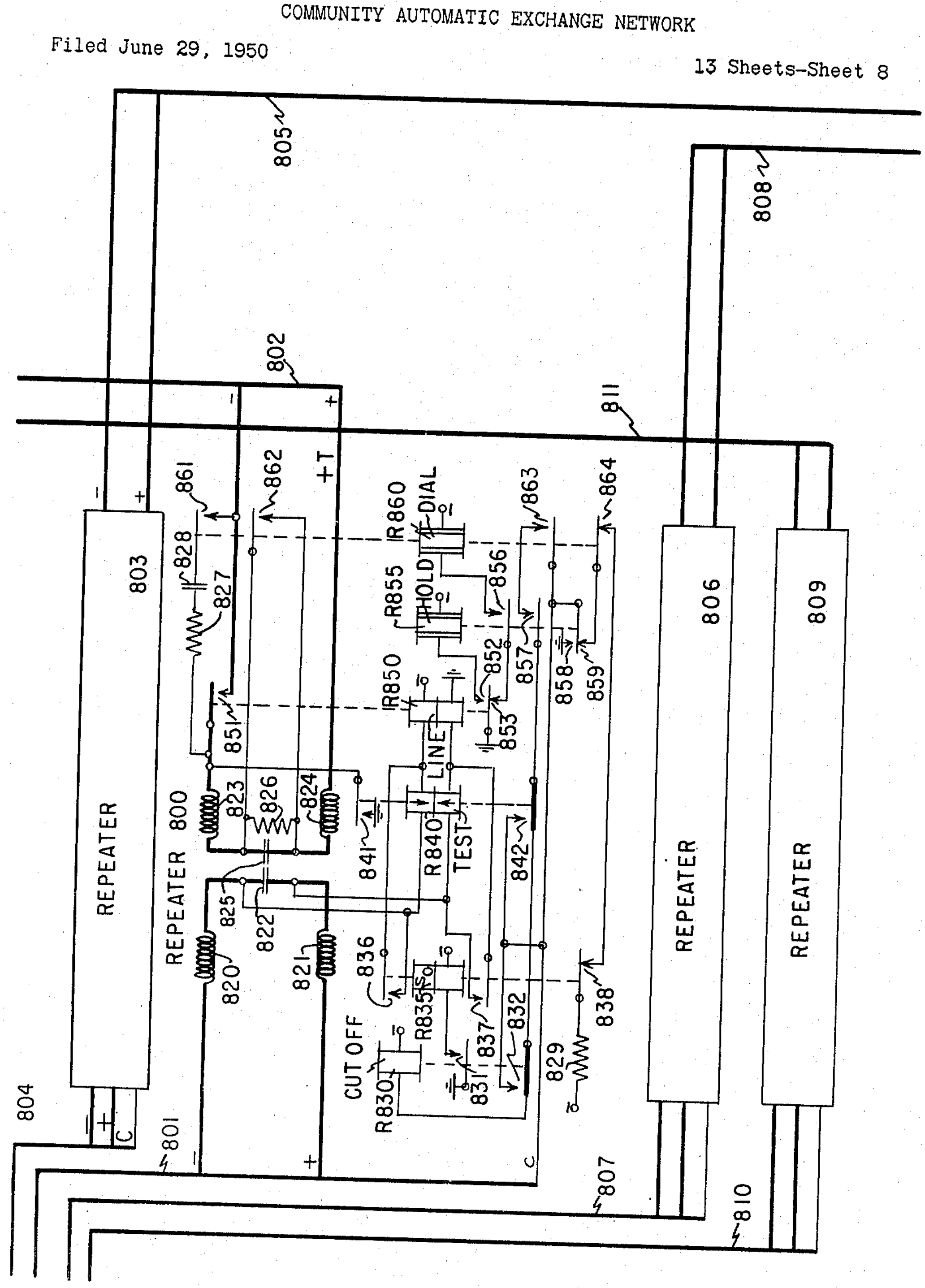
Figure 9:
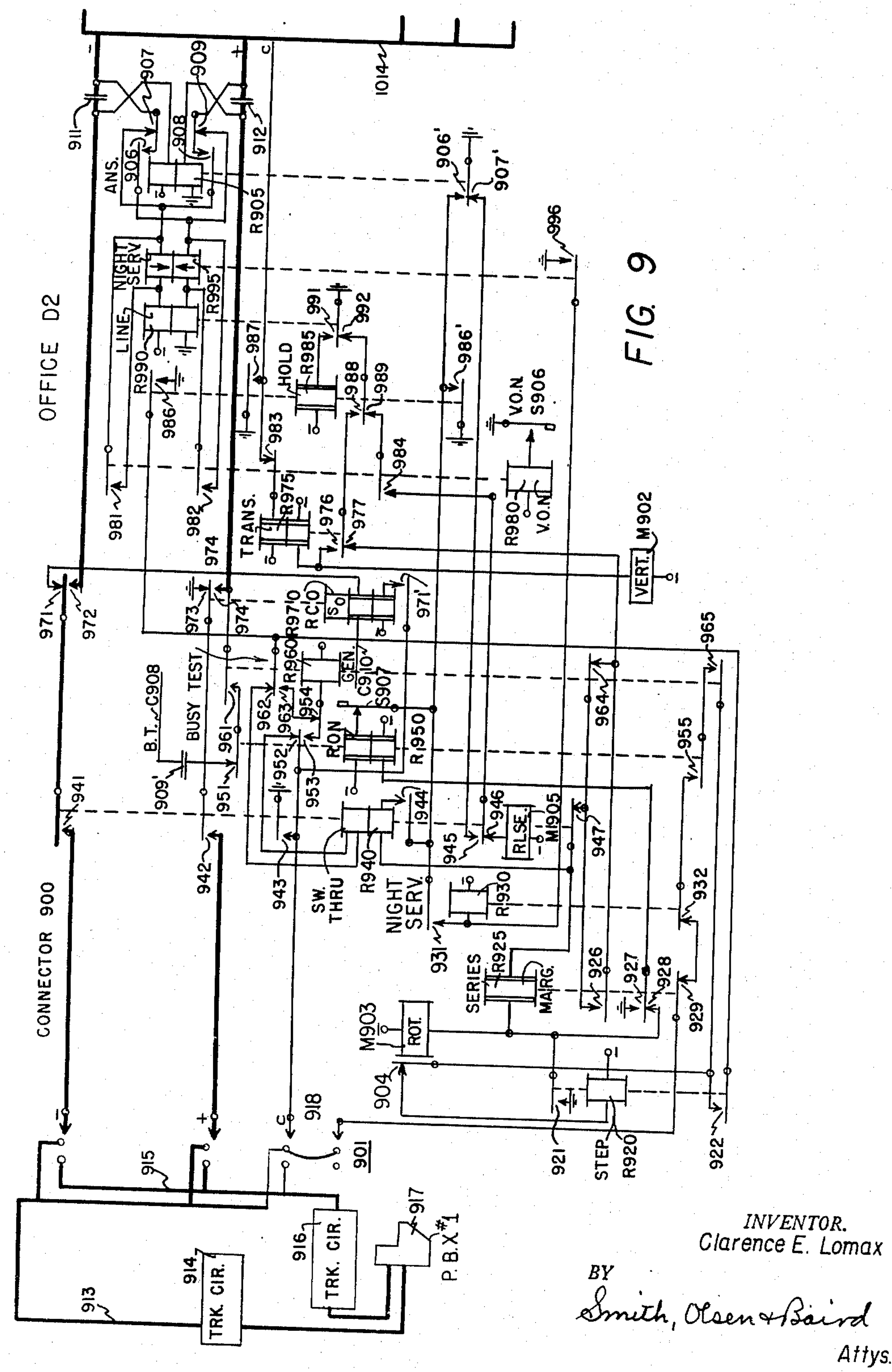
Figure 10:
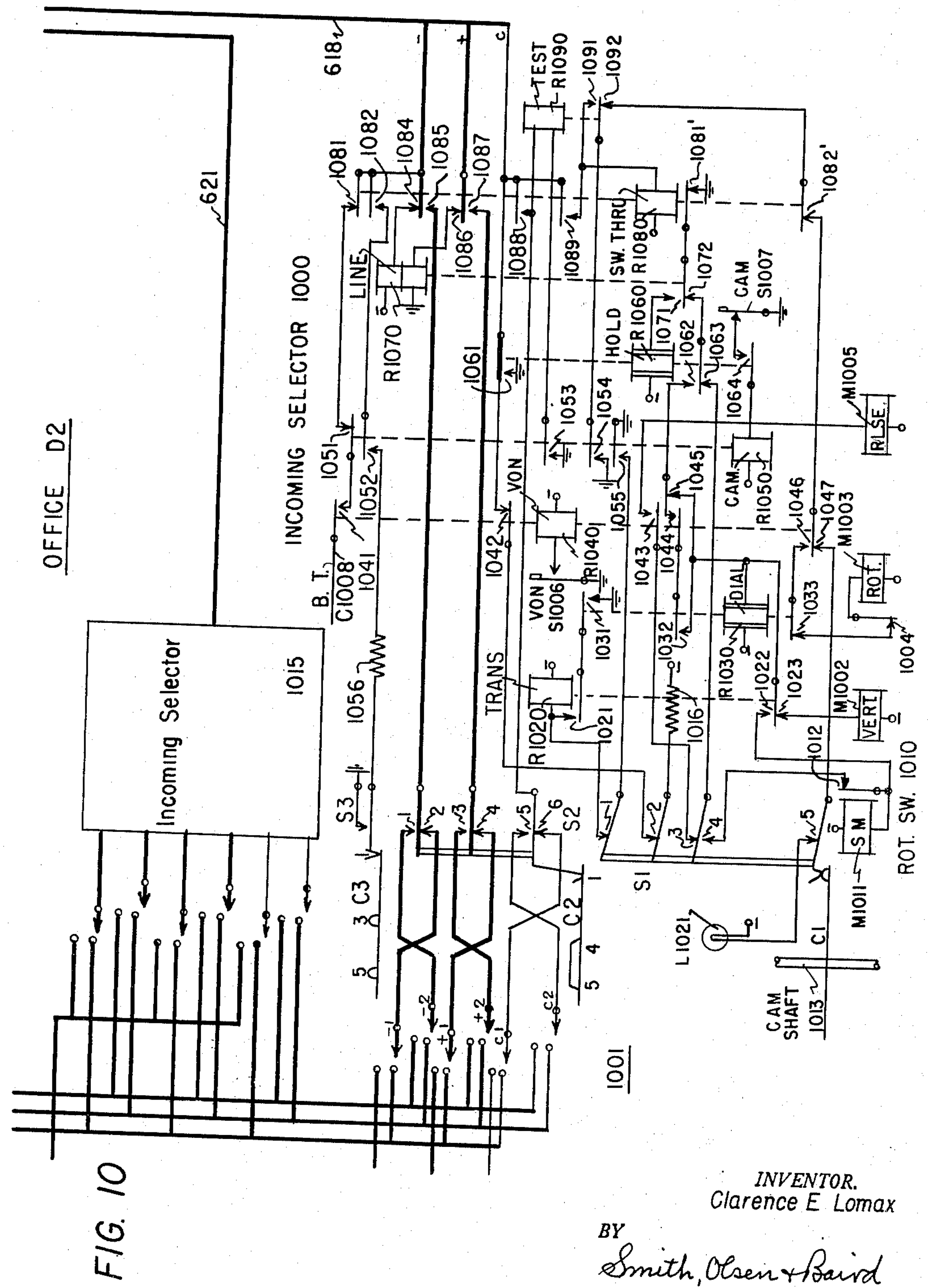
Figure 11:
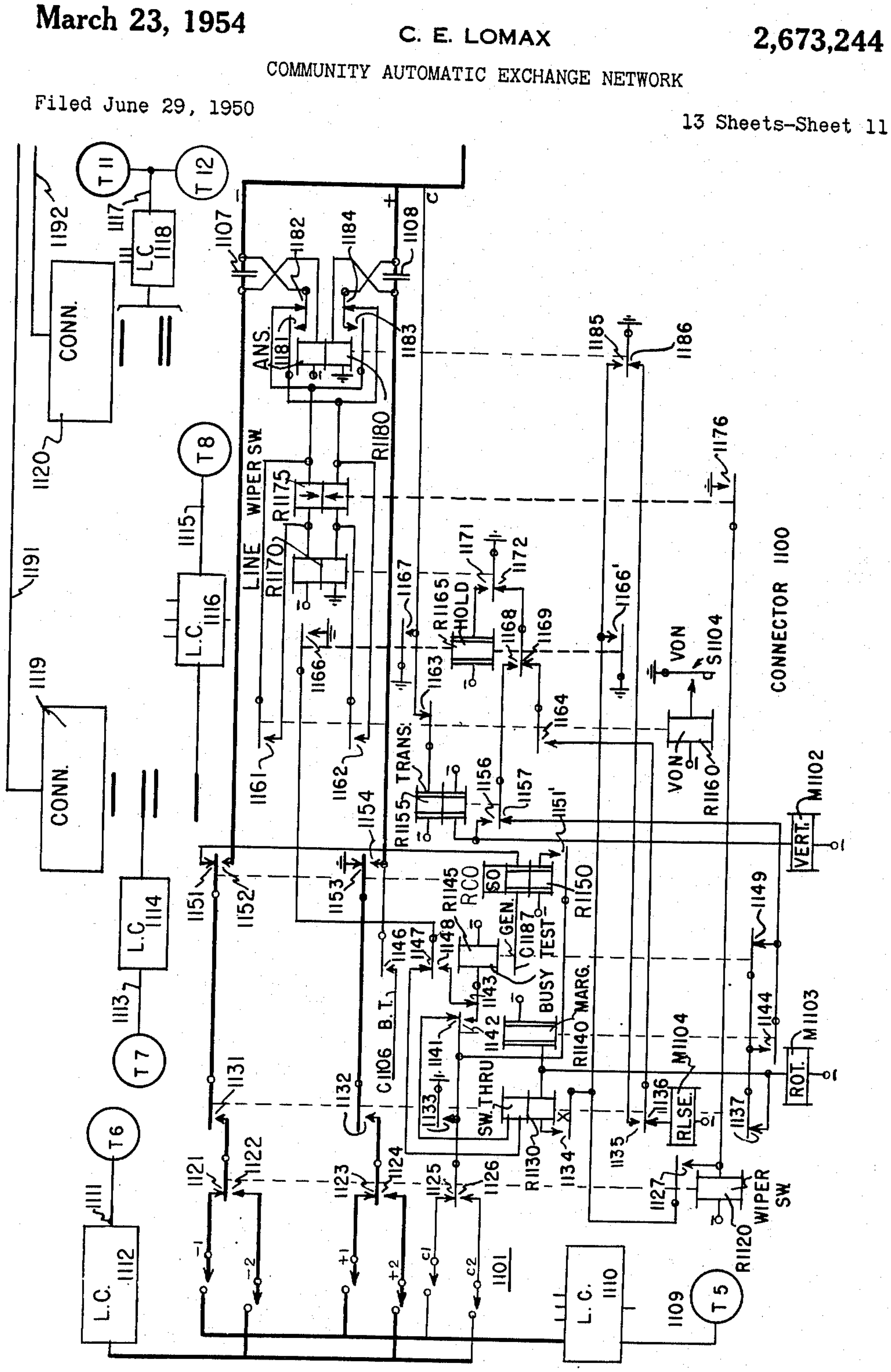
Figure 12:
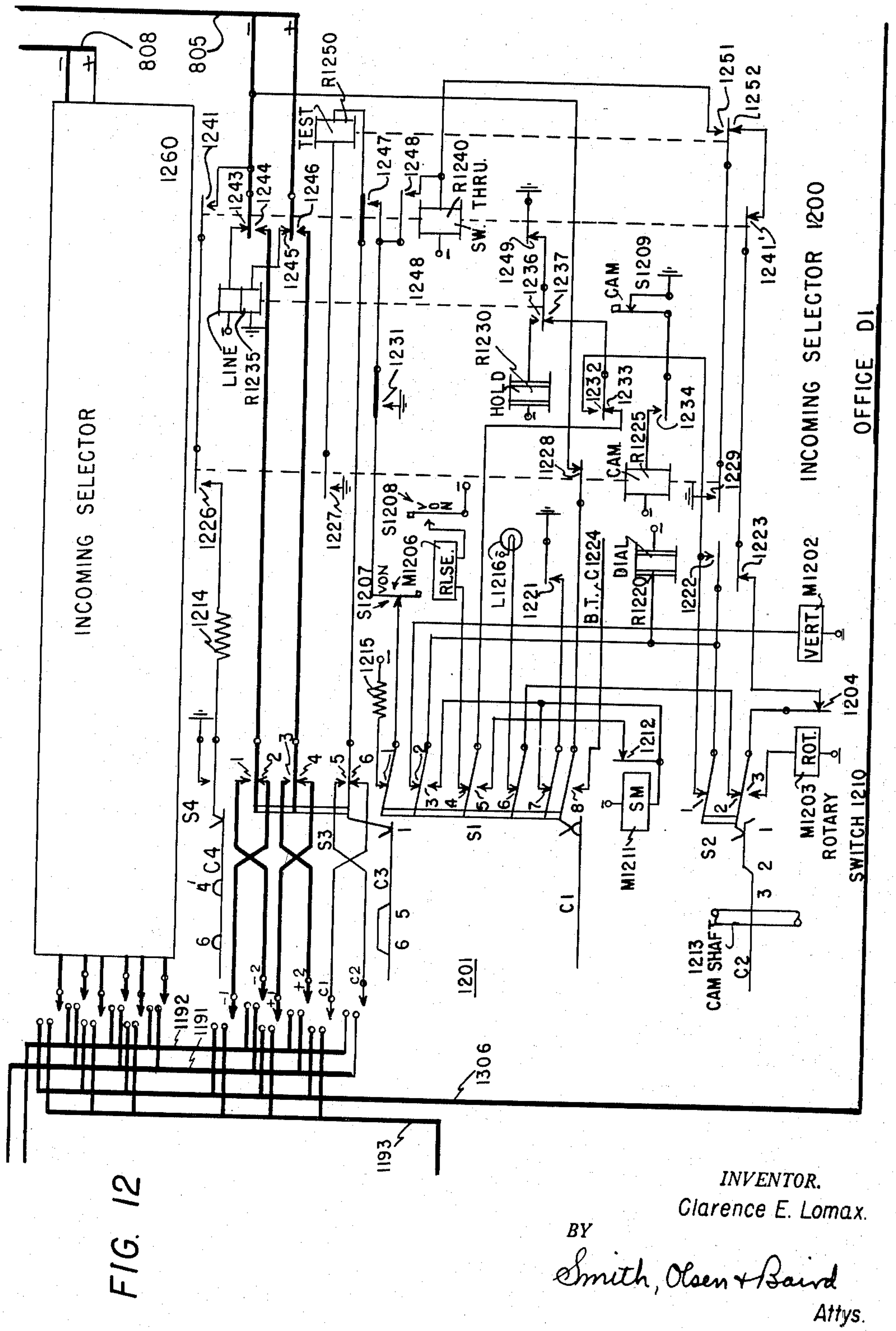
Figure 13:
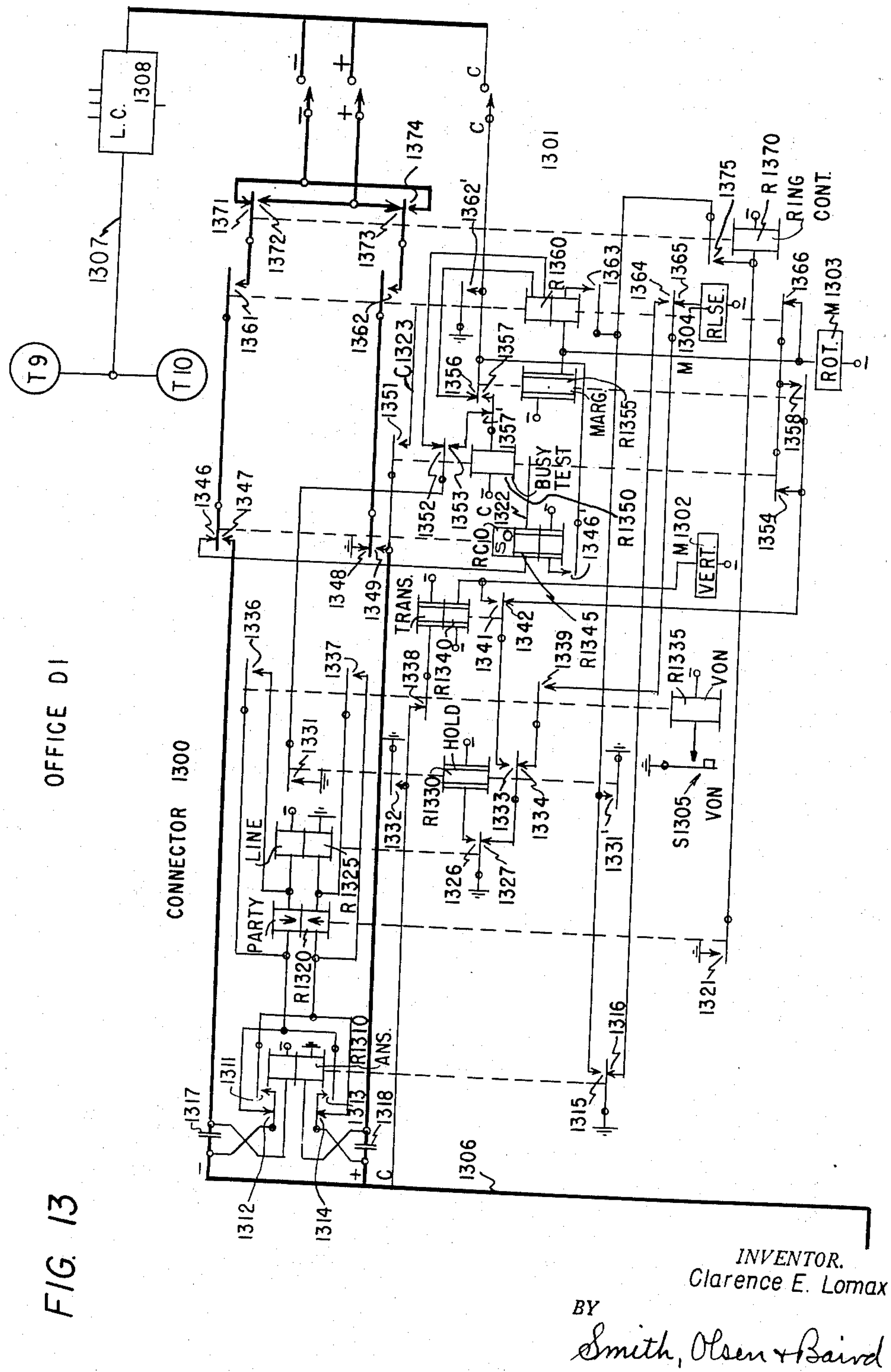

More particularly, Fig. 4 illustrates the details of one of the incoming selectors arranged in the satellite office B1; Fig. 5 illustrates the details of one of a group of second selectors arranged in the central office A; Fig. 7 illustrates the details of one of another group of second selectors arranged in the central office A; Fig. 8 illustrates the details of one of the repeaters arranged in the central office A; Fig. 9 illustrates the details of one of a group of connectors arranged in the satellite office D2; Fig. 10 illustrates the details of one of the incoming selectors arranged in the satellite office D2; Fig. 11 illustrates the details of one of a group of connectors arranged in the satellite office D1; Fig. 12 illustrates the details of one of the incoming selectors arranged in the satellite office D1; and Fig. 13 illustrates the details of one of another group of connectors arranged in the satellite office D1.

Referring now more particularly to Figs. 1 and 2, the telephone system there illustrated serves an area comprising a central office A and a plurality of satellite offices B1, B2, C1, C2, D1 and D2. The central office A is of the automatic type and serves any suitable number of subscriber substations; the satellite offices B1, B2, C1 and C2 are of the automatic type and have an ultimate capacity of 1000 subscriber lines; and the satellite offices D1 and D2 are of the automatic type and have an ultimate capacity of 2000 subscriber lines. Specifically, the central office A serves a group of subscriber lines, including the subscriber line 601 extending to the subscriber substation T. The satellite office B1 serves a first group of subscriber lines, including the subscriber line 301 extending to the subscriber substation T1, and a second group of subscriber lines, including the subscriber line 303 extending to the subscriber substation T2. The satellite office C1 serving a first group of subscriber lines, including the subscriber line 305 extending to the subscriber substation T3, and a second group of subscriber lines, including the subscriber line 307 extending to the subscriber substation T4. The satellite office D1 serves a first group of subscriber lines, including the subscriber line 1109 extending to the subscriber substation T5; a second group of subscriber lines, including the subscriber line 1111 extending to the subscriber substation T6, a third group of subscriber lines, including the subscriber line 1113 extending to the subscriber substation T7, a fourth group of subscriber lines including the subscriber line 1115 extending to the subscriber substation T8, a fifth group of two-party subscriber lines, including the two-party subscriber line 1307 extending to the party subscriber substations T9 and T10, and a sixth group of two-party subscriber lines, including the two-party subscriber line 1117 extending to the party subscriber substations T11 and T12. The satellite office B2 serves a first group of subscriber lines, including the subscriber line 309 extending to the subscriber substation T13, and a second group of subscriber lines, including the subscriber line 311 extending to the subscriber substation T14. The satellite office C2 serving a first group of subscriber lines, including the subscriber line 313 extending to the subscriber substation T15, and a second group of subscriber lines, including the subscriber line 315 extending to the subscriber substation T16. The satellite office D2 serves a first group of subscriber lines, including the subscriber line 626 extending to the subscriber substation T17, a second group of subscriber lines, including the subscriber line 624 extending to the subscriber substation T18, a third group of subscriber lines, including the subscriber line 628 extending to the subscriber substation T19, a fourth group of subscriber lines, including the subscriber line 630 extending to the subscriber substation T20, a first group of P. B. X trunks, including the P. B. X trunks 913 and 915 extending to the P. B. X 1, and a second group of P. B. X trunks, including the P. B. X trunks 636 and 638 extending to the P. B. X 2.

The central office A and the satellite office B1 are interconnected by a group of ten trunk lines, including the trunk line 802; and the central office A and the satellite office C1 are interconnected by a group of ten trunk lines, including the trunk line 811. The central office A and the satellite office B2 are interconnected by a group of ten trunk lines, including the trunk line 612; and the central office A and the satellite office C2 are interconnected by a group of ten trunk lines, including the trunk line 615. The central office A and the satellite office D1 are interconnected by a group of twenty trunk lines, including the trunk lines 805 and 808; and the central office A and the satellite office D2 are interconnected by a group of twenty trunk lines, including the trunk lines 618 and 621.

The switching apparatus arranged in the central office A comprises a plurality of groups of finder-first selector links serving the various groups of subscriber lines, including the link consisting of the finder 604 and the first selector 605 serving the group of subscriber lines, including the subscriber line 601. This group of finder-first selector links is provided with an associated distributor 603 that is connected to the line circuits 602, etc., respectively associated with the subscriber lines 601, etc., in the associated group. The switching apparatus arranged in each of the satellite offices B1, B2, C1, C2, D1 and D2 comprises groups of finder-selector links, not shown, serving the various groups of subscriber lines, party subscriber lines and P. B. X trunks, in a conventional manner.

Also the switching apparatus disposed in the central office A comprises a group of second selectors, including the second selector 700, and a group of second selectors, including the second selector 500. The group of second selectors 700, etc., and the group of second selectors 500, etc., are accessible to the group of first selectors 605, etc. Specifically, the first selector 605 has access to the second selector 700, via the associated trunk 622; and the first selector 605 has access to the second selector 500 via the associated trunk 623.

The group of trunk lines extending between the central office A and the satellite office B1 terminates in repeaters in the central office A and in incoming selectors in the satellite office B1, the trunk line 802 terminating in the repeater 800 and in the incoming selector 400. The group of trunk lines extending between the central office A and the satellite office C1 terminates in repeaters in the central office A and in incoming selectors in the satellite office C1, the trunk line 811 terminating in the repeater 809 and in the incoming selector 323. The group of trunk lines extending between the central office A and the satellite office D1 terminates in repeaters in the central office A and in incoming selectors in the satellite office D1, the trunk lines 805 and 808 respectively terminating in the repeaters 803 and 806 and in the incoming selectors 1200 and 1260. The group of trunk lines extending between the central office A and the satellite office B1 terminates in repeaters in the central office A and in incoming selectors in the satellite office B2, the trunk line 612 terminating in the repeater 610 and in the incoming selector 317. The group of trunk lines extending between the central office A and the satellite office C2 terminates in repeaters in the central office A and in incoming selectors in the satellite office C2, the trunk line 615 terminating in the repeater 613 and in the incoming selector 320. The group of trunk lines extending between the central office A and the satellite office D2 terminates in repeaters in the central office A and in the incoming selectors in the satellite office D2, the trunk lines 618 and 621 respectively terminating in the repeaters 616 and 619 and in the incoming selectors 1000 and 1015.

In the central office A, the second selectors 700, etc., are of the 200-point type, including upper and lower contact banks. Specifically, the second selector 700 includes an upper contact bank having access to a group of trunks 801, etc., extending to the group of repeaters 800, etc., and a lower contact bank having access to a group of trunks 810, etc., extending to the group of repeaters 809, etc. Finally, the group of repeaters 803, 806, etc., is accessible via the individually associated trunks 804, 807, etc., in both the upper and lower contact banks of the second selector 700, the trunk 804 being terminated in the upper contact bank and the trunk 807 being terminated in the lower contact bank. Also the second selectors 500, etc., are of the 200-point type, including upper and lower contact banks. Specifically, the second selector 500 includes an upper contact bank having access to a group of trunks 611, etc., extending to the group of repeaters 610, etc., and a lower contact bank having access to a group of trunks 614, etc., extending to the group of repeaters 613, etc. Finally, the group of repeaters 616, 619, etc. is accessible via the individually associated trunks 617, 620, etc., in both the upper and lower contact banks of the second selector 500, the trunk 617 being terminated in the upper contact bank and the trunk 620 being terminated in the lower contact bank.

In the satellite office B1, the incoming selector 400, etc., are of the 200-point type, including upper and lower contact banks. Specifically, the upper contact bank of the incoming selector 400 has access to a first group of connectors 326, etc., via the individually associated trunks 401, etc., and the lower contact bank of the incoming selector 400 has access to a second group of connectors 327, etc., via the individually associated trunks 402, etc. The first group of connnectors 326, etc., has access to the first group of subscriber lines 301, etc., the subscriber lines 301, etc., being provided with individual line circuits 302, etc. Finally, the second group of connectors 327, etc., has access to the second group of subscriber lines 303, etc., the subscriber lines 303, etc., being provided with individual line circuits 304, etc.

In the satellite office B2, the incoming selectors 317, etc., are of the 200-point type, including upper and lower contact banks. Specifically, the upper contact bank of the incoming selector 317 has access to a first group of connectors 318, etc., via the individually associated trunks 331, etc.; and the lower contact bank of the incoming selector 317 has access to a second group of connectors 319, etc., via the individually associated trunks 332, etc. The first group of connectors 318, etc., has access to the first group of subscriber lines 309, etc., the subscriber lines 309, etc., being provided with individual line circuits 310, etc. Finally, the second group of connectors 319, etc., has access to the second group of subscriber lines 311, etc., the subscriber lines 311, etc., being provided with individual line circuits 312, etc.

In the satellite office C1, the incoming selectors 323, etc., are of the 200-point type, including upper and lower contact banks. Specifically, the upper contact bank of the incoming selector 323 has access to a first group of connectors 324, etc., via the individually associated trunks 335, etc.; and the lower contact bank of the incoming selector 323 has access to a second group of connectors 325, etc., via the individually associated trunks 336, etc. The first group of connectors 324, etc., has access to the first group of subscriber lines 305, etc., the subscriber lines 305, etc., being provided with individual line circuits 306, etc. Finally the second group of connectors 325, etc., has access to the second group of subscriber lines 307, etc., the subscriber lines 307, etc., being provided with individual line circuits 308, etc.

In the satellite office C2, the incoming selectors 320, etc., are of the 200-point type, including upper and lower contact banks. Specifically the upper contact bank of the incoming selector 320 has access to a first group of connectors 321, etc., via the individually associated trunks 333, etc.; and the lower contact bank of the incoming selector 320 has access to a second group of connectors 322, etc., via the individually assoociated trunks 334, etc. The first group of connectors 321, etc., has access to the first group of subscriber lines 313, etc., the subscriber lines 313, etc., being provided with individual line circuits 314, etc. Finally, the second group of connectors 322, etc., has access to the second group of subscriber lines 315, etc., the subscriber lines 315, etc., being provided with individual line circuits 316, etc.

In the satellite office D1, the incoming selectors 1200, 1260, etc., are of the 200-point type, including upper and lower contact banks. Specifically, the upper contact bank of the incoming selector 1200 has access to a first group of connectors 1100, etc., via the individually associated trunks 1193, etc., and to a third group of connectors 1300, etc., via the individually associated trunks 1306, etc., and the lower contact bank of the incoming selector 1200 has access to a second group of connectors 1119, etc., via the individually associated trunks 1191, etc., and to a fourth group of connectors 1120, etc., via the individually associated trunks 1192, etc. The first group of connectors 1100, etc., is of the 200-point type, including upper and lower contact banks. Specifically, the upper contact bank of the connector 1100 has access to the first group of subscriber lines 1109, etc., the subscriber lines 1109, etc., being provided with individual line circuits 1110, etc.; and the lower contact bank of the connector 1100 has access to the second group of subscriber lines 1111, etc., the subscriber lines 1111, etc., being provided with individual line circuits 1112, etc. The second group of connectors 1119, etc., is of the 200-point type, including upper and lower contact banks. Specifically, the upper contact bank of the connector 1119 has access to the third group of subscriber lines 1113, etc., the subscriber lines 1113, etc., being provided with individual line circuits 1114, etc.; and the lower contact bank of the connector 1119 has access to the fourth group of subscriber lines 1115, etc., the subscriber lines 1115, etc., being provided with individual line circuits 1116, etc. The third group of connectors 1300, etc., has access to the first group of two-party lines 1307, etc., the two-party lines 1307, etc., being provided with individual line circuits 1308, etc.; and the fourth group of connectors 1120, etc., has access to the second group of two-party lines 1117, etc., the two-party lines 1117, etc., being provided with individual line circuits 1118, etc.

In the satellite office D2, the incoming selectors 1000, 1015, etc., are of the 200-point type, including upper and lower contact banks. Specifically, the upper contact bank of the incoming selector 1000 has access to a first group of connectors 632, etc., via the individually associated trunks 642, etc., and to a third group of connectors 900, etc., via the individually associated trunks 1014, etc.; and the lower contact bank of the incoming selector 1000 has access to a second group of connectors 633, etc., via the individually associated trunks 641, etc., and to a fourth group of connectors 634, etc., via the individually associated trunks 640, etc. The first group of connectors 632, etc., is of the 200-point type, including upper and lower contact banks. Specifically, the upper contact bank of the connector 632 has access to the first group of subscriber lines 626, etc., the subscriber lines 626, etc., being provided with individual line circuits 627, etc.; and the lower contact bank of the connector 632 has access to the second group of subscriber lines 624, etc., the subscriber lines 624, etc., being provided with individual line circuits 625, etc. The second group of connectors 633, etc., is of the 200-point type, including upper and lower contact banks. Specifically, the upper contact bank of the connector 633 has access to the third group of subscriber lines 628, etc.; the subscriber lines 628, etc., being provided with individual line circuits 629; and the lower contact bank of the connector 633 has access to the fourth group of subscriber lines 630, etc., the subscriber lines 630, etc., being provided with individual line circuits 631, etc. The third group of connectors 900, etc., has access to the group of P. B. X trunks 913, 915, etc., that are provided with individual trunk circuits 914, 916, etc., and extend to the P. B. X 1. Similarly, the fourth group of connectors 634, etc., has access to the group of P. B. X trunks 636, 638, etc., that are provided with individual trunk circuits 637, 639, etc., and extend to the P. B. X 2.

*Section 2.—The apparatus incorporated in the telephone system*

In the central office A, the finder-first selector links 604, 605, etc., are preferably of conventional Strowger types; while the distributor 603 and the line circuits 602, etc., may be of any suitable types. Preferably, the repeaters 803, 800, 806, 809, 616, 610, 619, 613, etc., are identical; and the repeater 800 comprises, as shown in Fig. 8, a repeating unit provided with incoming coils 820 and 821 and outgoing coils 823 and 824. Also the repeater 800 comprises a relay group including two cutoff relays R830 and R835, a test relay R840, a line relay R850, a hold relay R855, and a dial relay R860.

Preferably, the second selectors 700, etc., are identical; and the second selector 700 comprises, as shown in Fig. 7, a Strowger mechanism 701, and a rotary switch 710. The Strowger mechanism 701 comprises a wiper shaft mounted for both vertical and rotary movements and carrying upper and lower wiper sets respectively provided with upper and lower contact banks. Also the Strowger mechanism 701 comprises a vertical magnet M702 for driving the wiper shaft step by step in the vertical direction, a rotary magnet M703 for driving the wiper shaft step by step in the rotary direction, and a release magnet M705 for releasing the wiper shaft and for causing it to be returned to its normal rotary and vertical positions. Associated with the wiper shaft of the Strowger mechanism 701 are a set of V. O. N. springs S706 that is operated when the wiper shaft is driven in the vertical direction one step away from its normal vertical position, a set of cam springs S707 that is operated when the wiper shaft is driven in the rotary direction eleven steps away from its normal rotary position, and a set of N. P. springs S708 that is operated when the wiper shaft is driven in the vertical direction a predetermined number of steps (two) away from its normal vertical position. The rotary switch 710 comprises a cam shaft 713 mounted for step by step movement in the rotary direction, and an associated rotary magnet M711 for driving the cam shaft 713. The cam shaft 713 carries four cams, designated C1, C2, C3 and C4 that respectively operate four individually associated switches, designated S1, S2, S3 and S4. Also, the second selector 700 comprises a relay group including two test relays R725 and R730, two switch-through relays R740 and R750, a line relay R760, a hold relay R765, a cam relay R770, a V. O. N. relay R775, a dial relay R780, and an N. P. relay R790. Finally, the second selector 700 comprises a test jack J716 and an associated test lamp L717. In the second selector 700, the switch S3 normally selects the upper wiper set of the Strowger mechanism 701 but is operative to select the lower wiper set of the Strowger mechanism 701 in a manner more fully explained hereinafter.

Preferably, the second selectors 500, etc., are identical; and the second selector 500 comprises, as shown in Fig. 5, a Strowger mechanism 501 and a rotary switch 510. The Strowger mechanism 501 comprises a wiper shaft mounted for both vertical and rotary movements and carrying upper and lower wiper sets respectively provided with upper and lower contact banks. Also the Strowger mechanism 501 comprises a vertical magnet M502 for driving the wiper shaft step by step in the vertical direction, a rotary magnet M503 for driving the wiper shaft step by step in the rotary direction, and a release magnet M505 for releasing the wiper shaft and for causing it to be returned to its normal rotary and vertical positions. Associated with the wiper shaft of the Strowger mechanism 501 are a set of V. O. N. springs S506 that is operated when the wiper shaft is driven in the vertical direction one step away from its normal vertical position, and a set of cam springs S507 that is operated when the wiper shaft is driven in the rotary direction eleven steps away from its normal rotary position. The rotary switch 510 comprises a cam shaft 513 mounted for step by step movement in the rotary direction, and an associated rotary magnet M511 for driving the cam shaft 513. The cam shaft 513 carries five cams, designated C1, C2, C3, C4 and C5, that respectively operate five individually associated switches, designated S1, S2, S3, S4 and S5. Also, the second selector 500 comprises a relay group including a dial relay R520, a V. O. N. relay R525, a cam relay R530, a hold relay R540, a line relay R545, two switch-through relays R550 and R560, and two test relays R570 and R580. Finally, the second selector 500 comprises a test jack J514 and an associated test lamp L513. In the second selector 500, the switch S3 normally selects the upper wiper set of the Strowger mechanism 501 but is operative to select the lower wiper set of the Strowger mechanism 501 in a manner more fully explained hereinafter.

In the satellite offices B1, B2, C1 and C2, it is preferable that the incoming selectors 400, 317, 323, 320, etc., are identical; also, it is preferable that the connectors 326, 327, 318, 319, 324, 325, 321, 322, etc., are identical and of a conventional Strowger type. Finally, it is preferable that line circuits 302, 304, 310, 312, 306, 308, 314, 316, etc., be identical and of a conventional type.

As shown in Fig. 4, the incoming selector 400 comprises a Strowger mechanism 490 including a wiper shaft mounted for both vertical and rotary movements and carrying upper and lower wiper sets respectively provided with upper and lower contact banks. Also the Strowger mechanism 490 comprises a vertical magnet M462 for driving the wiper shaft step by step in the vertical direction, a rotary magnet M463 for driving the wiper shaft step by step in the rotary direction, and a release magnet M465 for releasing the wiper shaft and for causing it to be returned to its normal rotary and vertical positions. Associated with the wiper shaft of the Strowger mechanism 490 are a set of V. O. N. springs S434 that is operated when the wiper shaft is driven in the vertical direction one step away from its normal vertical position, and a set of cam springs S433 that is operated when the wiper shaft is driven in the rotary direction eleven steps away from its normal rotary position. Also, the incoming selector 400 comprises a relay group including a wiper switch relay R410, a cam relay R420, a hold relay R425, a line relay R430, a transfer relay R440, a V. O. N. relay R450, a wiper switch relay R460, a switch-through relay R470 and a test relay R480.

In the satellite office D1, it is preferable that the incoming selectors 1200, 1260, etc., are identical, that the connectors 1100, 1119, etc., are identical, and that the connectors 1300, 1120, etc., are identical. Also it is preferable that the line circuits 1110, 1112, 1114, 1116, 1308, 1118, etc., are identical and of conventional type.

As shown in Fig. 12, the incoming selector 1200 comprises a Strowger mechanism 1201 and a rotary switch 1210. The Strowger mechanism 1201 comprises a wiper shaft mounted for both vertical and rotary movements and carrying upper and lower wiper sets respectively provided with upper and lower contact banks. Also the Strowger mechanism 1201 comprises a vertical magnet M1202 for driving the wiper shaft step by step in the vertical direction, a rotary magnet M1203 for driving the wiper shaft step by step in the rotary direction, and a release magnet M1206 for releasing the wiper shaft and for causing it to be returned to its normal rotary and vertical positions. Associated with the wiper shaft of the Strowger mechanism 1201 are two sets of V. O. N. springs S1207 and S1208 that are operated when the wiper shaft is driven in the vertical direction one step away from its normal vertical position, and a set of cam springs S1209 that is operated when the wiper shaft is driven in the rotary direction eleven steps away from its normal rotary position. The rotary switch 1210 comprises a cam shaft 1213 mounted for step by step movement in the rotary direction and an associated rotary magnet M1211 for driving the cam shaft 1213. The cam shaft 1213 carries four cams, designated C1, C2, C3 and C4, that respectively operate four individually associated switches, designated S1, S2, S3 and S4. Also the incoming selector 1200 comprises a relay group including a dial relay R1220, a cam relay R1225, a hold relay R1230, a line relay R1235, a switch-through relay R1240 and a test relay R1250. Finally, the incoming selector 1200 comprises a permanent lamp L1216. In the incoming selector 1200, the switch S3 normally selects the upper wiper set of the Strowger mechanism 1201, but is operative to select the lower wiper set of the Strowger mechanism 1201 in a manner more fully explained hereinafter.

As shown in Fig. 11, the connector 1100 comprises a Strowger mechanism 1101 including a wiper shaft mounted for both vertical and rotary movements and carrying upper and lower wiper sets respectively provided with upper and lower contact banks. Also, the Strowger mechanism 1101 comprises a vertical magnet M1102 for driving the wiper shaft step by step in the vertical direction, a rotary magnet M1103 for driving the wiper shaft step by step in the rotary direction, and release magnet M1104 for releasing the wiper shaft and for causing it to be returned to its normal rotary and vertical positions. Associated with the wiper shaft of the Strowger mechanism 1101 is a set of V. O. N. springs S1104 that is operated when the wiper shaft is driven in the vertical direction one step away from its normal vertical position. Also, the connector 1100 comprises a relay group including a wiper switch relay R1120, a switch-through relay R1130, a control relay R1140, a busy test relay R1145, a ring cutoff relay R1150, a transfer relay R1155, a V. O. N. relay R1160, a hold relay R1165, a line relay R1170, a wiper switch relay R1175 and an answer relay R1180.

As shown in Fig. 13, the connector 1300 comprises a Strowger mechanism 1301 including a wiper shaft mounted for both vertical and rotary movements and carrying a wiper set provided with an associated contact blank. Also, the Strowger mechanism 1301 comprises a vertical magnet M1302 for driving the wiper shaft step by step in the vertical direction, a rotary magnet M1303 for driving the wiper shaft step by step in the rotary direction, and a release magnet M1304 for releasing the wiper shaft and for causing it to be returned to its normal rotary and vertical positions. Associated with the wiper shaft of the Strowger mechanism 1301 is a set of V. O. N. springs S1305 that is operated when the wiper shaft is driven in the vertical direction one step away from its normal vertical position. Also, the connector 1300 comprises a relay group including an answer relay R1310, a party relay R1320, a line relay R1325, a hold relay R1330, a V. O. N. relay R1335, a transfer relay R1340, a ring cutoff relay R1345, a busy test relay R1350, a control relay R1355, a switch-through relay R1360, and ring control relay R1370.

In the satellite office D2, it is preferable that the incoming selectors 1000, 1015, etc., are identical, that the connectors 900, 634, etc., are identical and that the connectors 632, 633, etc., are identical. Specifically, the connectors 632, 633, etc., in the satellite office D2 are identical to the connectors 1100, 1119, etc., in the satellite office D1. Also, it is preferable that the line circuits 627, 625, 629, 631, etc., are identical and of a conventional type. Further, it is preferable that the trunk circuits 914, 916, 937, 939, etc., are identical and of a conventional type.

As shown in Fig. 10, the incoming selector 1000 comprises a Strowger mechanism 1001 and a rotary switch 1010. The Strowger mechanism 1001 comprises a wiper shaft mounted for both vertical and rotary movements and carrying upper and lower wiper sets respectively provided with upper and lower contact banks. Also, the Strowger mechanism 1001 comprises a vertical magnet M1002 for driving the wiper shaft step by step in the vertical direction, a rotary magnet M1003 for driving the wiper shaft step by step in the rotary direction, and a release magnet M1005 for releasing the wiper shaft and for causing it to be returned to its normal rotary and vertical positions. Associated with the wiper shaft of the Strowger mechanism 1001 are a set of V. O. N. springs S1006 that is operated when the wiper shaft is driven in the vertical direction one step away from its normal vertical position, and a set of cam springs S1007 that is operated when the wiper shaft is driven in the rotary direction eleven steps away from its normal rotary position. The rotary switch 1010 comprises a cam shaft 1013 mounted for step by step movement in the rotary direction, and an associated rotary magnet M1011 for driving the cam shaft 1013. The cam shaft 1013 carries three cams, designated C1, C2 and C3 that respectively operate three individually associated switches S1, S2 and S3. Also, the incoming selector 1000 comprises a relay group including a transfer relay R1020, a dial relay R1030, a V. O. N. relay R1040, a cam relay R1050, a hold relay R1060, a line relay R1070, a switch-through relay R1080, and a test relay R1090. In the incoming selector 1000, the switch S2 normally selects the upper wiper set of the Strowger mechanism 1001, but is operative to select the lower wiper set of the Strowger mechanism 1001 in a manner more fully explained hereinafter.

As shown in Fig. 9, the connector 900 comprises a Strowger mechanism 901 including a wiper shaft mounted for both vertical and rotary movements and carrying a wiper set provided with a contact bank. Also, the Strowger mechanism 901 comprises a vertical magnet M902 for driving the wiper shaft step by step in the vertical direction, a rotary magnet M903 for driving the wiper shaft step by step in the rotary direction, and a release magnet M905 for releasing the wiper shaft and for causing it to be returned to its normal rotary and vertical positions. Associated with the wiper shaft of the Strowger mechanism 901 are a set of V. O. N. springs S906 that is operated when the wiper shaft is driven in the vertical direction one step away from its normal vertical position, and a set of R. O. N. springs S907 that is operated when the wiper shaft is driven in the rotary direction one step away from its normal rotary position. Also the connector 900 comprises a relay group including a step relay R920, a series relay R925, a night service relay R930, a switch-through relay R940, a R. O. N. relay R950, a busy test relay R960, a ring cut-off relay R970, a transfer relay R975, a V. O. N. relay R980, a hold relay R985, a line relay R990, a night service relay R995, and an answer relay R905.

In the central office A and in each of the various satellite offices B1, etc., each subscriber substation T, T1, etc., is provided with conventional substation apparatus including a telephone instrument, a dial, and a ringer. At the various private subscriber substations T1, etc., on the private subscriber lines 301, etc., the ringer is connected across the line conductors of the associated subscriber lines; whereas at the various party subscriber substations T9, T10, etc., on the two-party subscriber lines 1307, etc., the ringer is connected between one of the line conductors and ground potential to provide a divided ringing circuit. For example, at the party subscriber substations T9 and T10, the ringers are respectively connected between the opposite line conductors of the two-party subscriber line 1307 and ground potential in order to provide the divided ringing circuit noted.

A better understanding of the connection and arrangement of the apparatus incorporated in the telephone system will be facilitated from a consideration of the extension of calls involving the various offices.

*Section 3.—A call from the subscriber substation T in the central office A to the subscriber substation T1 in the satellite office B1*

In extending a call from the subscriber substation T in the central office A to the subscriber substation T1 in the satellite office B1, the subscriber at the calling subscriber substation T first initiates the call and dials the directory number 411111. When the call is thus initiated at the calling subscriber substation T, the associated line circuit 602 is controlled over the subscriber line 601 to govern the distributor 603, whereby an idle one of the associated finder-first selector links is selected for use. Assuming that the finder-first selector link illustrated is selected for use, the finder 604 thereof operates to find the subscriber line 601, whereby a loop circuit is completed from the calling subscriber substation T to the first selector 605.

In response to the first digit 4, the first selector 605 is operated to select the corresponding group of trunks, including the trunk 622, and then operates automatically to select an idle trunk in the group noted. Assuming that the trunk 622 is the first idle trunk in this group, the first selector 605 seizes the trunk 622 and switches through in order to complete a loop circuit from the calling subscriber substation T to the second selector 700 terminating the trunk 622, the trunk 622 being marked as idle to the first selector 605 by the application of battery potential via the resistor 718 and the contact 774 to the control conductor thereof. When the loop circuit mentioned is completed via the line conductors of the trunk 622, the line relay R760 in the second selector 700 is operated, this loop circuit including the contacts 744, 746, 752, and 754. Upon operating, the line relay R760 completes, at the contacts 762, a circuit for operating the hold relay R765. Upon operating, the hold relay R765 completes, at the contacts 766, a path for applying ground potential to the control conductor of the trunk 622 in order to mark the trunk 622 as busy to the other first selectors having access thereto; and completes, at the contacts 767, a circuit, including the cam springs S707, for operating the cam relay R770. Upon operating, the cam relay R770 interrupts, at the contacts 774, the original path for applying battery potential to the control conductor of the trunk 622; and completes, at the contacts 773, a connection, including the contacts 777, 751 and 741 and the condenser 722, between the dial-tone conductor C721 and the negative line conductor of the trunk 622, whereby the dial-tone is again returned to the calling subscriber substation T.

When the second digit 1 is dialed, the line relay R760 follows interrupting and then recompleting, at the contacts 762, the circuit for retaining operated the hold relay R765, whereby the latter relay is retained operated during impulsing as it is of the slow-to-release type. Also, the line relay R760 completes and then interrupts, at the contacts 761, a multiple circuit for energizing the winding of the dial relay R780 and for operating the vertical magnet M702 of the Strowger mechanism 701. When the winding of the dial relay R780 is thus energized, the latter relay operates to complete, at the contacts 782, a holding circuit for energizing the winding thereof; and the dial relay R780 remains in its operated position during impulsing, as it is of the slow-to-release type. Also upon operating, the dial relay R780 completes, at the contacts 781, a circuit, including the contacts 1 of the switch S1, for energizing the rotary magnet M711 of the rotary switch 710, causing the latter magnet to operate in order to condition the cam shaft 713 to be driven away from its first or normal position. In response to the second digit 1, the vertical magnet M702 operates and then restores driving the wiper shaft of the Strowger mechanism 701 one step in the vertical direction, whereby the upper wiper set selects the group of trunks, including the trunk 801, and the lower wiper set selects the group of trunks, including the trunk 810.

At the conclusion of the second digit 1, the line relay R760 is retained in its operated position retaining operated the hold relay R765 and effecting restoration of the dial relay R780 shortly thereafter, the dial relay R780 being of the slow-to-release type. Also when the wiper shaft of the Strowger mechanism 701 was driven away from its normal vertical position, the set of V. O. N. springs S706 was operated in order to complete a circuit for operating the V. O. N. relay R775. Upon operating, the V. O. N. relay R775 interrupts, at the contacts 777, the path for returning dial-tone current over the trunk 622; and prepares, at the contacts 779, a circuit traced hereinafter for operating the rotary magnet M703 of the Strowger mechanism 701. Upon restoring, the dial relay R780 interrupts, at the contacts 781, the circuit for energizing the rotary magnet M711 of the rotary switch 710, whereby the rotary magnet M711 restores driving the cam shaft 713 away from its first or normal position into its second position. When the cam shaft 713 is thus driven into its second position, the cam C1 operates the switch S1, whereby the contacts 1, 2 and 4 of the switch S1 are opened and the contacts 3 and 5 of the switch S1 are closed. When the switch S1 is thus operated, there is interrupted, at the contacts 2 thereof, a further point in the circuit for operating the vertical magnet M702 of the Strowger mechanism 701; and there is prepared, at the contacts 3 thereof, an alternative circuit for operating the rotary magnet M711 of the rotary switch 710.

The line relay R760 follows the third digit 1 retaining operated the hold relay R765 and effecting operation of the dial relay R780 in the manner previously noted. In this instance, the rotary magnet M711 of the rotary switch 710 is energized in multiple with the winding of the dial relay R780, the circuit extending from ground by way of the contacts 743′, 751′, 761, 769, 797, the contacts 1 of switch S2, the contacts 3 of the switch S1, the contacts 796 and the rotary magnet M711 to battery. Accordingly, the dial relay R780 operates and is retained operated during impulsing as it is of the slow-to-release type; and the rotary magnet M711 of the rotary switch 710 follows the third digit 1. Specifically, the rotary magnet M711 operates and then restores in accordance with the single impulse of the third digit 1, whereby the cam shaft 713 is driven from its second position into its third position causing the cam C2 to operate the switch S2. More particularly, the switch S2 is operated to open the contacts 1 thereof and to close the contacts 2 thereof. When the contacts 1 of the switch S2 are thus opened, a further point in the circuit for energizing the rotary magnet M711 and the winding of the dial relay R780 in multiple is interrupted; and at the contacts 2 of the switch S2 there is prepared a circuit for operating the rotary magnet M703 of the Strowger mechanism 701.

At the conclusion of the third digit 1, the line relay R760 is retained in its operated position, retaining operated the hold relay R765 and causing restoration of the dial relay R780 shortly thereafter, the dial relay R780 being of the slow-to-release type. Upon restoring, the dial relay R780 completes, at the contacts 783, a circuit, including the contacts 773′, 732, 727, 744′, 752′, 779, the contacts 2 of the switch S2 and the contact 704, for operating the rotary magnet M703 of the Strowger mechanism 701. More particularly, the rotary magnet M703 operates buzzer fashion by virtue of the inclusion of the contacts 704 thereof in the operating circuit thereof, whereby the wiper shaft of the Strowger mechanism 701 is driven step by step in the rotary direction. In the present instance, the cam C3 carried by the cam shaft 713 retains the switch S3 in its normal position, whereby the upper wiper set of the Strowger mechanism 701 is selected so that only the trunks in the group, including the trunk 801, are tested by the control wiper of the upper wiper set. More particularly, when a trunk in the group, including the trunk 801, is selected, a test is performed by the test relay R725 in order to determine the idle or busy condition thereof, ground potential being present upon the control conductor of the trunk in the event it is busy and battery potential being present upon the control conductor of the trunk in the event it is idle. The presence of ground potential upon the control conductor of a selector trunk completes a path, including the contacts 772′, 757, the contact 6 of the switch S3 and the control wiper of the upper wiper set, for short-circuiting the winding of the test relay R725; on the other hand, the presence of battery potential upon the control conductor of a selector trunk completes a circuit substantially identical to that traced above for energizing the winding of the test relay R725 in order to cause the latter relay to operate. Assuming that the trunk 801 is the first idle trunk in the previously selected group, when this trunk is selected by the upper wiper set of the Strowger mechanism 701, the above-mentioned circuit for energizing the winding of the test relay R725 is completed causing the latter relay to operate and interrupt, at the contacts 727, the previously traced circuit for operating the rotary magnet M703 of the Strowger mechanism 701, whereby further driving of the wiper shaft of the Strowger mechanism 701 is arrested. The trunk 801 is marked as idle to the upper wiper set of the Strowger mechanism 701 via a path, including the control conductor thereof, as well as the contacts 859, 864 and 838 and the resistor 829 having battery potential connected thereto. Also upon operating, the test relay R725 completes, at the contact 726, a circuit for operating the switch-through relay R740. Upon operating, the switch-through relay R740 completes, at the contact 742', a holding circuit, including the control conductor of the trunk 622, for energizing the winding thereof. Also the switch-through relay R740 interrupts, at the contacts 744 and 746, the loop circuit extending to the line relay R760 in order to cause the latter relay to restore; and completes, at the contacts 745 and 747, a connection between the line conductors of the trunk 622 and the line wipers of the upper wiper set of the Strowger mechanism 701 via the contacts 2 and 4 of the switch S3. This circuit is extended via the line conductors of the trunk 801, the windings 820 and 821 of the repeater 800, the upper and lower windings of the test relay R840 and the upper and lower windings of the line relay R850 respectively to battery and ground potentials. Thus the loop circuit from the calling subscriber substation T is forwarded into the repeater 800 causing the line relay R850 in the repeater 800 to operate. In passing, it is noted that the test relay R840 is not operated in the present instance as it is of the differential type. Upon operating, the line relay R850 completes, at the contacts 852, a circuit for operating the hold relay R855. Upon operating, the hold relay R855 interrupts, at the contacts 859, the previously traced path for applying battery potential to the control conductor of the trunk 801; and completes, at the contacts 858, a path for applying ground potential to the control conductor of the trunk 801 in order to mark the trunk 801 as busy to the second selectors having access thereto.

Continuing now with the operation of the second selector 700, the switch-through relay R740 also completes, at the contacts 748, a connection between the control conductor of the trunk 622 and the control conductor of the trunk 801, this connection including the contact 6 of the switch S3 and the control wiper of the upper wiper set of the Strowger mechanism 701. Further, the switch-through relay R740 completes, at the contacts 748, a path including the grounded control conductor of the trunk 622 for short-circuiting the winding of the test relay R725 in order to cause the latter relay to restore. Further, the switch-through relay R740 interrupts, at the contacts 743', the circuit for retaining operated the hold relay R765 in order to cause the latter relay to restore shortly thereinafter. Upon restoring, the hold relay R765 interrupts, at the contacts 767, the circuit for retaining operated, the cam relay R770. Upon restoring, the cam relay R770 reprepares, at the contacts 774, the original path for applying battery potential via the resistor 718 to the control conductor of the trunk 622; however, without effect at this time since direct ground potential is applied to the control conductor of the trunk 622 via the grounded control conductor of the trunk 801 in the repeater 800. Accordingly, at this time, the second selector 700 has switched through so that the loop circuit is extended from the calling subscriber substation T to the line relay R850 in the repeater 800.

When the line relay R850 in the repeater 800 operated, it also completed, at the contacts 851, a connection, including the coils 823 and 824 and the resistor 826, between the line conductors of the trunk line 802, thereby completing a loop circuit, including the contacts 471 and 473, for energizing in series the upper and lower windings of the wiper switch relay R460 and the upper and lower windings of the line relay R430 in the incoming selector 400. When this loop circuit is thus completed, the line relay R430 operates; however, the wiper switch relay R460 does not operate as it is of the differential type. Upon operating, the line relay R430 completes, at the contacts 431, a circuit for operating the hold relay R425. Upon operating, the hold relay R425 completes, at the contacts 427, a circuit for operating the cam relay R420; and completes, at the contacts 426, a circuit, including the contacts 454, for energizing the upper winding of the transfer relay R440, in order to cause the latter relay to operate. Upon operating, the cam relay R420 prepares, at the contacts 423, a multiple circuit for energizing the vertical magnet M462 of the Strowger mechanism 490 and the lower winding of the transfer relay R440.

The line relay R850 in the repeater 800 follows the fourth digit 1, restoring and then reoperating. Specifically, the line relay R850 restores and then reoperates in order to interrupt and then recomplete, at the contacts 852, the circuit for energizing the winding of the hold relay R855, whereby the latter relay is retained in its operated position during impulsing, as it is of the slow-to-release type. Also, the line relay R850 completes and then interrupts, at the contacts 853, a circuit for energizing the winding of the dial relay R860 in order to cause the latter relay to operate and remain operated during impulsing as it is of the slow-to-release type. Upon operating, the dial relay R860 completes, at the contacts 863, a circuit, including the contacts 858 and 857, for operating the cutoff relay R830. Upon operating, the cutoff relay R830 completes at the contacts 832, a hold circuit for energizing the winding thereof; and completes, at the contacts 831, a circuit for energizing the winding of the cutoff relay R835 in order to cause the latter relay to operate shortly thereafter, it being of the slow-to-operate type. Upon operating, the cutoff relay R835 completes, at the contacts 836 and 837, paths for short-circuiting the upper and lower windings of the test relay R840, in order to improve the impulsing characteristic of the loop circuit extending from the calling subscriber substation T to the line relay R850. Also upon operating, the dial relay R860 completes, at the contacts 862, a path for short-circuiting the resistor 826 in order to improve the dialing characteristic of the loop circuit extending to the line relay R430 in the incoming selector 400. Further, the dial relay R860 completes at the contacts 861, an energy-absorbing circuit, including the resistor 827 and the condenser 828, across the impulsing contacts 851 of the line relay R850. Finally, the line relay R850 interrupts and then recompletes, at the impulsing contacts 851, the loop circuit extending via the trunk line 802 to the line relay R430 in the incoming selector 400, whereby the fourth digit 1 is repeated by the repeater 800 to the incoming selector 400.

At the conclusion of the fourth digit 1, the line relay R850 in the repeater 800 is retained in its operated position, whereby the dial relay R860 restores shortly thereafter, it being of the slow-to-release type. Upon restoring, the dial relay R860 interrupts at the contacts 861, the energy-absorbing circuit previously noted; and interrupts, at the contacts 862, the path for short-circuiting the resistor 826. The line relay R430 in the incoming selector 400 follows the fourth digit 1, as previously noted, restoring and reoperating. More particularly, the line relay R430 restores and then reoperates interrupting and then recompleting, at the contacts 431, the circuit for energizing the winding of the hold relay R425, in order to cause the latter relay to be retained in its operated position during impulsing, as it is of the slow-to-release type. Also the line relay R430 completes and then interrupts, at the contacts 432, the previously mentioned circuit, including the contacts 478, 428 and 423, for energizing the vertical magnet M462 of the Strowger mechanism 490 and the lower winding of the transfer relay R440. Thus the vertical magnet M462 is operated and then restored, driving the wiper shaft of the Strowger mechanism 490 one step in the vertical direction causing the upper and lower wiper sets thereof to select the two groups of trunks respectively including the trunks 491 and 492. When the wiper shaft of the Strowger mechanism 490 and driven away from its normal vertical position, the set of V. O. N. springs S434 was operated effecting operation of the V. O. N. relay R450. Upon operating, the V. O. N. relay R450 completes, at the contacts 452 and 453, paths for short-circuiting the upper and lower windings of the wiper switch relay R460; and interrupts, at the contacts 454, the previously traced circuit for energizing the upper winding of the transfer relay R440.

At the conclusion of the fourth digit 1, the line relay R430 is retained in its operated position, retaining operated the hold relay R425 and effecting the deenergization of the lower winding of the transfer relay R440, whereby the latter relay restores shortly thereafter, it being of the slow-to-release type. Upon restoring, the transfer relay R440 completes at the contacts 441, a circuit, including the contacts 464, 455, 477, 482 and 422, for energizing the rotary magnet M463 of the Strowger mechanism 490. The rotary magnet M463 operates buzzer-fashion by virtue of the inclusion of the contacts 464 in the operating circuit thereof, whereby the wiper shaft of the Strowger mechanism 490 is driven step by step in the rotary direction. In the present instance, the wiper switch relay R410 occupies its restored position, whereby the control wiper of the upper wiper set is connected via the contacts 415 to the winding of the test relay R480 so that only the trunks in the group, including the trunk 491, are tested as they are selected by the upper wiper set of Strowger mechanism 490. More particularly, a busy trunk that is selected by the upper wiper set of the Strowger mechanism 490 has ground potential upon the control conductor thereof, completing a path, including the contacts 415 and 421, for short-circuiting the winding of the test relay R480. On the other hand, an idle trunk that is selected by the upper wiper set of the Strowger mechanism 490 has battery potential upon the control conductor thereof, completing a substantially identical circuit for energizing the winding of the test relay R480 in order to cause the latter relay to operate.

Assuming that the trunk 491 is the first idle trunk in the group noted, when this trunk is selected by the upper wiper set of the Strowger mechanism 490, the test relay R480 is operated, as previously noted, interrupting, at the contacts 482, the circuit for operating the rotary magnet M463 of the Strowger mechanism 490. Also, upon operating, the test relay R480 completes, at the contacts 481, a circuit for operating the switch-through relay R470. Upon operating, the switch-through relay R470 interrupts, at the contacts 471 and 473, the loop circuit extending to the upper and lower windings of the line relay R430 in order to cause the latter relay to restore; and completes, at the contacts 472 and 474, a connection between the line conductors of the trunk line 802 and the line conductors of the trunk 491, including the contacts 411 and 413, and the line wipers of the upper wiper set of the Strowger mechanism 490. Accordingly, at this time, the loop circuit from the repeater 800 is extended via the trunk 491 into the connector 326 terminating the trunk 491, so that the connector 326 is seized returning ground potential over the control conductor of the trunk 491. Also upon operating, the switch-through relay R470 completes, at the contacts 475, a path for short-circuiting the winding of the test relay R480, in order to cause the latter relay to restore; and completes, at the contacts 475 and 476, a holding circuit, including the contacts 415 and the control wiper of the upper wiper set, for retaining operated the switch-through relay R470. Further, the switch-through relay R470 interrupts, at the contacts 478, the circuit for retaining operated the hold relay R425, in order to cause the latter relay to restore shortly thereafter, it being of the slow-to-release type. Upon restoring, the hold relay R425 interrupts, at the contacts 427, the circuit for retaining operated the cam relay R420.

At this time, a first loop circuit is completed between the calling subscriber substation T and the repeater 800, and a second loop circuit is completed between the repeater 800 and the connector 326. Accordingly, when the fifth digit 1 and the sixth digit 1 are dialed, the line relay R850 in the repeater 800 follows, repeating these two digits to the connector 326. The connector 326 responds to the fifth digit 1 and to the sixth digit 1 to select the subscriber line 301 extending to the called subscriber substation T1 in a conventional manner. The subsequent operation of the connector 326 depends upon the idle or busy condition of the called subscriber substation T1 at this time, the subscriber line 301 being marked as idle or busy to the connector 326 by the associated line circuit 302 in a conventional manner. First assuming that the called subscriber substation T1 is idle at this time, the connector 326 operates to project ringing current over the subscriber line 301 and to return ring-back tone current over the connection to the calling subscriber substation T. Subsequently when the subscriber at the called subscriber substation T1 answers the call, the connector 326 responds to interrupt the projection of ringing current over the subscriber line 301 and to interrupt the return of ring-back current over the connection to the calling subscriber substation T, in a conventional manner, whereby there is completed a connection between the calling subscriber substation T and the called subscriber substation T1. Now assuming that the called subscriber substation T1 was busy when the connector 326 tested the subscriber line 301, the connector 326 operates to return busy-tone current over the connection back to the calling subscriber substation T in a conventional manner, whereby the subscriber at the calling subscriber substation T proceeds to release the connection in a manner substantially identical to that described hereinafter.

Now assuming that a connection was completed between the calling subscriber substation T and the called subscriber substation T1, in the manner described above, at the conclusion of this connection, the subscriber at the calling subscriber substation T disconnects and the subscriber at the called subscriber substation T1 disconnects. When the subscriber at the calling subscriber substation T disconnects, the first loop circuit extending to the line relay R850 in the repeater 800 is interrupted, causing the latter relay to restore and effect the restoration of the hold relay R855, shortly thereafter, the latter relay being of the slow-to-release type. Upon restoring, the hold relay R855 interrupts, at the contacts 858, the path for applying ground potential to the control conductor of the trunk 801, thereby interrupting the holding circuit for retaining operated the switch-through relay R740 in the second selector 700 and for retaining operated the first selector 605 and the finder 604. The finder 604 and the first selector 605 are released in a conventional manner, whereby the line circuit 602 is operated in order again to mark the subscriber line 601 as idle to the connectors having access thereto.

Upon restoring, the switch-through relay R740 in the second selector 700 completes, at the contacts 743′, a circuit, including the contacts 751′, 761, 768, the contacts 5 of the switch S1 and the contacts 712 for energizing the rotary magnet M711 of the rotary switch 710. The rotary magnet M711 operates buzzer fashion by virtue of the inclusion of the contacts 712 thereof in the operating circuit thereof. More particularly, the rotary magnet M711 operates intermediately to drive the cam shaft 713 step by step back into its first or normal position, whereupon the cam C1 operates the switch S1. More particularly, the switch S1 is operated to open the contacts 3 and 5 thereof and to close the contacts 1, 2 and 4 thereof. When the contacts 5 of the switch S1 are thus opened, the circuit for operating the rotary magnet M711 of the rotary switch 710 is interrupted to arrest further operation of the rotary switch 710. When the contacts 4 of the switch S1 are thus closed, a similar circuit is completed for operating the release magnet M705 of the Strowger mechanism 701, whereby the wiper shaft of the Strowger mechanism 701 is released and returned back into its normal rotary and vertical positions. When the wiper shaft of the Strowger mechanism 701 is thus returned to its normal vertical position, the V. O. N. springs S706 are operated to interrupt the circuit for retaining operated the V. O. N. relay R775. Upon restoring, the V. O. N. relay R755 interrupts, at the contacts 778, the circuit for energizing the release magnet M705. At this time, the second selector 700 is completely released and available for further use.

When the line relay R850 in the repeater 800 restored, it interrupts, at the contacts 851, the second loop circuit extending to the connector 326, whereby the connector 326 was released in a conventional manner, so that the line circuit 302 was operated to mark the subscriber line 301 as idle to the connectors having access thereto. Also, when the connector 326 was thus released, ground potential was removed from the control conductors of the trunk 491, interrupting the circuit for retaining operated the switch-through relay R470 in the incoming selector 400. Upon restoring, the switch-through relay R470 completes, at the contacts 478, a circuit, including the contacts 432, 429 and 456, for operating the release magnet M465 of the Strowger mechanism 490, whereby the wiper shaft thereof is released and returned to its normal rotary and vertical positions. When the wiper shaft of the Strowger mechanism 490 is thus returned back into its normal vertical position, the set of V. O. N. springs S434 is operated to interrupt the circuit for retaining operated the V. O. N. relay R450. Upon restoring, the V. O. N. relay R450 interrupts, at the contacts 456, the circuit for energizing the release magnet M465. At this time, the incoming selector 400 is completely released and available for further use. At this time, the established connection between the calling subscriber substation T and the called subscriber substation T1 is released and all of the apparatus involved therein is completely released and available for further use.

In the extension of the connection from the calling subscriber substation T to the called subscriber substation T1, should the first selector 605 encounter an "all trunks busy" condition in the group of trunks, including the trunk 622, it operates to return a busy signal to the subscriber calling substation T, in a conventional manner.

Should the second selector 700 encounter an "all trunks busy" condition in the group of trunks, including the trunk 801, operation of the rotary magnet M703 of the Strowger mechanism 701 continues until the wiper shaft thereof is driven eleven steps in the rotary direction, operating the set of cam springs S707 to interrupt the circuit for retaining operated the cam relay R770. Upon restoring, the cam relay R770 completes, at the contacts 772, a connection, including the contacts 776, 751 and 741 and the condenser 722, between the busy-tone conductor C720 and the negative line conductor of the trunk 622 so that busy-tone is returned to the calling subscriber substation T. Also upon restoring, the cam relay R770 interrupts, at the contacts 773′, the previously traced circuit for operating the rotary magnet M703 of the Strowger mechanism 701, so as to arrest further driving of the wiper shaft in the rotary direction. Subsequently when the subscriber at the calling subscriber substation T disconnects, the second selector 700 is released in a manner substantially identical to that previously described.

Should the incoming selector 400 encounter an "all trunks busy" condition in the group of trunks, including the trunk 491, operation of the rotary magnet M463 of the Strowger mechanism 490 continues until the wiper shaft thereof is driven eleven steps in the rotary direction, operating the set of cam springs S433 to interrupt the circuit for retaining operated the cam relay R420. Upon restoring, the cam relay R420 completes, at the contacts 421′, a connection, including the contacts 451 and 471 and the condenser 419, for connecting the busy-tone conductor C418 to the negative line conductor of the trunk line 802 so that busy-tone is returned to the calling subscriber substation T. Also upon restoring, the cam relay R420 interrupts, at the contacts 422, the previously traced circuit for operating the rotary magnet M463 of the Strowger mechanism 490 so as to arrest further driving of the wiper shaft in the rotary direction. Subsequently when the subscriber at the calling subscriber substation T disconnects, the incoming selector 400 is released in a manner substantially identical to that previously described.

*Section 4.—A call from subscriber substation T in the central office A to the subscriber substation T2 in the satellite office B1*

In extending a call from the subscriber substation T in the central office A to the subscriber substation T2 in the satellite office B1, the subscriber at the calling subscriber substation T first initiates the call and dials the directory number 412111. This call may be extended from the calling subscriber substation T via the subscriber line 601 and the finder 604 to the first selector 605; and the first selector 605 may respond to the first digit 4 to select the trunk 622 extending to the second selector 700. The second selector 700 may respond to the second digit 1 followed by the third digit 2 to select the trunk 801 extending to the repeater 800, in order to cause the repeater 800 to seize the incoming selector 400 over the trunk line 802, all in the manner described in Section 3. However, in this case, since the third digit is 2, the cam shaft 713 of the rotary switch 710 occupies its fourth position at the conclusion of the third digit 2, whereby the cam C4 closes the set of switch springs S4. Hence in the present example, when the switch-through relay F740 operates, it completes, at the contacts 742, a path for applying ground potential to the negative line wiper of the upper wiper set of the Strowger mechanism 701. This path, when completed, includes the switch S4, the resistor 719, the contacts 771, 742, 745 and the contacts 2 of the switch S3. Also upon operating, the switch-through relay R740 effects the restoration of the hold relay R765 shortly thereafter and the consequential restoration of the cam relay R770. Upon restoring, the cam relay R770 interrupts, at the contacts 771, the above-traced path for applying ground potential to the negative line wiper of the upper wiper set of the Strowger mechanism 701, whereby this application of ground potential to the negative line wiper of the upper wiper set of the Strowger mechanism 701 is momentary.

This momentary application of ground potential to the negative line wiper of the upper wiper set of the Strowger mechanism 701 is applied to the negative line conductor of the trunk 801 so that the upper winding of the test relay R840 and the line relay R850 are momentarily energized while the lower windings thereof are short-circuited. Accordingly, the trunk 801 is momentarily unbalanced, effecting momentary operation of the test relay R840, as it is of the differential type. Upon operating, the test relay R840 completes, at the contacts 842, a circuit, including the contacts 858, for operating the cutoff relay R830, whereby the latter relay is held in its operated position, effecting operation of the cutoff relay R835 shortly thereafter. As the test relay R840 is operated and then restored, it completes and then interrupts, at the contacts 841, a path, including the contacts 851, for applying ground potential to the negative line conductor of the trunk line 802, whereby the upper and lower windings of the wiper switch relay R460 and the line relay R430 in the incoming selector 400 are momentarily energized, while the lower windings thereof are momentarily short-circuited. Thus the trunk line 802 is momentarily unbalanced, effecting operation of the wiper switch relay R460 as it is of the differential type. Upon operating, the wiper switch relay R460 completes, at the contacts 461, a circuit, including the contacts 426, for operating the wiper switch relay R410. Upon operating, the wiper switch relay R410 completes, at the contacts 417, a holding circuit, including the contacts 426, for energizing the winding thereof. Also the wiper switch relay R410 interrupts, at the contacts 411, 413 and 415, the normal connections to the upper wiper set of the Strowger mechanism 490; and completes, at the contacts 412, 414 and 416, corresponding connections to the lower wiper set of the Strowger mechanism 490.

When the fourth digit 1 is dialed at the calling subscriber substation T, the repeater 800 responds and repeats to the incoming selector 400, whereby the incoming selector 400 responds to the fourth digit 1 to select the group of trunks, including the trunk 491, and the group of trunks, including the trunk 492. However, in the present instance, since the wiper switch relay R410 occupies its operated position, only the group of trunks, including the trunk 492, is tested by the test relay R480 in the subsequent rotary movement of the Strowger mechanism 490. In the present example, the Strowger mechanism 490 may select the particular trunk 492 extending to the connector 327, whereupon the test relay R480 operates, effecting operation of the switch-through relay R470 so that the loop circuit from the repeater 800 is extended into the connector 327. The fifth digit 1 and the sixth digit 1 are received by the repeater 800 and repeated to the connector 327, whereby the connector 327 is operated to select the subscriber line 303 extending to the called substation T2. The subsequent operation of the connector 327 is dependent upon the idle or busy condition of the called subscriber substation T2 in a conventional manner. For the present purposes, it may be assumed that the called subscriber substation T2 is idle at this time, so that when the call is answered thereat, a connection is completed between the calling subscriber substation T and the called subscriber substation T2. The subsequent release of the apparatus involved in this established connection is substantially identical to that previously described in Section 3.

Recapitulating, it will be understood that the character of the third digit 2 transmitted to the second selector 700 determines that the trunk 801 is momentarily unbalanced and consequently that the trunk line 802 is momentarily unbalanced, which circumstance determines that the lower wiper set of the Strowger mechanism 490 in the incoming selector 400 is to be employed in extending the connection therefrom when the incoming selector 400 subsequently responds to the fourth digit 1.

*Section 5.—A call from the subscriber substation T in the central office A to the subscriber substation T3 in the satellite office C1*

In extending a call from the subscriber substation T in the central office A to the subscriber substation T3 in the satellite office C1, the subscriber at the calling subscriber substation T first initiates the call and dials the directory number 413111. This call may be extended from the calling subscriber substation T via the subscriber line 601 and the finder 604 to the first selector 605; and the first selector 605 may respond to the first digit 4 to select the trunk 622 extending to the second selector 700. The second selector 700 then responds to the second digit 1 to select the group of trunks, including the trunk 801, and the group of trunks, including the trunk 810. The second selector 700 then receives the third digit 3, whereby the rotary magnet M711 of the rotary switch 710 is operated to drive the cam shaft 713 into its fifth position. When the cam shaft 713 is thus driven into its fifth position, the cam C3 operates the switch S3, whereby the contacts 2, 4, 6 and 8 thereof are opened and the contacts 1, 3, 5 and 7 thereof are closed. More particularly, the switch S3 is operated to interrupt the normal connections to the upper wiper set of the Strowger mechanism 701, at the contacts 2, etc., thereof; and to complete connections to the lower wiper set of the Strowger mechanism 701, at the contacts 1, etc., thereof. Accordingly, in the present example, the lower wiper set of the Strowger mechanism 701 is selected in order effectively to select the group of trunks, including the trunk 810.

At the conclusion of the third digit 3, the rotary magnet M703 of the Strowger mechanism 701 is operated in order to test the trunks in the group, including the trunk 810. In this case, the test relay R725 is again employed; and the test circuit extends from ground potential via the contacts 772' and 757, the winding of the test relay R725 and the contacts 5 of the switch S3 to the control wiper of the lower wiper set. Assuming that the trunk 810 is the first idle trunk in this group, when it is selected by the lower wiper set of the Strowger mechanism 701, the test relay R725 is operated. Upon operating, the test relay R725 interrupts, at the contacts 727, the previously traced circuit for operating the rotary magnet M703 of the Strowger mechanism 701, and effects operation of the switch-through relay R740. The switch-through relay R740 effects the restoration of the line relay R760; and completes, at the contacts 745 and 747, the connection between the line conductors of the trunk 622 and the line wipers of the lower wiper set of the Strowger mechanism 701, and consequently a connection to the line conductors of the trunk 810, extending to the repeater 809; whereupon the repeater 809 seizes the incoming selector 323 over the trunk line 811.

The fourth digit 1, the fifth digit 1 and the sixth digit 1 are subsequently dialed at the calling subscriber substation T and repeated by the repeater 809 over the trunk line 811 in a manner similar to that described in Section 3. The incoming selector 323 responds to the fourth digit 1 and selects an idle trunk in the group, including the trunk 335. Assuming that the incoming selector 323 selects the particular trunk 335, the connector 324 then responds to the fifth digit 1 and the sixth digit 1 to select the subscriber line 305 extending to subscriber substation T3. The subsequent operation of the connector 324 is dependent upon the idle or busy condition of the called subscriber substation T3 in a conventional manner. For the present purposes, it may be assumed that the called subscriber substation T3 is idle at this time, so that when the call is answered thereat, a connection is completed between the calling subscriber substation T and the called subscriber substation T3. The subsequent release of the apparatus involved in this established connection is substantially identical to that previously described in Section 3.

Recapitulating, it will be understood that the character of the third digit 3 transmitted to the second selector 700 determines that the lower wiper set of the Strowger mechanism 701 is selected and consequently determines the selection of the trunk in the group, including the trunk 810, whereby the connection is extended to the incoming selector 323 in the satellite office C1.

*Section 6.—A call from the subscriber substation T in the central office A to the subscriber substation T4 in the satellite office C1*

In extending a call from the subscriber substation T in the central office A to the subscriber substation T4 in the satellite office C1, the subscriber at the calling subscriber substation T first initiates the call and dials the directory number 414111. This call may be extended from the calling subscriber substation T via the subscriber line 601 and the finder 604 to the first selector 605; and the first selector 605 may respond to the first digit 4 to select the trunk 622 extending to the second selector 700. The second selector 700 then responds to the second digit 1 to select the group of trunks, including the trunk 801, and the group of trunks, including the trunk 810. The second selector 700 then receives the third digit 4, whereby the rotary magnet M711 of the rotary switch 710 is operated to drive the cam shaft 713 into its sixth position. When the cam shaft 713 is thus driven into its sixth position, the cam C3 operates the switch S3 and also the cam C4 operates the switch S4. The cam C3 operates the switch S3 to select the lower wiper set of the Strowger mechanism 701, in the manner explained in Section 5; and the switch S4 is closed for the purpose of unbalancing the trunk ultimately selected in the manner described in Section 4.

Accordingly, in the present example, at the conclusion of the third digit 4, the wiper shaft of the Strowger mechanism 701 is rotated, whereby the trunks in the group, including the trunk 810, are tested; and it may be again assumed that the second selector 700 selects the trunk 810 extending to the repeater 809, so that the repeater 809 seizes the incoming selector 323 over the trunk line 811. Incident to the seizure of the trunk 810, the switch-through relay R740 in the second selector 700 effects momentary unbalancing of the trunk 810, whereby the repeater 809 effects momentary unbalancing of the trunk line 811, so that the wiper switch relay in the incoming selector 323 is operated to select the lower wiper set of the Strowger mechanism incorporated therein, in the manner explained in Section 4.

The fourth digit 1, the fifth digit 1 and the sixth digit 1 are subsequently dialed at the calling subscriber substation T and repeated by the repeater 809 over the trunk line 811, in a manner similar to that described in Section 3. The incoming selector 323 responds to the fourth digit 1 and selects an idle trunk in the group, including the trunk 336. Assuming that the incoming selector 323 selects the particular trunk 336, the connector 325 then responds to the fifth digit 1 and the sixth digit 1 to select the subscriber line 307 extending to the called subscriber substation T4. The subsequent operation of connector 325 is dependent upon the idle or busy condition of the called subscriber substation T4 in a conventional manner. For the present purposes, it may be assumed that the called subscriber substation T4 is idle at this time so that when the call is answered thereat, a connection is completed between the calling subscriber substation T and the called subscriber substation T4. The subsequent release of the apparatus involved in this established connection is substantially identical to that previously described in Section 3.

Recapitulating, it will be understood that the character of the third digit 4 transmitted to the second selector 700 determines that the lower wiper set of the Strowger mechanism 701 is selected and consequently determines the selection of the trunk in the group, including the trunk 810, whereby the connection is extended to the incoming selector in the satellite office C1, and also determines that the trunk 810 is momentarily unbalanced and consequently that the trunk line 811 is momentarily unbalanced, which circumstance determines that the lower wiper set of the Strowger mechanism in the incoming selector 323 is to be employed in extending the connection therefrom when the incoming selector 323 subsequently responds to the fourth digit 1.

*Section 7.—A call from the subscriber substation T in the central office A to the subscriber substation T5 in the satellite office D1*

In extending a call from the subscriber substation T in the central office A to the subscriber substation T5 in the satellite office D1, the subscriber at the calling subscriber substation T first initiates the call and dials the directory number 421111. This call may be extended from the calling subscriber substation T via the subscriber line 601 and the finder 604 to the first selector 605; and the first selector 605 may respond to the first digit 4 to select the trunk 622, extending to the second selector 700. The second selector 700 then responds to the second digit 2, to drive the wiper shaft in the vertical direction two steps, whereby the group of 20 trunks, including the trunks 804 and 807, is selected.

More particularly, when the wiper shaft of the Strowger mechanism 701 is driven two steps in the vertical direction away from its normal vertical position, the set of N. P. springs S708 is operated to complete a circuit for operating the normal post relay R790. Upon operating, the normal post relay R790 completes, at the contacts 793, a connection between the winding of the test relay R730 and the control wiper of the lower wiper set of the Strowger mechanism 701; while a normal connection is already completed between the control wiper of the upper wiper set of the Strowger mechanism 701 and the winding of the test relay R725. Thus in this case, the test relays R725 and R730 are respectively connected to the control wipers of the upper and lower wiper sets of the Strowger mechanism 701. Also the normal post relay R790 prepares, at the contacts 798, an alternative circuit for operating the rotary magnet M703 of the Strowger mechanism 701.

At the conclusion of the second digit 2, the line relay R760 is retained in its operated position, retaining operated the hold relay R765 and effecting restoration of the dial relay R780 shortly thereafter, the latter relay being of the slow-to-release type. Upon restoring, the dial relay R780 completes, at the contacts 783, a circuit, including the contacts 704, 798, 779, 752′, 744′, 727, 732, and 773′, for operating the rotary magnet M703, whereby the latter magnet operates buzzer fashion by virtue of the inclusion of the contacts 704 thereof in the operating circuit thereof. In the present example, at each step of the rotary magnet M703 of the Strowger mechanism 701, the upper wiper set selects one of the trunks in the group, including the trunk 804, and the lower wiper set selects one of the trunks in the group, including the trunk 807, whereby the two trunks thus simultaneously selected are respectively tested by the test relays R725 and R730. In the event of an idle trunk only before the upper wiper set, the test relay R725 is operated; and in the event of an idle trunk only before the lower wiper set, the test relay R730 is operated; and in the event of an idle trunk before the upper wiper set and an idle trunk before the lower wiper set, both of the test relays R725 and R730 tend to operate; and whichever of the test relays R725 or R730 first completely operates prevents complete operation of the other of the test relays. For example, in the event the test relay R725 first completely operates, the switch-through relay R740 is operated to interrupt, at the contacts 749, a point in the test circuit including the test relay R730; and on the other hand, in the event the test relay R730 first completely operates, the switch-through relay R750 is operated to interrupt, at the contacts 757, a point in the test circuit including the test relay R725. Thus in the event of operation of the switch-through relay R740, the trunk 622 is connected to the upper wiper set of the Strowger mechanism 701; and in the event of operation of the switch-through relay R750 the trunk 622 is connected to the lower wiper set of the Strowger mechanism 701. It may be assumed that the trunk 804 and the trunk 807 are paired so that they are simultaneously selected by the respective upper and lower wiper sets of the Strowger mechanism 701; and it may further be assumed that, in the present example, the trunk 804 of the pair is tested as being idle and is thus selected by the second selector 700. Selection of the trunk 804 by the second selector 700 causes the repeater 803 to seize the incoming selector 1200 over the trunk line 805; and it will be understood that selection of the trunk 807 by the second selector 700 causes the repeater 806 to seize the incoming selector 1260 over the trunk line 808. The subsequent operation of the incoming selector 1200, as described below, is the same as that of the incoming selector 1260, and operation of the incoming selector 1260 will not be pursued in the interest of brevity.

At this time, the second selector 700 has switched through completing a loop circuit between the calling subscriber substation T and the repeater 803, and the repeater 803 has completed a loop circuit therefrom to the upper and lower windings of the line relay R1235 in the incoming selector 1200, causing the latter relay to operate. Upon operating, the line relay R1235 completes, at the contacts 1236, a circuit for operating the hold relay R1230. Upon operating, the hold relay R1230 completes, at the contacts 1234, a circuit for operating the cam relay R1225, this circuit including the cam springs S1209. Upon operating, the cam relay R1225 completes, at the contacts 1229, a circuit, including the contacts 1252, 1241′, 1223, 1204, the contacts 2 of the switch S2 and the contacts 6 of the switch S1, for illuminating the permanent lamp L1216, in order to indicate that the incoming selector 1200 has been seized but has not been operated at this time.

When the third digit 1 is dialed, the repeater 803 follows, repeating over the trunk line 805 to the line relay R1235 in the incoming selector 1200, causing the latter relay to follow, interrupting and then recompleting, at the contacts 1236, the circuit for retaining operated the hold relay R1230, whereby the latter relay is retained operated during impulsing as it is of the slow-to-release type. Also the line relay R1235 completes and then interrupts, at the contacts 1237, a circuit for energizing in multiple, the winding of the dial relay R1220 and the vertical magnet M1202 of the Strowger mechanism 1201. This circuit extends from ground by way of contacts 1249, 1237, 1232, to the contacts 1 of the switch S2, and thence by way of the winding of the dial relay R1220 to battery, and thence by way of the contacts 2 of the switch S1 and the vertical magnet M1202 to battery. When the winding of the dial relay R1220 is thus energized, the latter relay operates to complete, at the contacts 1222, a holding circuit for energizing the winding thereof; and the dial relay R1220 remains in its operated position during impulsing as it is of the slow-to-release type. Also, upon operating, the dial relay R1220 completes at the contacts 1221, a circuit, including the contacts 7 of the switch S1, for energizing the rotary magnet M1211 of the rotary switch 1210, causing the latter magnet to operate in order to condition the cam shaft 1213 to be driven away from its first or normal position. In response to the third digit 1, the vertical magnet M1202 operates and then restores driving the wiper shaft of the Strowger mechanism 1201, one step in the vertical direction, whereby the upper wiper set selects the group of trunks, including the trunk 1193, and the lower wiper set selects the group of trunks, including the trunk 1191.

At the conclusion of the third digit 1, the line relay R1235 is retained in its operated position, retaining operated the hold relay R1230 and effecting restoration of the dial relay R1220 shortly thereafter, the dial relay R1220 being of the slow-to-release type. Also when the wiper shaft of the Strowger mechanism 1201 was driven away from its normal vertical position, the sets of V. O. N. springs S1207 and S1208 were operated respectively into their open and closed positions. Upon restoring, the dial relay R1220 interrupts, at the contacts 1221, the circuit for energizing the rotary magnet M1211 of the rotary switch 1210, whereby the rotary magnet M1211 restores, driving the cam shaft 1213 away from its first or normal position into its second position. When the cam shaft 1213 is thus driven into its second position, the cam C1 operates the switch S1, whereby the contacts 1, 2, 4, 6 and 7 of the switch S1 are opened and the contacts 3, 5 and 8 of the switch S1 are closed. When the switch S1 is thus operated, there is interrupted, at the contacts 6 thereof, the previously traced circuit for illuminating the permanent lamp L1216 in order to indicate that the incoming selector 1200 has been operated away from its normal vertical position; there is interrupted at the contacts 2 thereof, a further point in the circuit for operating the vertical magnet M1202 of the Strowger mechanism 1201; and there is prepared, at the contacts 3 thereof, an alternative circuit for operating the rotary magnet M1211 of the rotary switch 1210.

The line relay R1235 follows the fourth digit 1, retaining operated the hold relay R1230 and effecting operation of the dial relay R1220 in the manner previously explained. In this instance, the rotary magnet M1211 of the rotary switch 1210 is energized in multiple with the winding of the dial relay R1220, the circuit extending from ground by way of the contacts 1249, 1237 and 1232 to the contacts 1 of the switch S2, and thence by way of the winding of the dial relay R1220 to battery, and thence by way of the contacts 3 of the switch S1 and the rotary magnet M1211 to battery. Accordingly, the dial relay R1220 is operated and is retained operated during impulsing as it is of the slow-to-release type; and the rotary magnet M1211 of the rotary switch 1210 follows the fourth digit 1. Specifically, the rotary magnet M1211 operates and then restores in accordance with the single impulse of the fourth digit 1, whereby the cam shaft 1213 is driven from its second position into its third position causing the cam C2 to operate the switch S2. More particularly, the switch S2 opens the contacts 1 and 2 thereof and closes the contacts 3 thereof. When the contacts 1 of the switch S2 are thus opened, a further point in the circuit for energizing the rotary magnet M1211 and the winding of the dial relay R1220 in multiple is interrupted; and at the contacts 3 of the switch S2 there is prepared a circuit for operating the rotary magnet M1203 of the Strowger mechanism 1201.

At the conclusion of the fourth digit 1, the line relay R1235 is retained in its operated position, retaining operated the hold relay R1230 and causing restoration of the dial relay R1220 shortly thereafter, the dial relay R1220 being of the slow-to-release type. Upon restoring, the dial relay R1220 completes, at the contacts 1223, a circuit, including the contacts 1229, 1252, 1241', 1204 and the contacts 3 of the switch S2, for operating the rotary magnet M1203 of the Strowger mechanism 1201. More particularly, the rotary magnet M1203 operates buzzer fashion by virtue of the inclusion of the contacts 1204 thereof in the operating circuit thereof; whereby the wiper shaft of the Strowger mechanism 1201 is driven step by step in the rotary direction. In the present instance, the cam C3 carried by the cam shaft 1213 retains the switch S3 in its normal position, whereby the upper wiper set of the Strowger mechanism 1201 is selected so that only the trunks in the group, including the trunk 1193, are tested by the control wiper of the upper wiper set. More particularly, when a trunk in the group, including the trunk 1193, is selected, a test is performed by the test relay R1250 in order to determined the idle or busy condition thereof, ground potential being present upon the control conductor of the trunk in the event it is busy, and battery potential being present upon the control conductor of the trunk in the event it is idle. The presence of ground potential upon the control conductor of a selected trunk completes a path, including the contacts 1227, the contacts 6 of the switch S3 and the control wiper of the upper wiper set, for short-circuiting the winding of the test relay R1250. On the other hand, the presence of battery potential upon the control conductor of a selected trunk completes a circuit substantially identical to that traced above for energizing the winding of the test relay R1250 in order to cause the latter relay to operate. Assuming that the trunk 1193 is the first idle trunk in the previously selected group, when this trunk is selected by the upper wiper set of the Strowger mechanism 1201, the abovementioned circuit for energizing the winding of the test relay R1250 is completed, causing the latter relay to operate and interrupt, at the contacts 1252, the previously traced circuit for operating the rotary magnet M1203 of the Strowger mechanism 1201, whereby further driving of the wiper shaft of the Strowger mechanism 1201 is arrested. The trunk 1193 is marked as idle to the upper wiper set of the Strowger mechanism 1201 via a path including the control conductor thereof, as well as the contacts 1163 and the upper winding of the transfer relay R1155 in the connector 1100 having battery potential connected thereto. Also upon operating, the test relay R1250 completes, at the contacts 1251, a circuit for operating the switch-through relay R1240. Upon operating, the switch-through relay R1240 completes, at the contacts 1248, a holding circuit, including the contacts 1231, for energizing the winding thereof; completes at the contacts 1247, a path, including the contacts 1231 and the contacts 6 of the switch S3, for applying ground potential to the control wiper of the upper wiper set of the Strowger mechanism 1201 and consequently to the control conductor of the trunk 1193. This application of ground potential to the control conductor of the trunk 1193 completes a circuit, including the contacts 1163, for energizing the upper winding of the transfer relay R1155, in the connector 1100 in order to cause the latter relay to operate. Also the switch-through relay R1240 interrupts, at the contacts 1243 and 1245, the loop circuit extending to the line relay R1235, in order to cause the line relay R1235 to restore; and completes, at the contacts 1244 and 1246, a connection between the line conductors of the trunk line 805 and the line wipers of the upper wiper set of the Strowger mechanism 1201 via the contacts 2 and 4 of the switch S3. This circuit is extended via the line conductors of the trunk 1193, the contacts 1182 and 1184, the upper and lower windings of the wiper switch relay R1175 and the upper and lower windings of the line relay R1170 respectively to battery and ground potentials. Thus the loop circuit from the repeater 803 is forwarded into the connector 1100, causing the line relay R1170 to operate. In passing, it is noted that the wiper switch relay R1175 is not operated in the present instance, as it is of the differential type. Upon operating the line relay R1170 completes, at the contacts 1171, a circuit for operating the hold relay R1165. Upon operating, the hold relay R1165 completes, at the contacts 1167, a multiple path for applying ground potential to the control conductor of the trunk 1193 in order to complete a multiple holding circuit for retaining operated the switch-through relay R1240 in the incoming selector 1200, and further to mark the trunk 1193 as busy to the other incoming selectors having access thereto.

Continuing now with the operation of the incoming selector 1200, the switch-through relay R1240 interrupts, at the contacts 1249, the circuit for retaining operated the hold relay R1230 in order to cause the latter relay to restore shortly thereafter, it being of the slow-to-release type. Further, the switch-through relay R1240 completes, at the contacts 1247, a path, including the contacts 1227 and 1231, for short-circuiting the winding of the test relay R1250, in order to cause the latter relay to restore. Upon restoring, the hold relay R1230 interrupts, at the contacts 1234, the circuit for retaining operated the cam relay R1225.

The fifth digit 1 and the sixth digit 1 dialed at the calling subscriber substation T are received by the repeater 803 and repeated over the trunk line 805 to the line relay R1170 in the connector 1100. The line relay R1170 follows the fifth digit 1, interrupting and then recompleting, at the contacts 1171, the circuit for retaining operated the hold relay R1165, whereby the latter relay is retained operated during impulsing, as it is of the slow-to-release type. Also the line relay R1170 completes and then interrupts, at the contacts 1172, a multiple circuit, including the contacts 1168 and 1156, for energizing the lower winding of the transfer relay R1155 and the vertical magnet M1102 of the Strowger mechanism 1101. Thus the transfer relay R1155 is retained in its operated position during impulsing, as it is of the slow-to-release type; and the vertical magnet M1102 is operated and then restored in order to drive the wiper shaft of the Strowger mechanism 1101 one step in the vertical direction, so that the upper wiper set thereof selects the group of subscriber lines, including the subscriber line 1109, and the lower wiper set thereof selects the group of subscriber lines, including the subscriber line 1111. In the present instance, the wiper switch relay R1175 was not operated via the trunk 1193 incident to seizure thereof by the incoming selector 1200, whereby the wiper switch relay R1120 occupies its restored position so that the upper wiper set of the Strowger mechanism 1101 is selected effecting the selection of the group of subscriber lines, including the subscriber line 1109.

When the wiper shaft of the Strowger mechanism is driven in the vertical direction one step away from its normal vertical position, a set of V. O. N. springs S1104 is operated to effect operation of the V. O. N. relay R1160. Upon operating, the V. O. N. relay R1160 completes, at the contacts 1161 and 1162, paths for short-circuiting the upper and lower windings of the wiper switch relay R1175 in order to improve dialing over the trunk 1193 to the line relay R1170; and interrupts, at the contacts 1163, the circuit for energizing the upper winding of the transfer relay R1155. At the conclusion of the fifth digit 1, the line relay R1170 is retained in its operated position retaining operated the hold relay R1165 and effecting restoration of the transfer relay R1155 shortly thereafter, the transfer relay R1155 being of the slow-to-release type. Upon restoring, the transfer relay R1155 prepares, at the contacts 1157, a point in a circuit traced hereinafter for operating the rotary magnet M1103 of the Strowger mechanism 1101.

When the sixth digit 1 is dialed, the line relay R1170 follows retaining operated the hold relay R1165 in the manner previously explained. Also the line relay R1170 restores and then reoperates completing and then interrupting, at the contacts 1172, the previously mentioned circuit, including the contacts 1168, 1157, 1149 and 1137, for operating the rotary magnet M1103 of the Strowger mechanism 1101, and a multiple circuit for energizing the winding of the control relay R1140; the control relay R1140 operates and remains operated during impulsing as it is of the slow-to-release type; and the rotary magnet M1103 operates and then restores driving the wiper shaft of the Strowger mechanism 1101 one step in the rotary direction so that the upper wiper set thereof selects the subscriber line 1109 extending to the called subscriber substation T5.

At the conclusion of the sixth digit 1, the line relay R1170 is retained in its operated position retaining operated the hold relay R1165 and interrupting, at the contacts 1172, the multiple circuit for operating the rotary magnet M1103 of the Strowger mechanism 1101 and for energizing the winding of the control relay R1140. However the control relay R1140 does not immediately restore as it is of the slow-to-release type.

The subsequent operation of the connector 1100 depends upon the idle or busy condition of the called subscriber substation T5 at this time, ground potential being present upon the control conductor of the subscriber line 1109 in the event the called subscriber substation T5 is busy at this time, and battery potential being present upon the control conductor of the subscriber line 1109 in the event the subscriber substation T5 is idle at this time.

First assuming that the called subscriber substation T5 is busy at this time, ground potential appearing upon the control conductor of the subscriber line 1109 is applied to the control wiper of the upper wiper set completing a circuit, including the contacts 1125 and 1142, for operating the busy test relay R1145. Upon operating, the busy test relay R1145 prepares, at the contacts 1148, a holding circuit for energizing the winding thereof; which holding circuit is completed, at the contacts 1143, incident to the restoration of the control relay R1140. Also the busy test relay R1145 completes, at the contacts 1146, a connection between the busy conductor C1106 and one of the line conductors of the trunk 1193, whereby busy-tone is returned to the calling subscriber substation T. In this case the subscriber at the calling subscriber substation T disconnects effecting the release of the apparatus in a manner substantially identical to that described hereinafter.

Now assuming that the called subscriber substation T5 is idle when the subscriber line 1109 is selected by the upper wiper set of the Strowger mechanism 1101, there is completed a path substantially identical to that previously traced for short-circuiting the winding of the busy test relay R1145 in order to prevent operation thereof. Shortly thereafter upon the restoration of the control relay R1140, there is completed, at the contacts 1141, a circuit, including the contacts 1147 and 1166, for energizing the upper winding of the switch-through relay R1130 in order to cause the latter relay to operate. Upon operating, the switch-through relay R1130 completes, at the contacts 1134, a holding circuit, including the contacts 1166′, for energizing the lower winding thereof in series with the control relay R1140, whereby the switch-through relay R1130 is retained in its operated position, but the control relay R1140 is not reoperated as it is also of the marginal type. Further the switch-through relay R1130 completes, at the contacts 1133, a path, including the contacts 1125, for applying ground potential to the control wiper of the upper wiper set and consequently to the control conductor of the subscriber line 1109, in order to effect operation of the line circuit 1110, whereby the subscriber line 1109 is marked as busy to the other connectors having access thereto. Finally, the switch-through relay R1130 completes, at the contacts 1131 and 1132, a path for projecting ringing current from the generator conductor C1187 over the subscriber line 1109. Specifically, ground potential is applied, via the contacts 1153, 1132, 1123, to one of the line wipers of the upper wiper set; and battery potential is applied, via the generator conductor C1187, the upper winding of the ring cutoff relay R1150 and the contacts 1151, 1131 and 1121, to the other line wiper of the upper wiper set. Thus the ringing current is projected over the subscriber line 1109, effecting operation of the ringer at the called subscriber substation T5. When the call is answered at the called subscriber substation T5, a substantially identical low resistance circuit is completed for energizing the upper winding of the ring cutoff relay R1150, in order to cause the latter relay to operate shortly thereafter, it being of the combination slow-to-operate and slow-to-release type. Upon operating, the ring cutoff relay R1150 completes, at the contacts 1151′, a holding circuit, including the contacts 1133, for energizing the lower winding thereof; and interrupts, at the contacts 1151 and 1153, the above-traced circuit for projecting ringing current over the subscriber line 1109. Finally, the ring cutoff relay R1150 completes, at the contacts 1152 and 1154, a connection between the line conductors of the subscriber line 1109 and the upper and lower windings of the answer relay R1180; this connection, including the line wipers of the upper wiper set, the contacts 1121, 1123, 1131, 1132, 1152 and 1154. When the answer relay R1180 is thus energized, it operates to reverse, at the contacts 1182, 1181, 1184 and 1183, the polarity of the loop circuit extending between the repeater 803 and the upper and lower windings of the line relay R1170; which reversal of polarity of the loop circuit, including the trunk line 805, may be employed in the repeater 803 for metering purposes in a conventional manner. Further, the answer relay R1180 completes, at the contacts 1185, a multiple circuit for energizing in series the lower winding of the switch-through relay R1130 and the winding of the control relay R1140 in order to insure that the switch-through relay R1130 is retained in its operated position, rendering the connector 1100 of the last-party-to-release type. At this time, an established connection is completed between the calling subscriber substation T and the called subscriber substation T5.

At the conclusion of the established connection, the subscribers at the calling subscriber substation T and at the called subscriber substation T5 disconnect. When the subscriber at the calling subscriber substation T disconnects, the loop circuit extending therefrom to the repeater 803 is interrupted effecting the release of the repeater 803, the second selector 700, the first selector 605 and the finder 604 in a manner substantially identical to that described in Section 3. When the repeater 803 is thus released, the loop circuit extending therefrom via the trunk line 805 to the line relay R1170 in the connector 1100 is interrupted causing the latter relay to restore. Upon restoring, the line relay R1170 interrupts, at the contacts 1171, the circuit for retaining operated the hold relay R1165 in order to cause the latter relay to restore shortly thereafter, it being of the slow-to-release type. Upon restoring, the hold relay R1165 interrupts, at the contacts 1167, the path for applying ground potential to the control conductor of the trunk 1193, thereby to interrupt the holding circuit for retaining operated the switch-through relay R1240 in the incoming selector 1200.

Upon restoring, the switch-through relay R1240 in the incoming selector 1200 completes, at the contacts 1249, a circuit, including the contacts 1237, 1233, contacts 5 of the switch S1 and the contacts 1212, for operating the rotary magnet M1211 of the rotary switch 1210, whereby the latter magnet operates buzzer fashion by virtue of the inclusion of the contacts 1212 thereof in the operating circuit thereof. More particularly, the rotary magnet M1211 drives the cam shaft 1213 step by step in the rotary direction back into its first or normal position, whereby the cam C1 operates the switch S1. More specifically, the switch S1 is operated to open the contacts 3, 5 and 8 thereof and to close the contacts 1, 2, 4, 6 and 7 thereof. When the contacts 5 of the switch S1 are thus opened the circuit for operating the rotary magnet M1211 of the rotary switch 1210 is interrupted; and when the contacts 4 of the switch S1 are thus closed, a circuit, including the V. O. N. springs S1208 is completed for operating the release magnet M1206. Upon operating, the release magnet M1206 releases the wiper shaft of the Strowger mechanism 1201, causing it to be returned to its normal rotary and vertical positions. When the wiper shaft of the Strowger mechanism 1201 is thus returned to its normal vertical position, the sets of V. O. N. springs S1207 and S1208 are operated respectively into closed and opened position. The operation of the set of V. O. N. springs S1208 into its open position interrupts the circuit for operating the release magnet M1206 effecting the restoration thereof.

When the subscriber at the called subscriber substation T5 disconnects, the loop circuit extending to the answer relay R1180 in the connector 1100 is interrupted, causing the latter relay to restore. Upon restoring, the answer relay R1180 interrupts, at the contacts 1185, the holding circuit for retaining operated the switch-through relay R1130, since the hold relay R1165 now occupies its restored position interrupting, at the contacts 1166′, the multiple circuit for retaining operated the switch-through relay R1130. Upon restoring, the switch-through relay R1130 interrupts, at the contacts 1133, the holding circuit for energizing the lower winding of the ring cutoff relay R1150 in order to cause the latter relay to restore shortly thereafter, it being of the combination slow-to-operate and slow-to-release type. Further, the switch-through relay R1130 completes, at the contacts 1136, a circuit, including the contacts 1164, 1169 and 1172, for operating the release magnet M1104, whereby the wiper shaft of the Strowger mechanism 1101 is released and returned to its normal rotary and vertical positions. When the wiper shaft of the Strowger mechanism 1101 is thus released, the set of V. O. N. springs S1104 is operated to effect the restoration of the V. O. N. relay R1160. Upon restoring, the V. O. N. relay R1160 interrupts, at the contacts 1164, the circuit for energizing the release magnet M1104 of the Strowger mechanism 1101 in order to cause the latter magnet to restore. When the Strowger mechanism 1101 is thus released, ground potential is removed from the control conductor of the subscriber line 1109, whereby the line circuit 1110 is governed again to mark the subscriber line 1109 as idle to the connectors having access thereto. At this time, the established connection between the calling subscriber substation T and the called subscriber substation T5 is released and all the apparatus involved therein is completely released and available for futher use.

Reconsidering the extension of the connection from the calling subscriber substation T to the called subscriber substation T5, should the incoming selector R1200 encounter an "all trunks busy" condition in the group of trunks, including the trunk 1193, operation of the rotary magnet M1203 of the Strowger mechanism 1201 continues until the wiper shaft is driven eleven steps in the rotary direction away from its normal rotary position, whereupon the set of cam springs S1209 is operated to interrupt the circuit for retaining operated the cam relay R1225. Upon restoring, the cam relay R1225 interrupts, at the contacts 1229, the circuit for operating the rotary magnet M1203 in order to arrest further driving of the wiper shaft of the Strowger mechanism 1201 in the rotary direction; and completes, at the contacts 1228, a connection, including the contacts 8 of the switch S1, between the busy conductor C1224 and the negative line conductor of the trunk line 895, whereby busy-tone is returned to the calling subscriber substation T. The subscriber at the calling subscriber substation T disconnects, effecting the release of the operated apparatus in a manner substantially identical to that previously explained.

*Section 8.—A call from the subscriber substation T in the central office A to the subscriber substation T6 in the satellite office D1*

In extending a call from the subscriber substation T in the central office A to the subscriber substation T6 in the satellite office D1, the subscriber at the calling subscriber substation T first initiates the call and dials the directory number 421211. This call may be extended from the calling subscriber substation T via the subscriber line 601 and the finder 604 to the first selector 605; and the first selector 605 may respond to the first digit 4 to select the trunk 622, extending the second selector 700. The second selector 700 may respond to the second digit 2 to select the trunk 804 extending to the repeater 803 causing the repeater 803 to seize the incoming selector 1200 over the trunk line 895. The repeater 803 then repeats the third digit 1, the fourth digit 2, the fifth digit 1 and the sixth digit 1 over the trunk line 895. The incoming selector 1200 may respond to the third digit 1 followed by the fourth digit 2 to select the trunk 1193 extending to the connector 1100 in order to effect seizure of the connector 1100, all in the manner previously described in Section 7. However, in this case, since the fourth digit is 2, the cam shaft 1213 of the rotary switch 1210 occupies its fourth position at the conclusion of the fourth digit 2, whereby the cam C4 closes the set of switch springs S4. Hence, in the present example, when the switch-through relay R1240 operates it completed at the contacts 1241 and 1244, a path for applying ground potential to the negative line wiper of the upper wiper set of the Strowger mechanism 1201. This path when completed includes the switch S4, the resistor 1214, the contacts 1226, 1241, 1244 and the contacts 2 of the switch S3. Upon operating, the switch-through relay R1240 effects restoration of the hold relay R1230 shortly thereafter in order to effect restoration of the cam relay R1225, as previously explained. Upon restoring, the cam relay R1225 interrupts, at the contacts 1226, the above-traced path for applying ground potential to the negative line wiper of the upper wiper set, whereby the ground potential is applied to the negative line wiper of the upper wiper set only momentarily. This momentary application of ground potential to the negative line wiper of the upper wiper set of the Strowger mechanism 1201 is applied to the negative line conductor of the trunk 1193, so that the upper windings of the wiper switch relay R1175 and the line relay R1170 in the connector 1100 are momentarily energized while the lower windings thereof are short-circuited. Accordingly the trunk 1193 is momentarily unbalanced, effecting a momentary operation of the wiper switch relay R1175 at it is of the differential type. Upon operating, the wiper switch relay R1175 completes, at the contacts 1176, a circuit for operating the wiper switch relay R1120, whereby the latter relay completes, at the contacts 1127, a holding circuit, including the contacts 1166', for energizing the winding thereof. Also the wiper switch relay R1120 interrupts, at the contacts 1121, 1123 and 1125, the normal connections to the upper wiper set of the Strowger mechanism 1101; and completes, at the contacts 1122, 1124, and 1126, connections to the lower wiper set of the Strowger mechanism 1101.

The connector 1100 then responds to the fifth digit 1 and the sixth digit 1, in order to select the subscriber lines 1109 and 1111 that are paired before the respective upper and lower wiper sets of the Strowger mechanism 1101; however only the subscriber line 1111 extending to the called subscriber substation T6 is effectively selected since the wiper switch relay R1120 occupies its operated position. The subsequent operation of the connector 1100 is determined in accordance with the idle or busy condition of the called subscriber substation T6, all in the manner explained in Section 7. For the present purposes, it may be assumed that the called subscriber substation T6 is idle; and when the call is answered thereat, an established connection is completed between the calling subscriber substation T and the called subscriber substation T6. The subsequent release of the apparatus involved in this established connection is substantially identical to that previously described in Section 7.

Recapitulating, it will be understood that the character of the fourth digit 2 transmitted to the incoming selector 1200 determines that the trunk 1193 is momentarily unbalanced; which circumstance determines that the lower wiper set of the Strowger mechanism 1101 in the connector 1100 is to be employed in extending the connection therefrom when the connector 1100 subsequently responds to the fifth digit 1 and the sixth digit 1.

*Section 9.—A call from the subscriber substation T in the central office A to the subscriber substation T7 in the satellite office D1*

In extending a call from the subscriber substation T in the central office A to the subscriber substation T7 in the satellite office D1, the subscriber at the calling subscriber substation T first initiates the call and dials the directory number 421311. This call may be extended from the calling subscriber substation T via the subscriber line 601 and the finder 604 to the first selector 605; and the first selector 605 may respond to the first digit 4 to select the trunk 622, extending to the second selector 700. The second selector 700 may respond to the second digit 2 to select the trunk 804 extending to the repeater 803 causing the repeater 803 to seize the incoming selector 1200 over the trunk line 805. The repeater 803 then repeats the third digit 1, the fourth digit 3, the fifth digit 1 and the sixth digit 1 over the trunk line 805. The incoming selector 1200 then responds to the third digit 1 to select the group of trunks, including the trunk 1193, and the group of trunks, including the trunk 1191. The incoming selector 1200 then receives the fourth digit 3, whereby the rotary magnet M1211 of the rotary switch 1210 is operated to drive the cam shaft 1213 into its fifth position. When the cam shaft 1213 is thus driven into its fifth position, the cam C3 operates the switch S3, whereby the contacts 2, 4 and 6 thereof are opened and the contacts 1, 3 and 5 therefore are closed. More particularly, the switch S3 is operated to interrupt the normal connections to the upper wiper set of the Strowger mechanism 1201, at the contacts 2, etc., thereof; and to complete connections to the lower wiper set of the Strowger mechanism 1201, at the contacts 1, etc., thereof. Accordingly, in the present example, the lower wiper set of the Strowger mechanism 1201 is selected in order effectively to select the group of trunks, including the trunk 1191.

At the conclusion of the fourth digit 3, the rotary magnet M1203 of the Strowger mechanism 1201 is operated in order to test the trunks in the group, including the trunk 1191. Assuming that the trunk 1191 is the first idle trunk in this group, when it is selected by the lower wiper set of the Strowger mechanism 1201, the test relay R1250, in the incoming selector 1200 is operated, this test circuit including the contacts 5 of the switch S3 and the control wiper of the lower wiper set. Upon operating, the test relay R1250 arrests operation of the rotary magnet M1203 of the Strowger mechanism 1201 and effects operation of the switch-through relay R1240. The switch-through relay R1240 effects the restoration of the line relay R1235; and completes, at the contacts 1244 and 1246, the connection between the line conductors of the trunk line 805 and the line wipers of the lower wiper set of the Strowger mechanism 1201 and consequently a connection to the line conductors of the trunk 1191 extending to the connector 1119, whereupon the connector 1119 is seized over the trunk 1191.

The fifth digit 1 and the sixth digit 1 are received by the connector 1119, whereby the connector 1119 operates to select the subscriber line 1113 extending to the subscriber substation T7. The subsequent operation of the connector 1119 is dependent upon the idle or busy condition of the called subscriber substation T7. For the present purposes, it may be assumed that the called subscriber substation T7 is idle at this time, so that when the call is answered thereat, a connection is completed between the calling subscriber substation T and the called subscriber substation T7. The subsequent release of the apparatus involved in this established connection is substantially identical to that previously described in Section 7.

Recapitulating, it will be understood that the character of the fourth digit 3 transmitted to the incoming selector 1200 determines that the lower wiper set of the Strowger mechanism 1201 is selected and consequently determines the selection of the trunks in the group, including the trunk 1191, whereby the connection is extended to the connector 1119 in the satellite office D1.

*Section 10.—A call from the subscriber substation T in the central office A to the subscriber substation T8 in the satellite office D1*

In extending a call from the subscriber substation T in the central office A to the subscriber substation T8 in the satellite office D1, the subscriber at the calling subscriber substation T first initiates the call and dials the directory number 421411. This call may be extended from the calling subscriber substation T via the subscriber line 601 and the finder 604 to the first selector 605; and the first selector 605 may respond to the first digit 4 to select the trunk 622 extending to the second selector 700. The second selector 700 may respond to the second digit 2 to select the trunk 804 extending to the repeater 803 causing the repeater 803 to seize the incoming selector 1200 over the trunk line 805. The repeater 803 then repeats the third digit 1, the fourth digit 4, the fifth digit 1 and the sixth digit 1 over the trunk line 805. The incoming selector 1200 then responds to the third digit 1 to select the group of trunks, including the trunk 1193, and the group of trunks, including the trunk 1191. The incoming selector then receives the fourth digit 4, whereby the rotary magnet M1211 of the rotary switch 1210 is operated to drive the cam shaft 1213 into its sixth position. When the cam shaft 1213 is thus driven into its sixth position, the cam C3 operates the switch S3 and also the cam C4 operates the switch S4. The cam C3 operates the switch S3 to select the lower wiper set of the Strowger mechanism 1201 in the manner explained in Section 9; and the switch S4 is closed for the purpose of unbalancing the trunk ultimately selected in the manner described in Section 8.

Accordingly, in the present example, at the conclusion of the fourth digit 4, the wiper shaft of the Strowger mechanism 1201 is rotated, whereby the trunks in the group, including the trunk 1191, are tested; and it may be again assumed that the incoming selector 1200 selects the trunks 1191 extending to the connector 1119. Incident to the seizure of the trunk 1191, the switch-through relay R1240 in the incoming selector 1200 momentarily unbalances the trunk 1191 so that the wiper switch relay in the connector 1119 is operated in order to select the lower wiper set of the Strowger mechanism incorporated in the connector 1119 in the manner explained in Section 8.

The fifth digit 1 and the sixth digit 1 are subsequently received by the connector 1119, whereby it operates to select the subscriber line 1115 extending to the called subscriber substation T8. The subsequent operation of the connector 1119 is dependent upon the idle or busy condition of the called subscriber substation T8. For the present purposes, it may be assumed that the called subscriber substation T8 is idle at this time, so that when the call is answered thereat, a connection is completed between the calling subscriber substation T and the called subscriber substation T8. The subsequent release of the apparatus involved in this established connection is substantially identical to that previously described in Section 7.

Recapitulating, it will be understood that the character of the fourth digit 4 transmitted to the incoming selector 1200 determines that the lower wiper set of the Strowger mechanism 1201 is selected and determines that the trunk 1191 is momentarily unbalanced in order that the lower wiper set of the Strowger mechanism in the connector 1119 is to be ultimately employed in extending the connection therefrom when the connector 1119 subsequently responds to the fifth digit 1 and the sixth digit 1.

*Section 11.—A call from the subscriber substation T in the central office A to the party subscriber substation T9 in the satellite office D1*

In extending a call from the subscriber substation T in the central office A to the party subscriber substation T9 in the satellite office D1, the subscriber at the calling subscriber substation T first initiates the call and dials the directory number 422111. This call may be extended from the calling subscriber substation T via the subscriber line 601 and the finder 604 to the first selector 605; and the first selector may respond to the first digit 4 to select the trunk 622 extending to the second selector 700. The second selector 700 may respond to the second digit 2 to select the trunk 804 extending to the repeater 803 causing the repeater 803 to seize the incoming selector 1200 over the trunk line 805. The repeater 803 then repeats the third digit 2, the fourth digit 1, the fifth digit 1 and the sixth digit 1 over the trunk line 805. The incoming selector 1200 responds to the third digit 2 to cause the wiper set to select the group of trunks, including the trunk 1306, and the lower wiper set to select the group of trunks, including the trunk 1192. The incoming selector 1200 then responds to the fourth digit 1, whereby the cam shaft 1213 of the rotary switch 1210 occupies its third position at the conclusion of the fourth digit 1. Thus the switch S3 is retained in its normal busy position selecting the upper wiper set of the Strowger mechanism 1201. Accordingly, at the conclusion of the fourth digit 1, the group of trunks, including the trunk 1306, is tested, whereby the test relay R1250 is operated when an idle trunk in this group is selected. Assuming that the trunk 1306 is the first idle trunk in this group, the test relay R1250 is operated when the upper wiper set of the Strowger mechanism 1201 selects the trunk 1306, the trunk 1306 being marked as idle by the presence of battery potential, via the upper winding of the transfer relay R1340 in the connector 1300 and the contacts 1338 upon the control conductor thereof. Accordingly, the incoming selector 1200 operates to select the trunk 1306 extending to the connector 1300, at this time.

Specifically, the switch-through relay R1240 in the incoming selector 1200 operates extending the loop circuit via the line wipers of the upper wiper set of the Strowger mechanism 1201 to the line conductors of the trunk 1306, so that the upper and lower windings of the party relay R1320 and the line relay R1325 in the connector 1300 are energized in series-circuit-relation. The line relay R1325 operates; however, the party relay 1320 does not operate as it is of the differential type. Upon operating, the line relay R1325 completes, at the contacts 1326, a circuit for operating the hold relay R1330. Upon operating, the hold relay R1330 completes, at the contacts 1332, a path for applying ground potential to the control conductor of the trunk 1306 in order to mark the trunk 1306 as busy to the incoming selectors having access thereto and to retain the incoming selector 1200 in its operated position. Also the application of ground potential to the control conductor of the trunk 1306 completes a circuit, including the contacts 1338, for energizing the upper winding of the transfer relay R1340 in order to cause the latter relay to operate.

The fifth digit 1 and the sixth digit 1 dialed at the calling subscriber substation T are received by the repeater 803 and then repeated over the trunk line 805 to the line relay R1325 in the connector 1300. The line relay R1325 follows the fifth digit 1, interrupting and then recompleting, at the contacts 1326, the circuit for retaining operated the hold relay R1330, whereby the latter relay is retained operated during impulsing as it is of the slow-to-release type. Also the line relay R1325 completes and then interrupts, at the contacts 1327, a multiple circuit, including the contacts 1333 and 1341, for energizing the lower winding of the transfer relay R1340 and the vertical magnet M1302 of the Strowger mechanism 1301. Thus the transfer relay R1340 is retained in its operated position during impulsing as it is of the slow-to-release type, and the vertical magnet M1302 is operated and then restored in order to drive the wiper shaft of the Strowger mechanism 1301 one step in the vertical direction. When the wiper shaft of the Strowger mechanism 1301 is driven one step in the vertical direction, the set of V. O. N. springs S1305 is operated to effect operation of the V. O. N. relay R1335. Upon operating, the V. O. N. relay R1335 interrupts, at the contacts 1338, the circuit for energizing the upper winding of the transfer relay R1340; and completes, at the contacts 1336 and 1337, paths for short-circuiting the upper and lower windings of the party relay R1320. In passing, it is noted that the party relay R1320 is not operated in the present instance, whereby the ring control relay R1370 is not operated. At the conclusion of the fifth digit 1, the line relay R1325 is retained in its operated position retaining operated the hold relay R1330 and effecting restoration of the transfer relay A1340 shortly therefore, the latter relay being of the slow-to-release type. Upon restoring, the transfer relay R1340 prepares, at the contacts 1342, a point in a multiple circuit traced hereinafter, for operating the control relay R1355 and the rotary magnet M1303 of the Strowger mechanism 1301.

When the sixth digit 1 is dialed, the line relay R1325 follows retaining operated the hold relay R1330 in the manner previously explained. Also the line relay R1325 restores and then reoperates completing and then interrupting, at the contacts 1327, the previously mentioned circuit, including the contacts 1333, 1342, 1354 and 1366, for operating the rotary magnet M1303 of the Strowger mechanism 1301, and a multiple circuit for energizing the winding of the control relay R1355. The control relay R1355 operates and remains operated during impulsing as it is of the slow-to-release type; and the rotary magnet M1303 operates and then restores driving the wiper shaft of the Strower mechanism 1301 one step in the rotary direction so that the wiper set thereof selects the party subscriber line 1307 extending to the party subscriber substations T9 and T10.

At the conclusion of the sixth digit 1, the line relay R1325 is retained in its operated position retaining operated the hold relay R1330 and interrupting, at the contacts 1327, the multiple circuit for operating the rotary magnet M1303 of the Strowger mechanism 1301 and for energizing the winding of the control relay R1355. However, the control relay R1355 does not immediately restore as it is of the slow-to-release type. The subsequent operation of the connector 1300 depends upon the idle or busy condition of the party subscriber line 1307, at this time, ground potential being present upon the control conductor of the party subscriber line 1307 in the event either of the party subscriber substations T9 or T10 is busy at this time; and battery potential being present upon the control conductor of the party subscriber line 1307 in the event both of the party subscriber substations T9 and T10 are idle at this time.

First assuming that one of the party subscriber substations T9 or T10 is busy at this time, ground potential appearing upon the control conductor of the party subscriber line 1307 is applied to the control wiper of the wiper set of the Strowger mechanism 1301, completing a circuit, including the contacts 1357, for operating the busy test relay R1350. Upon operating, the busy test relay R1350 prepares, at the contacts 1353, a holding circuit for energizing the winding thereof; which holding circuit is completed, at the contacts 1357', incident to the restoration of the control relay R1355, this holding circuit further including the contacts 1331. Also the busy test relay R1350 completes, at the contacts 1351, a connection between the busy conductor C1323 and one of the line conductors of the trunk 1306, whereby busy tone is returned to the calling subscriber substation T. In this case, the subscriber at the calling substation T disconnects effecting the release of the apparatus in a manner substantially identical to that described hereinafter.

Now assuming both of the party subscriber substations T9 and T10 are idle when the party subscriber line 1307 is selected by the wiper set of the Strowger mechanism 1301, there is completed a path substantially identical to that previously traced for short-circuiting the winding of the busy test relay R1350 in order to prevent operation thereof. Shortly thereafter, upon the restoration of the control relay R1355, there is completed, at the contacts 1356, a circuit, including the contacts 1331 and 1352, for energizing the upper winding of the switch-through relay R1360 in order to cause the latter relay to operate. Upon operating, the switch-through relay R1360 completes, at the contacts 1363, a holding circuit, including the contacts 1331', for energizing the lower winding thereof in series with the control relay R1355; whereby the switch-through relay R1360 is retained in its operated position but the control relay R1355 is not operated as it is also of the marginal type. Further, the switchthrough relay R1360 completes, at the contacts 1362', a path for applying ground potential to the control wiper of the wiper set and consequently to the control conductor of the party subscriber line 1307 in order to effect operation of the line circuit 1308, whereby the party subscriber line 1307 is marked as busy to the other connectors having access thereto. Finally, the switch-through relay R1360 completes, at the contacts 1361, a path for projecting ringing current over the negative line conductor of the party subscriber line 1307; and completes, at the contacts 1362, a path for applying ground potential to the positive line conductor of the party subscriber line 1307. Specifically, ringing current is projected from the generator conductor C1322 via the upper winding of the ring cutoff relay R1345, the contacts 1346, 1361 and 1371, and the negative line wiper of the wiper set over the negative line conductor of the party subscriber line 1307, operating the ringer at the party subscriber substation T9; and ground potential is applied, via the contacts 1348, 1362 and 1373, and the positive line wiper of the wiper set to the positive line conductor of the party subscriber line 1307 in order positively to prevent operation of the ringer at the party subscriber substation T10. When the call is answered at the called party subscriber substation T9, a substantially identical low-resistance circuit is completed for energizing the upper winding of the ring cutoff relay R1345, in order to cause the latter relay to operate shortly thereafter, it being of the combination slow-to-operate and slow-to-release type. Upon operating, the ring cutoff relay R1345 completes, at the contacts 1346', a holding circuit, including the contacts 1362', for energizing the lower winding thereof; interrupts, at the contacts 1346, the above-traced circuit for projecting ringing current over the negative line conductor of the party subscriber line 1307; and interrupts, at the contacts 1348, the above-traced path for applying ground potential to the positive line conductor of the party subscriber line 1307. Finally, the ring cutoff relay R1345 completes, at the contacts 1347 and 1349, a connection between the line conductors of the party subscriber line 1307 and the upper and lower windings of the answer relay R1310; this connection including the line wipers of the wiper set and the contacts 1371, 1373, 1361, 1362, 1347 and 1349. When the answer relay R1310 is thus energized, it operates to reverse, at the contacts 1311, 1312, 1313 and 1314, the polarity of the loop circuit extending between the repeater 803 and the upper and lower windings of the line relay R1325; which reversal of polarity of the loop circuit, including the trunk 805, may be employed in the repeater 803 for metering purposes in a conventional manner. Further, the answer relay R1310 completes, at the contacts 1315, a multiple circuit for energizing in series the lower winding of the switch-through relay R1360 and the winding of the control relay R1355 in order to insure that the switch-through relay R1360 is retained in its operated position, rendering the connector 1300 of the last-party-to-release type. At this time, an established connection is completed between the calling subscriber substation T and the called party subscriber substation T9.

At the conclusion of the established connection, the subscribers at the calling subscriber substation T and the called party subscriber substation T9 disconnect. When the subscribers at the calling subscriber substation T disconnect, the loop circuit extending therefrom to the repeater 803 is interrupted effecting the release of the repeater 803, the second selector 700, the first selector 605 and the finder 604, in a manner substantially identical to that described in Section 3. When the repeater 803 is thus released, the loop circuit extending therefrom via the trunk line 805 to the line relay 1325 in the connector 1300, is interrupted causing the latter relay to restore. Upon restoring, the line relay R1325 interrupts, at the contacts 1326, the circuit for retaining operated the hold relay R1330 in order to cause the latter relay to restore shortly thereafter, it being of the slow-to-release type. Upon restoring, the hold relay R1330 interrupts, at the contacts 1332, the path for applying ground potential to the control conductor of the trunk 1306, thereby to interrupt the holding circuit for retaining operated the switch-through relay R1240 in the incoming selector 1200. The incoming selector 1200 is then released in the manner explained in Section 7.

When the subscriber at the called party subscriber substation T9 disconnects, the loop circuit extending to the answer relay R1310, in the connector 1300, is interrupted causing the latter relay to restore. Upon restoring, the answer relay R1310 interrupts, at the contacts 1315, the holding circuit for retaining operated the switch-through relay R1360, since the hold relay R1330 now occupies its restored position interrupting, at the contacts 1331', the multiple circuit for retaining operated the switch-through relay R1360. Upon restoring, the switch-through relay R1360 interrupts, at the contacts 1362', the holding circuit for energizing the lower winding of the ring cutoff relay R1345 in order to cause the latter relay to restore shortly thereafter, it being of the combination slow-to-operate and slow-to-release type. Further, the switch-through relay R1360 completes, at the contacts 1365, a circuit, including the contacts 1339, 1334 and 1327, for operating the release magnet M1304, whereby the wiper shaft of the Strowger mechanism 1301 is released and returned to its normal rotary and vertical positions. When the wiper shaft of the Strowger mechanism 1301 is thus released, the set of V. O. N. springs S1305 is operated to effect the restoration of the V. O. N. relay R1335. Upon restoring, the V. O. N. relay R1335 interrupts, at the contacts 1339, the circuit for energizing the release magnet M1304 of the Strowger mechanism 1301, in order to cause the latter magnet to restore. When the Strowger mechanism 1307 is thus released, ground potential is removed from the control conductor of the party subscriber line 1307, whereby the line circuit 1308 is governed again to mark the party subscriber line 1307 as idle to the connectors having access thereto. At this time, the established connection between the calling subscriber substation T and the called party subscriber substation T9 is released and all of the apparatus involved therein is completely released and available for further use.

*Section 12.—A call from the subscriber substation T in the central office A to the subscriber substation T10 in the satellite office D1*

In extending a call from the subscriber substation T in the central office A to the party subscriber substation T10 in the satellite office D1, the subscriber at the calling subscriber substation T first initiates the call and dials the directory number 422211. This call may be extended from the calling subscriber substation T via the subscriber line 601 and the finder 604 to the first selector 605; and the first selector may respond to the first digit 4 to select the trunk 622 extending to the second selector 700. The second selector 700 may respond to the second digit 2 to select the trunk 804 extending to the repeater 803 causing the repeater 803 to seize the incoming selector 1200 over the trunk line 805. The repeater 803 then repeats the third digit 2, the fourth digit 2, the fifth digit 1 and the sixth digit 1 over the trunk line 805.

The incoming selector 1200 may respond to the third digit 2 followed by the fourth digit 2 to select the trunk 1306 extending to the connector 1300 in order to effect seizure of the connector 1300, all in the manner previously described in Section 11. However, in this case, since the fourth digit is 2, the cam shaft 1213 of the rotary switch 1210 occupies its fourth position at the conclusion of the fourth digit 2, whereby the cam C4 closes the set of switch spring S4. Hence in the present example, when the switch-through relay R1240 operates, it completes, at the contacts 1241 and 1244, a path for applying ground potential to the negative line wiper of the upper wiper set of the Strowger mechanism 1201. This path when completed includes the switch S4, the resistor 1214, the contacts 1226, 1241, 1244 and the contacts 2 of the switch S3. Upon operating, the switch-through relay R1240 effects restoration of the hold relay R1230 shortly thereafter in order to effect restoration of the cam relay R1225, as previously explained. Upon restoring, the cam relay R1225 interrupts, at the contacts 1226, the above-traced path for applying ground potential to the negative line wiper of the upper wiper set, whereby the ground potential is applied to the negative line wiper of the upper wiper set only momentarily. This momentary application of ground potential to the negative line wiper of the upper wiper set of the Strowger mechanism 1201 is applied to the negative line conductor of the trunk 1306 so that the upper windings of the party relay R1320 and the line relay R1325 are momentarily energized while the lower windings thereof are short-circuited. Accordingly, the trunk 1306 is momentarily unbalanced effecting a momentary operation of the party relay R1320 as it is of the differential type. Upon operating, the party relay R1320 completes, at the contacts 1321, a circuit for operating the ring control relay R1370, whereby the latter relay completes, at the contacts 1375, a holding circuit, including the contacts 1331', for energizing the winding thereof. Also the ring control relay R1370 reverses, at the contacts 1371, 1372, 1373 and 1374, the connections to the line wipers of the wiper set of the Strowger mechanism 1301 in the divided ringing circuit previously noted.

The connector 1300 then responds to the fifth digit 1 and the sixth digit 1 in order to select the party subscriber line 1307 extending to the party subscriber substations T9 and T10. The subsequent operation of the connector 1300 is determined in accordance with the idle or busy condition of the party subscriber substations T9 and T10, all in the manner explained in Section 11. For the present purposes, it may be assumed that the party subscriber substations T9 and T10 are idle, whereby the switch-through relay R1360 is operated in order to effect the projection of ringing current over the positive line wiper and the grounding of the negative line wiper. The projection of ringing current over the positive line wiper and the grounding of the negative line wiper effects operation of the ringer at the party subscriber substation T10 and prevents operation of the ringer at the party subscriber substation T9. When the call is subsequently answered at the called party subscriber substation T10, a connection is established between the calling subscriber substation T and the called party subscriber substation T10. The subsequent release of the apparatus involved in this established connection is substantially identical to that previously described in Section 11.

Recapitulating, it will be understood that the character of the fourth digit 2 transmitted to the incoming selector 1200 determines that the trunk 1306 is momentarily unbalanced, which circumstance determines that the party relay R1320 and the ring control relay R1370 in the connector 1300 are operated; and operation of the ring control relay R1370 governs the divided ringing circuit so that the party subscriber substation T10 is rung in preference to the party subscriber substation T9.

*Section 13.—A call from the subscriber substation T in the central office A to the party subscriber substation T11 in the satellite office D1*

In extending the call from the subscriber substation T in the central office A to the party subscriber substation T11 in the satellite office D1, the subscriber, at the calling subscriber substation T, first initiates the call and dials the directory number 422311. This call may be extended from the calling subscriber substation T via the subscriber line 601 and the finder 604 to the first selector 605; and the first selector may respond to the first digit 4 to select the trunk 622 extending to the second selector 700. The second selector 700 may respond to the second digit 2 to select the trunk 804 extending to the repeater 803 causing the repeater 803 to seize the incoming selector 1200 over the trunk line 805. The repeater 803 then repeats the third digit 2, the fourth digit 3, the fifth digit 1 and the sixth digit 1 over the trunk line 805.

The incoming selector 1200 then responds to the third digit 2 to select the group of trunks, including the trunk 1306, and the group of trunks, including the trunk 1192. The incoming selector 1200 then receives the fourth digit 3, whereby the rotary magnet M1211 of the rotary switch 1210 is operated to drive the cam shaft 1213 into its fifth position. When the cam shaft 1213 is thus driven into its fifth position, the cam C3 operates the switch S3, whereby the contacts 2, 4 and 6 thereof are opened and the contacts 1, 3 and 5 thereof are closed. More particularly, the switch S3 is operated to interrupt the normal connections to the upper wiper set of the Strowger mechanism 1201, at the contacts 2, etc., thereof; and to complete connections to the lower wiper set of the Strowger mechanism 1201, at the contacts 1, etc., thereof. Accordingly, in the present example, the lower wiper set of the Strowger mechanism 1201 is selected in order effectively to select the group of trunks including the trunk 1192.

At the conclusion of the fourth digit 3, the incoming selector 1200 is operated to select an idle trunk in the group, including the trunk 1192; and it may be assumed that the incoming selector 1200 operates to select the particular trunk 1192, extending to the connector 1120. The connector 1120 then responds to the fifth digit 1 and the sixth digit 1 to select the party subscriber line 1117 extending to the party subscriber substations T11 and T12. The subsequent operation of the connector 1120 is dependent upon the idle or busy condition of the party subscriber substations T11 and T12. For the present purposes, it may be assumed that the party subscriber substations T11 and T12 are idle at this time so that the connector 1120 operates to project ringing current over the negative line conductor of the party subscriber line 1117 and to ground the positive line conductor of the party subscriber line 1117, whereby the party subscriber substation T11 is rung in preference to the party subscriber substation T12. When the call is subsequently answered at the party subscriber substation T11, a connection is completed between the calling subscriber substation T and the called party subscriber substation T11. The subsequent release of the apparatus involved in this established connection is substantially identical to that previously described in Section 11.

Recapitulating, it will be understood that the character of the fourth digit 3 transmitted to the incoming selector 1200 determines that the Strowger mechanism 1201 lower wiper set is selected and consequently determines the selection of the trunks in the group including the trunk 1192, whereby the connection is extended to the connector 1120 in the satellite office D1.

*Section 14.—A call from the subscriber substation T in the central office A to the party subscriber substation T12 in the satellite office D1*

In extending the call from the subscriber substation T in the central office A to the party subscriber substation T12 in the satellite office D1, the subscriber at the calling subscriber substation T first initiates the call and dials the directory number 422411. This call may be extended from the calling subscriber substation T via the subscriber line 601 and the finder 604 to the first selector 605; and the first selector may respond to the first digit 4 to select the trunk 622 extending to the second selector 700. The second selector 700 may respond to the second digit 2 to select the trunk 804 extending to the repeater 803 causing the repeater 803 to seize the incoming selector 1200 over the trunk line 805. The repeater 803 then repeates the third digit 2, the fourth digit 4, the fifth digit 1 and the sixth digit 1 over the trunk line 805.

The incoming selector 1200 then responds to the third digit 2 to select the group of trunks, including the trunk 1306, and the group of trunks, including the trunk 1192. The incoming selector then receives the fourth digit 4, whereby the rotary magnet M1211 of the rotary switch 1210 is operated to drive the cam shaft 1213 into its sixth position. When the cam shaft 1213 is thus driven into its sixth position, the cam C3 operates the switch S3, and also the cam C4 operates the switch S4. The cam C3 operates the switch S3 to select the lower wiper set of the Strowger mechanism 1201 in the manner explained in Section 13; and the switch S4 is closed for the purpose of unbalancing the trunk ultimately selected in the manner described in Section 12. Accordingly, in the present example, at the conclusion of the fourth digit 4, the wiper shaft of the Strowger mechanism 1201 is rotated, whereby an idle trunk in the group, including the trunk 1192 is selected, such, for example as the trunk 1192 extending to the connector 1120. Incident to the seizure of the trunk 1192, the switch-through relay R1240 in the incoming selector 1200 momentarily unbalances the trunk 1192 so that the party relay and the ring control relay in the connector 1120 are operated so as to control the divided ringing circuit in order that ultimately the party subscriber substation T12 may be rung in preference to the party subscriber substation T11.

The fifth digit 1 and the sixth digit 1 are subsequently received by the connector 1120, whereby it operates to select the party subscriber line 1117 extending to the party subscriber substations T11 and T12. The subsequent operation of the connector 1120 is dependent upon the idle or busy condition of the party subscriber substations T11 and T12; and for the present purposes, it may be assumed that the party subscriber substations T11 and T12 are idle at this time. Thus the switch-through relay in the connector 1120 is operated effecting ringing of the party subscriber substation T12 in preference to the party subscriber substation T11, as a result of the operated position of the ring control relay in the connector 1120, as explained in Section 12. When the call is answered at the party subscriber substation T12, a connection is completed between the calling subscriber substation T and the called party subscriber substation T12. The subsequent release of the apparatus involved in this established connection is substantially identical to that previously described in Section 11.

Recapitulating, it will be understood that the character of the fourth digit 4 transmitted to the incoming selector 1200 determines that the lower wiper set of the Strowger mechanism 1201 is employed in extending the connection and that the trunk ultimately selected is momentarily unbalanced, whereby the terminating connector is preset in order to ring over the positive line conductor of the party subscriber line 1117 ultimately selected thereby in response to the fifth digit 1 and the sixth digit 1.

*Section 15.—A call from the subscriber substation T in the central office A to the subscriber substation T13 in the satellite office B2*

In extending a call from the subscriber substation T in the central office A to the subscriber substation T13 in the satellite office B2, the subscriber at the calling subscriber substation T first initiates the call and dials the directory number 511111. This call may be extended from the calling subscriber substation T via the subscriber line 601 and the finder 604 to the first selector 605; and the first selector 605 may respond to the first digit 5 to select the group of trunks, including the trunk 623. The first selector 605 then operates automatically to select an idle trunk in this group; and it may be assumed that the trunk 623 extending to the second selector 500 is selected. The trunk 623 is marked as idle to the first selector 605 by the presence of battery potential upon the control conductor thereof, the path for applying battery potential to the control conductor of the trunk 623, including the resistor 508 and the contacts 534 in the second selector 500. The first selector 605 switches through extending the loop circuit from the calling subscriber substation T to the upper and lower windings of the line relay R545 in the second selector 500, this loop circuit, including the contacts 552, 554, 564 and 566 and the line conductors of the trunk 623. When the loop circuit is thus completed, the line relay R545 operates to complete, at the contacts 547, a circuit, including the contacts 551' and 563', for operating the hold relay R540. Upon operating, the hold relay R540 completes, at the contacts 541, a path for applying ground potential to the control conductor of the trunk 623 in order to mark the trunk 623 as busy to the other first selectors having access thereto; and completes, at the contacts 542, a circuit, including the cam springs S507, for operating the cam relay R530. Upon operating, the cam relay R530 interrupts, at the contacts 534, the original path for applying battery potential to the control conductor of the trunk 623; and completes, at the contacts 532, a connection, including the contacts 527, 551 and 561 and the condenser 538 between the dial tone conductor C516 and the negative line conductor of the trunk 623, whereby the dial tone is again returned to the calling subscriber substation T.

When the second digit 1 is dialed, the line relay R545 follows interrupting and then recompleting, at the contacts 547, the circuit for retaining operated the hold relay R540, whereby the latter relay is retained operated during impulsing as it is of the slow-to-release type. Also the line relay R545 completes and then interrupts, at the contacts 546, a multiple circuit for energizing the winding of the dial relay R520 and for operating the vertical magnet M502 of the Strowger mechanism 501. When the winding of the dial relay R520 is thus energized, the latter relay operates to complete, at the contacts 522, a holding circuit for energizing the winding thereof; and the dial relay R520 remains in its operated position during impulsing as it is of the slow-to-release type. Also upon operating, the dial relay R520 completes, at the contacts 521, a circuit, including the contacts 1 of the switch S1 for energizing the rotary magnet M511 of the rotary switch 510 causing the latter magnet to operate in order to condition the cam shaft 513 to be driven away from its first or normal position. In response to the second digit 1, the vertical magnet M502 operates and then restores, driving the wiper shaft of the Strowger mechanism 501 one step in the vertical direction, whereby the upper wiper set selects the group of trunks, including the trunk 611, and the lower wiper set selects the group of trunks, including the trunk 614.

At the conclusion of the second digit 1, the line relay R545 is retained in its operated position, retaining operated the hold relay R540 and effecting restoration of the dial relay R520 shortly thereafter, the dial relay R520 being of the slow-to-release type. Also when the wiper shaft of the Strowger mechanism 501 was driven away from its normal vertical position, the set of V. O. N. springs S506 was operated in order to effect operation of the V. O. N. relay R525. Upon operating, the V. O. N. relay R525 interrupts, at the contacts 527, the path for returning dial-tone current over the trunk 623; and prepares, at the contacts 529, a circuit traced hereinafter, for operating the rotary magnet M503 of the Strowger mechanism 501. Upon restoring, the dial relay R520 interrupts, at the contacts 521, the circuit for energizing the rotary magnet M511 of the rotary switch 510, whereby the rotary magnet M511 restores, driving the cam shaft 513 away from its first or normal position into its second position. When the cam shaft 513 is thus driven into its second position, the cam C1 operates the switch S1, whereby the contacts 1, 2 and 4 of the switch S1 are opened and the contacts 3 and 5 of the switch S1 are closed. When the switch S1 is thus operated, there is interrupted, at the contacts 4 thereof, a further point in the circuit for operating the vertical magnet M502 of the Strowger mechanism 501; and there is prepared, at the contacts 5 thereof, an alternative circuit for operating the rotary magnet M511 of the rotary switch 510.

The line relay R545 follows the third digit 1, retaining operated the hold relay R540 and effecting operation of the dial relay R520 in the manner previously noted. In this instance, the rotary magnet M511 of the rotary switch 510 is energized in multiple with the winding of the dial relay R520, the circuit extending from ground by way of the contacts 563′, 551′, 546, 544, the contacts 1 of the switch S2, the contacts 5 of the switch S1 and the rotary magnet M511 to battery. Accordingly, the dial relay R520 operates and is retained operated during impulsing, as it is of the slow-to-release type and the rotary magnet M511 of the rotary switch 510 follows the third digit 1. Specifically, the rotary magnet M511 operates and then restores in accordance with the single impulse of the third digit 1, whereby the cam shaft 513 is driven from its second position into its third rotary position causing the cam C2 to operate the switch S2. More particularly, the switch S2 is operated to open the contacts 1 thereof, and to close the contacts 2 thereof. When the contacts 1 of the switch S2 are thus opened, a further point in the circuit for energizing the rotary magnet M511 and the winding of the dial relay R520 in multiple is interrupted; and at the contacts 2 of the switch S3, there is prepared, a circuit for operating the rotary magnet M503 of the Strowger mechanism 501.

At the conclusion of the third digit 1, the line relay R545 is retained in its operated position, retaining operated the hold relay R540 and causing restoration of the dial relay R520 shortly thereafter, the dial relay R520 being of the slow-to-release type. Upon restoring, the dial relay R520 completes, at the contacts 523, a circuit, including the contacts 537, 572, 582, 564′, 552′, 529, the contacts 2 of the switch S2 and the contacts 504, for operating the rotary magnet M503 of the Strowger mechanism 501. More particularly, the rotary magnet M503 operates buzzer fashion by virtue of the inclusion of the contacts 504 thereof in the operating circuit thereof, whereby the wiper shaft of the Strowger mechanism 501 is driven step by step in the rotary direction. In the present instance, the cam C3 carried by the cam shaft 513 retains the switch S3 in its normal position, whereby the upper wiper set of the Strowger mechanism 501 is selected so that only the trunks in the group, including the trunk 611, are tested by the control wiper of the upper wiper set. More particularly, when a trunk in the group, including the trunk 611, is selected, a test is performed by the test relay R580 in order to determine the idle or busy condition thereof, ground potential being present upon the control conductor of the trunk in the event it is busy and battery potential being present upon the control conductor of the trunk in the event it is idle. The presence of ground potential upon the control conductor of a selected trunk, completes a path, including the contacts 536, 537, the contacts 6 of the switch S3 and the control wiper of the upper wiper set for short-circuiting the winding of the test relay R580; on the other hand, the presence of battery potential upon the control conductor of a selected trunk, completes a circuit substantially identical to that traced above for energizing the winding of the test relay R580 in order to cause the latter relay to operate. Assuming that the trunk 611 is the first idle trunk in the previously selected group, when this trunk is selected by the upper wiper set of the Strowger mechanism 501, the above-mentioned circuit for energizing the winding of the test relay R580 is completed, causing the latter relay to operate and interrupt, at the contacts 582, the previously traced circuit for operating the rotary magnet M503 of the Strowger mechanism 501, whereby further driving of the wiper shaft of the rotary magnet 501 is arrested. Also upon operating, the test relay R580 completes, at the contacts 581, a circuit, including the contacts 572 and 537, for operating the switch-through relay R560. Upon operating, the switch-through relay R560 completes, at the contacts 562′, a holding circuit, including the control conductor of the trunk 623, for energizing the winding thereof. Also the switch-through relay R560 interrupts, at the contacts 564 and 566, the loop circuit extending to the line relay R545 in order to cause the latter relay to restore; and completes, at the contacts 565 and 567, a connection between the line conductors of the trunk 623 and the line wipers of the upper wiper set of the Strowger mechanism 501, via the contacts 2 and 4 of the switch S3. This circuit is extended via the line conductors of the trunk 611 to the repeater 610, causing the repeater 610 to seize over the trunk line 612, the incoming selector 317. Thus the loop circuit from the subscriber substation T is forwarded to the repeater 610; and a second loop circuit is forwarded from the repeater 610 to the incoming selector 317, as previously noted.

The switch-through relay R560 in the second selector 500 also completes, at the contacts 568, a connection between the control conductor of the trunk 623 and the control conductor of the trunk 611, this connection, including the contacts 6 of the switch S3 and the control wiper of the upper wiper set of the Strowger mechanism 501. Further, the switch-through relay R560 completes, at the contacts 563, a path, including the grounded control conductor of the trunk 623, for short-circuiting the winding of the test relay R580 in order to cause the latter relay to restore. Further, the switch-through relay R560 interrupts, at the contacts 563′, the circuit for retaining operated, the hold relay R540, in order to cause the latter relay to restore shortly thereafter, it being of the slow-to-release type. Upon restoring, the hold relay R540 interrupts, at the contacts 542, the circuit for retaining operated the cam relay R530. Upon restoring, the cam relay R530 re-prepares, at the contacts 534, the original path for applying battery potential via the resistor 508 to the control conductor of the trunk 623; however, without effect at this time since direct ground is applied to the control conductor of the trunk 623 via the grounded control conductor of the trunk 611 in the repeater 610. Accordingly, at this time, the second selector 500 has switched through so that the loop circuit is extended from the calling subscriber substation T to the line relay in the repeater 610.

The fourth digit 1, the fifth digit 1 and the sixth digit 1 dialed at the calling subscriber substation T are received by the repeater 610 and repeated over the trunk line 612. The fourth digit 1 effects operation of the incoming selector 317 in order to cause the upper wiper set thereof to select the group of trunks, including the trunk 331. The incoming selector 317 then operates automatically to select an idle trunk in the group noted; and may select the particular trunk 331 extending to the connector 318. The connector 318 then responds to the fifth digit 1 and the sixth digit 1 to select the subscriber line 309 extending to the subscriber substation T13. The subsequent operation of the connector 318 is dependent upon the idle or busy condition of the called subscriber substation T13; and for the present purposes, it may be assumed that the subscriber substation T13 is idle at this time. Subsequently when the call is answered at the called subscriber substation T13, a connection is completed between the calling subscriber substation T and the called subscriber substation T13. The completion of this connection is substantially identical to that described in Section 3. At the conclusion of the established connection, the subscriber at the calling subscriber substation T and at the called subscriber substation T13 disconnects. When the subscriber at the calling subscriber substation T disconnects, the loop circuit extending to the line relay in the line repeater 610 is interrupted, effecting the removal of the ground potential from the control conductor of the trunk 611, thereby interrupting the holding circuit for retaining operated the switch-through relay R560 in the second selector 500 and for retaining operated the first selector 605 and the finder 604. The finder 604 and the first selector 605 are released in a conventional manner, whereby the line circuit 602 is operated in order again to mark the subscriber line 601 as idle to the connectors having access thereto.

Upon restoring, the switch-through relay R560 in the second selector 500 completes, at the contacts 563′, a circuit, including the contacts 551′, 546, 543, the contacts 3 of the switch S1 and the contacts 512 for energizing the rotary magnet M511 of the rotary switch 510. The rotary magnet M511 operates buzzer fashion by virtue of the inclusion of the contacts 512 thereof in the operating circuit thereof. More particularly, the rotary magnet M511 operates intermittently to drive the cam shaft 513 step by step back into its first or normal position, whereupon the cam C1 operates the switch S1. Specifically, the switch S1 is operated to open the contacts 3 and 5 thereof and to close the contacts 1, 2 and 4 thereof. When the contacts 5 of the switch S1 are thus opened, the circuit for operating the rotary magnet M511 of the rotary switch 510 is interrupted to arrest further operation of the rotary switch 510. When the contacts 2 of the switch S1 are thus closed, a similar circuit is completed for operating the release magnet M505 of the Strowger mechanism 501, whereby the wiper shaft of the Strowger mechanism 501 is released and returned back into its normal rotary and vertical positions. When the wiper shaft of the Strowger mechanism 501 is thus returned to its normal vertical position, the set of V. O. N. springs S506 is operated to interrupt the circuit for retaining operated the V. O. N. relay R525. Upon restoring, the V. O. N. relay R525 interrupts, at the contacts 528, the circuit for energizing the release magnet M505. At this time, the second selector 500 is completely released and available for further use.

When the repeater 610 is thus released, the loop circuit extending to the connector 318 is interrupted, whereby the connector 318 is released in a conventional manner so that the line circuit 310 is operated to mark the subscriber line 309 as idle to the connectors having access thereto. Also the incoming selector 317 is released as described in Section 3. At this time, the established connection between the calling subscriber substation T and the called subscriber substation T13 is released and all of the apparatus involved therein is completely released and available for further use.

In the extension of the connection from the calling subscriber substation T to the called subscriber substation T13 should the second selector 500 encounter an "all trunks busy" condition in the group of trunks, including the trunk 611, operation of the rotary magnet M503 of the Strowger mechanism 501 continues until the wiper shaft thereof is driven eleven steps in the rotary direction operating the set of cam springs S507 to interrupt the circuit for retaining operated the cam relay R530. Upon restoring, the cam relay R530 completes, at the contacts 531, a connection, including the contacts 526, 551 and 561 and condenser 538, between the busy-tone conductor C515 and the negative line conductor of the trunk 623 so that busy-tone is retained to the calling subscriber substation T. Also, upon restoring, the cam relay R530 interrupts, at the contacts 537, the previously traced circuit for operating the rotary magnet M503 of the Strowger mechanism 501, so as to arrest further driving of the wiper shaft in the rotary direction. Subsequently when the subscriber at the calling subscriber substation T disconnects, the second selector 500 is released in a manner substantially identical to that previously described.

*Section 16.—A call from subscriber substation T in the central office A to the subscriber substation T14 in the satellite office B2*

In extending a call from the subscriber substation T in the central office A to the subscriber substation T14 in the satellite office B2, the subscriber at the calling subscriber substation T first initiates the call and dials the directory number 512111. This call may be extended from the calling subscriber substation T via the subscriber line 601 and the finder 604 to the first selector 605; and first selector 605 may respond to the first digit 5 to select the trunk 623 extending to the second selector 500. The second selector 500 may respond to the second digit 1 followed by the third digit 2 to select the trunk 611 extended to the repeater 610 in order to cause the repeater 610 to seize the incoming selector 317 over the trunk line 612, all in the manner described in Section 15. However, in this case, since the third digit is 2, the cam shaft 513 of the rotary switch 510 occupies its 4th position at the conclusion of the third digit 2, whereby the cam C5 closes the set of switch springs S5. Hence, in the present example when the switch-through relay R560 is operated, the trunk 611 is momentarily unbalanced causing the repeater 610 momentarily to unbalance the trunk line 612, whereby the incoming selector 317 is conditioned to select the lower wiper set of the Strowger mechanism instead of the upper wiper set thereof in a manner similar to that described in Section 4. Accordingly, when the fourth digit 1 is subsequently repeated by the repeater 610 over the trunk line 612, the incoming selector 317 is operated to select the group of trunks, including the trunk 332, and then operates to select an idle trunk in this group. The incoming selector 317 may select the particular trunk 332 extending to the connector 319, whereby the connector 319 then responds to the fifth digit 1 and the sixth digit 1 to select the subscriber line 311 extending to the called subscriber substation T14. The subsequent operation of the connector 319 depends upon the idle or busy condition of the called subscriber substation T14 at this time. For the present purposes, it may be assumed, that the called subscriber substation T14 is idle; and when the call is answered thereat, a connection is completed between the calling subscriber substation T and the called subscriber substation T14. The subsequent release of the apparatus involved in this established connection is subsequently identical to that previously described in Section 15.

Recapitulating, it will be understood that the character of the third digit 2 transmitted to the second selector 500 determines that the trunk 611 is momentarily unbalanced, which circumstance determines that the lower wiper set of the Strowger mechanism in the incoming selector 317 is employed in extending the connection therefrom when the incoming selector 317 subsequently responds to the fourth digit 1.

*Section 17.—A call from the subscriber substation T in the central office A to the subscriber substation T15 in the satellite office C2*

In extending a call from the subscriber substation T in the central office A to the subscriber substation T15 in the satellite office C2, the subscriber at the calling subscriber substation T first initiates the call and dials the directory number 513111. This call may be extended from the calling subscriber substation T via the subscriber line 601 and the finder 604 to the first selector 605; and the first selector 605 may respond to the first digit 5 to select the trunk 623 extending to the second selector 500. The second selector 500 then responds to the second digit 1 to select the group of trunks, including the trunk 611 and the group of trunks, including the trunk 614. The second selector 500 then receives the third digit 3, whereby the rotary magnet M511 of the rotary switch 510 is operated to drive the cam shaft 513 into its fifth position. When the cam shaft 513 is thus driven into its fifth position, the cam C3 operates the switch S3, whereby the contacts 2, 4, 6 and 8 thereof are opened, and the contacts 1, 3, 5 and 7 thereof, are closed. More particularly, the switch S3 is operated to interrupt the normal connections to the upper wiper set of the Strowger mechanism 501, at the contacts 2, etc., thereof, and to complete connections to the lower wiper set of the Strowger mechanism 501, at the contacts 1, etc., thereof. Accordingly, in the present example, the lower wiper set of the Strowger mechanism 501 is selected in order effectively to select the group of trunks, including the trunk 614.

At the conclusion of the third digit 3, the rotary magnet M503 of the Strowger mechanism 501 is operated in order to test the trunks in the group, including the trunk 614. In this connection, the test relay R580 is again employed and the test circuit extends from ground via the contacts 536, 557 and the contacts 5 of the switch S3 to the control wiper of the lower wiper set. Assuming that the trunk 614 is the first idle trunk in this group, when it is selected by the lower wiper set of the Strowger mechanism 501, the test relay R580 is operated. Upon operating, the test relay R580 interrupts, at the contacts 582, the previously traced circuit for operating the rotary magnet M503 of the Strowger mechanism 501 and effects operation of the switch-through relay R560. The switch-through relay R560 effects the restoration of the line relay R545; and completes, at the contacts 565 and 567, the connection between the line conductors of the trunk 623 and the line wipers of the lower wiper set of the Strowger mechanism 501, and consequently a connection to the line conductors of the trunk 614 extending to the repeater 613; whereupon the repeater 613 seizes the incoming selector 320 over the trunk line 615.

The fourth digit 1, the fifth digit 1 and the sixth digit 1 are subsequently received by the repeater 613 and then repeated over the trunk line 615, in a manner similar to that described in Section 3. The incoming selector 320 responds to the fourth digit 1 and selects an idle trunk in the group, including the trunk 333. Assuming that the incoming selector 320 selects the particular trunk 333, the connector 321 then responds to the fifth digit 1 and the sixth digit 1 to select the subscriber line 313 extending to the subscriber line substation T15. The subsequent operation of the connector 321 is dependent upon the idle or busy condition of the called subscriber substation T15 in a conventional manner. For the present purposes, it may be assumed that the called subscriber substation T15 is idle at this time, so that when the call is answered thereat, a connection is completed between the calling subscriber substation T and the called subscriber substation T15. The subsequent release of the apparatus involved in this established connection is substantially identical to that described in Section 15.

Recapitulating, it will be understood that the character of the third digit 3 transmitted to the second selector 500 determines that the lower wiper set of the Strowger mechanism 501 is selected and consequently determines the selection of the trunk in the group, including the trunk 614, whereby the connection is extended to the incoming selector 320 in the satellite office C2.

*Section 18.—A call from the subscriber substation T in the central office A to the subscriber substation T16 in the satellite office C2*

In extending a call from the subscriber substation T in the central office A to the subscriber substation T16 in the satellite office C2, the subscriber at the calling subscriber substation T first initiates the call and dials the directory number 514111. This call may be extended from the calling subscriber substation T via the subscriber line 601 and the finder 604 to the first selector 605; and the first selector 605 may respond to the first digit 5 to select the trunk 623 extending to the second selector 500. The second selector 500 then responds to the second digit 1 to select the group of trunks, including the trunk 611, and the group of trunks, including the trunk 614. The second selector then receives the third digit 4, whereby the rotary magnet M511 of the rotary switch 510 is operated to drive the cam shaft 513 into its sixth position; when the cam shaft 513 is thus driven into its sixth position, the cam C3 operates the switch S3, and also the cam C5 operates the switch S5. The cam C3 operates the switch S3 to select the lower wiper seat of the Strowger mechanism 501 in the manner explained in Section 17; and the switch S5 is closed for the purpose of unbalancing the trunk ultimately selected in a manner described in Section 16.

Accordingly, in the present example, at the conclusion of the third digit 4, the wiper shaft of the Strowger mechanism 501 is rotated, whereby the trunks in the group, including the trunk 614, are tested; and it may be again assumed that the second selector 500 selects the trunk 614 extending to the repeater 613 so that the repeater 613 seizes the incoming selector 320 over the trunk line 615. Incident to seizure of the trunk 614, the switch-through relay R560 effects momentary unbalancing of the trunk 614, whereby the repeater 613 effects momentary unbalancing of the trunk line 615, so that the wiper switch relay in the incoming selector 320 is operated to select the lower wiper set of the Strowger mechanism incorporated therein in the manner explained in Section 4.

The fourth digit 1, the fifth digit 1, and the sixth digit 1 are subsequently transmitted and repeated by the repeater 613 over the trunk line 615. The incoming selector 320 responds to the fourth digit 1 and selects an idle trunk in the group, including the trunk 334. Assuming that the incoming selector 320 selects the particular trunk 334, the connector 322 then responds to the fifth digit 1 and the sixth digit 1 to select the subscriber line 315 extending to the called subscriber substation T16. The subsequent operation of the connector 322 is dependent upon the idle or busy condition of the called subscriber substation T16 in a conventional manner. For the present purposes, it may be assumed that the called subscriber substation T16 is idle at this time so that when the call is answered thereat, a connection is completed between the calling subscriber substation T and the called subscriber substation T16. The subsequent release of the apparatus involved in this established connection is substantially identical to that previously described in Section 15.

Recapitulating, it will be understood that the character of the third digit 4 transmitted to the second selector 500 determines that the lower wiper set of the Strowger mechanism 501 is selected and consequently determines the selection of the trunk in the group, including the trunk 614, whereby the connection is extended to the incoming selector in the satellite office C2, and also determines that the trunk 614 is momentarily unbalanced, and consequently that the trunk line 615 is momentarily unbalanced, which circumstance determines that the lower wiper set of the Strowger mechanism in the incoming selector 320 is to be employed in extending the connection therefrom when the incoming selector 320 subsequently responds to the fourth digit 1.

*Section 19.—A call from the subscriber substation T in the satellite office A to the subscriber substation T17 in the satellite office D2*

In extending a call from the subscriber substation T in the central office A to the subscriber substation T17 in the satellite office D2, the subscriber at the calling subscriber substation T first initiates the call and dials the director number 5251111. This call may be extended from the calling subscriber substation T via the subscriber line 601 and the finder 604 to the first selector 605; and the first selector 605 may respond to the first digit 5 to select the trunk 623 extending to the second selector 500. The second selector 500 then responds to the second digit 2 to drive the wiper shaft in the vertical direction two steps, whereby the group of twenty trunks, including the trunks 618 and 621, is selected.

In response to the third digit 5, the rotary magnet M511 of the rotary switch 510 incorporated in the second selector 500 drives the cam shaft 513, five additional steps in the rotary direction, whereby at the conclusion of the third digit 5, the cam shaft 513 occupies its seventh position so that the cam C4 operates the set of switch springs S4. More particularly, the set of switch springs S4 is operated to open the contacts 4 thereof and to close the contacts 1, 2, 3 and 5 thereof, where a connection is completed to the lower wiper set of the Strowger mechanism 501 while a normal connection is completed to the upper wiper set of the Strowger mechanism 501. Thus, in this case, the test relays R580 and R570 are respectively connected to the control wipers of the upper and lower wiper sets of the Strowger mechanism 501. Accordingly, at the conclusion of the third digit 5, the line relay R545 is retained in its operated position, the hold relay R540 is retained in its operated position, and the dial relay R520 is restored shortly thereafter, it being of the slow-to-release type. Upon restoring, the dial relay R520 completes, at the contacts 523, the previously traced circuit for operating the rotary magnet M503 of the Strowger mechanism 501, whereby the latter magnet operates buzzer fashion as previously explained. In the present example, at each step of the rotary magnet M503 of the Strowger mechanism 501, the upper wiper set selects one of the trunks in the group, including the trunk 617, and the lower wiper set selects one of the trunks in the group, including the trunk 620, whereby the two trunks thus simultaneously selected are respectively tested by the test relays R580 and R570. In the event of an idle trunk only before the upper wiper set, the test relay R580 is operated; in the event of an idle trunk only before the lower wiper set, the test relay R570 is operated; and in the event of an idle trunk before the upper wiper set and an idle trunk before the lower wiper set, both of the test relays R580 and R570 tend to operate, and whichever of the test relays R570 or R580 first completely operates, prevents complete operation of the other of the test relays. For example, in the event the test relay R570 first completely operates, the switch-through relay R550 is operated to interrupt, at the contacts 557, a point in the test circuit, including the test relay R580; and on the other hand, in the event the test relay R580 first completely operates, the switch-through relay R560 is operated to interrupt, at the contacts 569, a point in the test circuit, including the test relay R570. Thus in the event of operation of the switch-through relay R560, the trunk 623 is connected to the upper wiper set of the Strowger mechanism 501; and in the event of operation of the switch-through relay R550, the trunk 623 is connected to the lower wiper set of the Strowger mechanism 501. It may be assumed that the trunk 617 and the trunk 620 are paired so that they are simultaneously selected by the respective upper and lower wiper sets of the Strowger mechanism 501; and it may be further assumed that in the present example, the trunk 617 of the pair is tested as being idle and is thus selected by the second selector 500. Selection of the trunk 617 by the second selector 500 causes the repeater 616 to seize the incoming selector 1000 over the trunk line 618; and it will be understood that selection of the trunk 620 by the second selector 500 causes the repeater 619 to seize the incoming selector 1015 over the trunk line 621. The subsequent operation of the incoming selector 1000, as described below, is the same as that of the incoming selector 1015, and operation of the incoming selector 1015 will not be pursued in the interest of brevity.

At this time, the second selector 500 has switched through, completing a loop circuit between the calling subscriber substation T and the repeater 616, and the repeater 616 has completed a loop circuit therefrom to the upper and lower windings of the line relay R1070 in the incoming selector 1000 causing the latter relay to operate. Upon operating, the line relay R1070 completes, at the contacts 1071, a circuit for operating the hold relay R1060. Upon operating, the hold relay R1060 completes, at the contacts 1064, a circuit for operating the cam relay R1050, this circuit including the cam springs S1007. Upon operating, the cam relay R1050 completes, at the contacts 1055, a circuit, including the contacts 1 of the switch S1 for operating the transfer relay R1020; and completes, at the contacts 1054, a circuit, including the contacts 1092, 1082', 1047, and the contacts 5 of the switch S1 for illuminating the permanent lamp L1021 in order to indicate that the incoming selector 1000 has been seized, but has not been operated at this time.

When the fourth digit 1 is dialed, the repeater 616 follows, repeating over the trunk line 618 to the line relay R1070 in the incoming selector 1000, causing the latter relay to follow, interrupting and then recompleting, at the contacts 1071, the circuit for retaining operated the hold relay R1060, whereby the latter relay is retained operated during impulsing, as it is of the slow-to-release type. Also the line relay R1070 completes and then interrupts, at the contacts 1072, a circuit for energizing in multiple, the winding of the dial relay R1030 and the rotary magnet M1011 of the rotary switch 1010. This circuit extends from ground by way of the contacts 1081', 1072, 1062, 1045 and thence by way of the winding of the dial relay R1030 to battery, and thence by way of the contacts 1022 and the rotary magnet M1011 to battery. When the winding of the dial relay R1030 is thus energized, it operates to complete, at the contacts 1031, a holding circuit for retaining operated the transfer relay R1020. The dial relay R1030 being of the slow-to-release type remains operated during impulsing, retaining operated the transfer relay R1020. Further the rotary magnet 1011 follows the fourth digit 1 operating and then restoring in order to drive the cam shaft 1013 of the rotary switch 1010 away from its normal or first position into its second position. When the cam shaft 1013 is driven into its second position, the cam C1 operates the switch S1, whereby the contacts 1, 2, 3 and 5 thereof are opened and the contact 4 thereof is closed. When the switch S1 is thus operated, there is interrupted, at the contacts 5, thereof, the circuit for illuminating the permanent lamp L1021 in order to indicate that the incoming selector 1000 has been operated after seizure thereof. At the conclusion of the fourth digit 1, the line relay R1070 is retained in its operated position retaining operated the hold relay R1060 and effecting restoration of the dial relay R1030 shortly thereafter, the latter relay being of the slow-to-release type. Upon restoring, the dial relay R1030 interrupts, at the contacts 1031, the holding circuit for retaining operated the transfer relay R1020, since the original circuit for operating the transfer relay R1020 was interrupted, at the contacts 1 of the switch S1. Upon restoring, the transfer relay R1020 interrupts, at the contacts 1022, a further point in the circuit for operating the rotary magnet M1011 of the rotary switch 1010; and prepares, at the contacts 1023, a point in a circuit traced hereinafter for operating the vertical magnet M1002 of the Strowger mechanism 1001.

The line relay R1070 follows the fifth digit 1, retaining operated the hold relay R1060 and effecting operation of the dial relay R1030 in the manner previously explained. In this instance, the vertical magnet M1002 of the Strowger mechanism 1001 is energized in multiple with the winding of the dial relay R1030, this circuit including the contacts 1023. Accordingly, the dial relay R1030 operates and is retained operated during impulsing as it is of the slow-to-release type; and the vertical magnet M1002 of the Strowger mechanism 1001 follows the fifth digit 1. Specifically, the vertical magnet M1002 operates and then restores, in accordance with the single impulse of the fifth digit 1, whereby the wiper shaft of the Strowger mechanism 1001 is driven one step in the vertical direction, so that the upper wiper set selects the group of trunks, including the trunk 642 and the lower wiper set selects the group of trunks, including the trunk 641. However, since the switch S2 occupies its normal position, the upper wiper set of the Strowger mechanism 1001 is effectively selected, whereby the group of trunks, including the trunk 642, is effectively selected by the incoming selector 1000. When the wiper shaft of the Strowger mechanism 1001 is driven in the vertical direction away from its normal vertical position, the set of V. O. N. springs S1006 is operated to effect operation of the V. O. N. relay R1040. Upon operating, the V. O. N. relay R1040 completes, at the contacts 1044, a multiple, including the contacts 1032, around the contacts 1045, and then opens the contacts 1045.

At the conclusion of the fifth digit 1, the line relay R1070 is retained in its operated position, retaining operated the hold relay R1060 and causing restoration of the dial relay R1030 shortly thereafter, the latter relay being of the slow-to-release type. Upon restoring, the dial relay R1030 interrupts, at the contacts 1032, a further point in the circuit for energizing in multiple, the windings of the dial relay R1030 and the vertical magnet M1002 of the Strowger mechanism 1001; and completes, at the contacts 1033, a circuit for operating the rotary magnet M1003 of the Strowger mechanism 1001, the last-mentioned circuit, including the contacts 1054, 1092, 1082′, 1046 and 1004. More particularly, the rotary magnet M1003 operates buzzer fashion by virtue of the inclusion of the contacts 1004 thereof, in the operating circuit thereof; whereby the wiper shaft of the Strowger mechanism 1001 is driven step by step in the rotary direction as previously noted. In the present instance, the cam C2 carried by the cam shaft 1013 retains the switch S2 in its normal position selecting the upper wiper set of the Strowger mechanism 1001 so that only the trunks in the group, including the trunk 642, are tested by the control wiper of the upper wiper set. More particularly, when a trunk in the group, including the trunk 642, is slected, a test is performed by the test relay R1090 in order to determine the idle or busy condition thereof, ground potential being present upon the control conductor of the trunk in the event it is busy; and battery potential being present upon the control conductor of the trunk in the event it is idle. The presence of ground potential upon the control conductor of a selected trunk completes a path, including the contacts 1053 and the contacts 6 of the switch S2 and the control wiper of the upper wiper set, for short-circuiting the winding of the test relay R1090. On the other hand, the presence of battery potential upon the control conductor of a selected trunk completes a circuit substantially identical to that traced above for energizing the winding of the test relay R1090 in order to cause the latter relay to operate. Assuming that the trunk 642 is the first idle trunk in the previously selected group, when this trunk is selected by the upper wiper set of the Strowger mechanism 1001, the above-mentioned circuit for energizing the winding of the test relay R1090 is completed, causing the latter relay to operate and interrupt, at the contacts 1092, the previously traced circuit for operating the rotary magnet M1003 of the Strowger mechanism 1001, whereby further driving of the wiper shaft of the Strowger mechanism 1001 is arrested.

Also, upon operating, the test relay R1090 completes, at the contacts 1091, a circuit, including the contacts 1054, for operating the switch-through relay R1080. Upon operating, the switch-through relay R1080 completes, at the contacts 1089, a holding circuit, including the contacts 1061 for energizing the winding thereof; and completes, at the contacts 1088, a path, including the contacts 1061, for applying ground potential via the contacts 6 of the switch S2 to the control wiper of the upper wiper set and consequently to the control conductor of the trunk 642. Also the switch-through relay R1080 interrupts, at the contacts 1084 and 1086, the loop circuit extending to the line relay R1070, in order to cause the latter relay to restore; and completes, at the contacts 1085 and 1087, a connection between the line conductors of the trunk line 618 and the line wipers of the upper wiper set of the Strowger mechanism 1001 via the contacts 2 and 4 of the switch S2. Thus the loop circuit from the repeater 616 is forwarded via the incoming selector 1000 over the line conductors of the trunk 642 to the connector 632, effecting seizure thereof, whereby the connector 632 returns ground potential over the control conductor of the trunk 642, retaining operated the switch-through relay R1080 in the incoming selector 1000. Finally, upon operating the switch-through relay R1080 interrupts, at the contacts 1081′, the circuit for retaining operated, the hold relay R1060, in order to cause the latter relay to restore shortly thereafter, it being of the slow-to-release type. Upon restoring, the hold relay R1060 interrupts, at the contacts 1064, a circuit for retaining operated the cam relay R1050.

The sixth digit 1 and the seventh digit 1 dialed at the calling subscriber substation T are received by the repeater 616 and repeated over the trunk line 618 to the line relay in the connector 632, whereby the connector 632 is operated to select the subscriber line 624 extending to the called subscriber substation T17. The subsequent operation of the connector 632 depends upon the idle or busy condition of the called subscriber substation T17 at this time. For the present purposes, it may be assumed that the called subscriber substation T17 is idle; and when the call is subsequently answered thereat, a connection is completed between the calling subscriber substation T and the called subscriber substation T17.

At the conclusion of the established connection, the subscriber at the calling subscriber substation T and at the called subscriber substation T17 disconnect. When the subscriber at the calling subscriber substation T disconnects, the loop circuit extending therefrom to the repeater 616 is interrupted, effecting the release of the repeater 616, the second selector 500, the first selector 605 and the finder 604 in a manner substantially identical to that described in Section 15. When the repeater 616 is thus released, the loop circuit extending therefrom via the trunk line 618 to the line relay in the connector 632 is interrupted, effecting the release of the connector 632 since the subscriber at the called subscriber substation T17 has disconnected at this time. The line circuit 625 is then controlled again to mark the subscriber line 624 as idle to the connectors having access thereto.

When the connector 632 is thus released, ground potential is removed from the control conductor of the trunk 642, interrupting the holding circuit for retaining operated the switch-through relay R1080 in the incoming selector 1000. Upon restoring, the switch-through relay R1080 completes, at the contacts 1081', a circuit, including the contacts 1072, 1063, the contacts 4 of the switch S1 and the contacts 1012 for operating the rotary magnet M1011 of the rotary switch 1010, whereby the latter magnet operates buzzer fashion by virtue of the inclusion of the contacts 1012 thereof in the operating circuit thereof. More particularly, the rotary magnet M1011 drives the cam shaft 1013 step by step in the rotary direction back into its first or normal position, whereby the cam C1 operates the switch S1. More specifically, the switch S1 is operated to open the contacts 4 thereof and to close the contacts 1, 2, 3 and 5 thereof. When the contacts 4 of the switch S1 are thus opened, the circuit for operating the rotary magnet M1011 of the rotary switch 1010 is interrupted; and when the contacts 3 of the switch S1 are thus closed, a circuit, including the contacts 1043, 1063, 1072 and 1081', is completed for operating the release magnet M1005. Upon operating, the release magnet M1005 releases the wiper shaft of the Strowger mechanism 1001 causing it to be returned to its normal rotary and vertical positions. When the wiper shaft of the Strowger mechanism 1004 is thus returned to its normal vertical position, the set of V. O. N. springs S1006 is operated in order to interrupt the circuit for retaining operated the V. O. N. relay R1040. Upon restoring, the V. O. N. relay R1040 interrupts, at the contacts 1043, the circuit for operating the release magnet M1005 effecting the restoration thereof. At this time, the established connection between the calling subscriber substation T and the called subscriber substation T17 is released and all of the apparatus involved therein is completely released and available for further use.

Reconsidering the extension of the connection from the calling subscriber substation T to the called subscriber substation T17, should the incoming selector 1000 encounter on "all trunks busy" condition in the group of trunks, including the trunk 642, operation of the rotary magnet M1003 of the Strowger mechanism 1001 continues until the wiper shaft is driven eleven steps in the rotary direction away from its normal rotary position, whereupon the set of cam springs S1007 is operated to interrupt the circuit for retaining operated the cam relay R1050. Upon restoring, the cam relay R1050 interrupts, at the contacts 1054, the circuit for operating the rotary magnet M1003 in order to arrest further driving of the wiper shaft of the Strowger mechanism 1001 in the rotary direction; and completes, at the contacts 1051, a connection, including the contacts 1041 and 1081, between the busy conductor C1008 and the negative line conductor of the trunk line 618, whereby busy-tone is returned to the calling subscriber substation T. The subscriber at the calling subscriber substation T disconnects effecting the release of the operated apparatus in a manner substantially identical to that previously explained.

*Section 20.—A call from the subscriber substation T in the central office A to the subscriber substation T18 in the satellite office D2*

In extending a call from the subscriber substation T in the central office A to the subscriber substation T18 in the satellite office D2, the subscriber at the calling subscriber substation T first initiates the call and dials the directory number 5252111. This call may be extended from the calling subscriber substation T via the subscriber line 601 and the finder 604 to the first selector 605; and the first selector 605 may respond to the first digit 5 to select the trunk 623 extending to the second selector 590. The second selector 500 may respond to the second digit 2 followed by the third digit 5 to select the trunk 617 extending to the repeater 616, causing the repeater 616 to seize the incoming selector 1000 over the trunk line 618, as described in Section 19. The repeater 616 then repeats the fourth digit 2, the fifth digit 1, the sixth digit 1 and the seventh digit 1 over the trunk line 618. The incoming selector 1000 may respond to the fourth digit 2 followed by the fifth digit 1, to select the trunk 642 extending to the connector 632, in order to effect seizure of the connector 632, all in the manner previously described in Section 19. However, in this case, since the fourth digit is 2, the cam shaft 1013 of the rotary switch 1010 occupies its third position at the conclusion of the fourth digit 2, whereby the cam C3 closes the set of switch springs S3. Hence in the present example, when the switch-through relay R1080 operates, it completes, at the contacts 1082, a path for applying ground potential to the negative line wiper of the upper wiper set of the Strowger mechanism 1001, this path, when completed includes the switch S3, the resistor 1056, the contacts 1052, 1082, 1085 and the contacts 2 of the switch S2. Upon operating, the switch-through relay R1080 effects restoration of the hold relay R1060 shortly thereafter in order to effect restoration of the cam relay R1050 as previously explained. Upon restoring, the cam relay R1050 interrupts, at the contacts 1052, the above traced path for applying ground potential to the negative line wiper of the upper wiper set, whereby the ground potential applied to the negative line wiper of the upper wiper set of the Strowger mechanism 1001 is applied to the negative line conductor of the trunk 642 so that the trunk 642 is thus momentarily unbalanced, effecting operation of the wiper switch relay in the connector 632. Accordingly, the connector 632 selects the lower wiper set of the associated Strowger mechanism for subsequent use.

The connector 632 then responds to the sixth digit 1 and the seventh digit 1 in order to select the subscriber line 624 extending to the called subscriber substation T18. The subsequent operation of the connector 632 is determined in accordance with the idle or busy condition of the called subscriber substation T18. For the present purposes, it may be assumed that the called subscriber substation T18 is idle; and when the call is answered thereat an established connection is completed between the calling subscriber substation T and the called subscriber substation T18. The subsequent release of the apparatus involved in this established connection is substantially identical to that previously described in Section 19.

Recapitulating, it will be understood that the character of the fourth digit 2, transmitted to the incoming selector 1000 determines that the trunk 642 is momentarily unbalanced; which circumstance determines that the lower wiper set of the Strowger mechanism in the connector 632 is to be subsequently employed in extending a connection therefrom when the connector 632 later responds to the sixth digit 1 and the seventh digit 1.

*Section 21.—A call from the subscriber substation T in the central office A to the subscriber substation T19 in the satellite office D2*

In extending a call from the subscriber substation T in the central office A to the subscriber substation T19 in the satellite office D2, the subscriber at the calling subscriber substation T first initiates the call and dials the directory number 5253111. This call may be extended from the calling subscriber substation T via the subscriber line 601 and the finder 604 to the first selector 605; and the first selector may respond to the first digit 5 to select the trunk 623 extending to the second selector 500. The second selector 500 may respond to the second digit 2 followed by the third digit 5 to select the trunk 617 extending to the repeater 616, causing the repeater 616 to seize the incoming selector 1000 over the trunk line 618. The repeater then repeats the fourth digit 3, the fifth digit 1, the sixth digit 1, and the seventh digit 1 over the trunk line 618. The rotary magnet M1011 of the rotary switch 1010 in the incoming selector 1000 then responds to the fourth digit 3; and at the conclusion therefore, the cam shaft 1013 occupies its fourth position, whereby the cam C2 operates the switch S2. More particularly, the switch S2 is operated to open the contacts 2, 4 and 6 thereof and to close the contacts 1, 3 and 5 thereof, whereby the normal connections to the upper wiper set of the Strowger mechanism 1001 are interrupted at the contacts 2, etc., and the connections are completed to the lower wiper set of the Strowger mechanism 1001 at the contacts 1, etc. The incoming selector 1000 then responds to the fifth digit 1, whereby the group of trunks, including the trunk 642, is selected by the upper wiper set of the Strowger mechanism 1001, and the group of trunks, including the trunk 641, is selected by the lower wiper set of the Strowger mechanism 1001. The incoming selector 1000 then operates automatically to select an idle trunk in the group, including the trunk 641, since the lower wiper set of the Strowger mechanism 1001 is effectively selected by the operated position of the switch S2.

It may be assumed that the incoming selector 1000 operates to select the particular trunk 641 extending to the connector 633. Accordingly, the connector 633 then responds to the sixth digit 1 and the seventh digit 1 to select the subscriber line 628 extending to the called subscriber substation T19. The subsequent operation of the connector 633 is dependent upon the idle or busy condition of the called subscriber substation T19. For the present purposes, it may be assumed that the called subscriber substation T19 is idle at this time so that when the call is answered thereat, a connection is completed between the calling subscriber substation T and the called subscriber substation T19. The subsequent release of the apparatus involved in this established connection is substantially identical to that previously described in Section 19.

Recapitulating, it will be understood that the character of the fourth digit 3 transmitted to the incoming selector 1000 determines that the lower wiper set of the Strowger mechanism 1001 is selected and consequently determines the selection of the trunks in the group, including the trunk 641, whereby the connection is extended to the connector 633 in the satellite office D2.

*Section 22.—A call from the subscriber substation T in the central office A to the subscriber substation T20 in the satelilte office D2*

In extending a call from the subscriber substation T in the central office A to the subscriber substation T20 in the satellite office D2, the subscriber at the calling subscriber substation T first initiates the call and dials the directory number 5254111. This call may be extended from the calling subscriber substation T via the subscriber line 601 and the finder 604 to the first selector 605; and the first selector 605 may respond to the first digit 5 to select the trunk 623 extending to the second selector 500. The second selector 500 may respond to the second digit 2 followed by the third digit 5 to select the trunk 617 extending to the repeater 616, causing the repeater 616 to seize the incoming selector 1000 over the trunk line 618, as described in Section 19. The repeater 616 then repeats the fourth digit 4, the fifth digit 1, the sixth digit 1 and the seventh digit 1 over the trunk line 618. The rotary magnet M1011 of the rotary switch 1010 in the incoming selector 1000 then responds to the fourth digit 4, whereby the cam shaft 1013 is driven into its fifth position causing the cam C2 to operate the switch S2 and the cam C3 to operate the switch S3. Accordingly, the switch S2 effects the selection of the lower wiper set of the Strowger mechanism 1001 and the switch S3 prepares the grounding path for momentarily unbalancing the trunk ultimately selected. The incoming selector 1000 then responds to the fifth digit 1 and may operate to select the trunk 641 extending to the connector 633, as previously explained in Section 21. Incident to the operation of the incoming selector 1000 to select the trunk 641, the trunk 641 is momentarily unbalanced in order to cause the connector 633 to select the lower wiper set of the Strowger mechanism. Thus when the connector 633 responds to the sixth digit 1 and the seventh digit 1, it selects the subscriber line 630 extending to the called subscriber substation T 20. The subsequent operation of the connector 633 is dependent upon the idle or busy condition of the called subscriber substation T20. For the present purposes, it may be assumed that the called subscriber substation T20 is idle at this time so that when the call is answered thereat a connection is completed between the calling subscriber substation T and the called subscriber substation T20. The subsequent release of the apparatus involved in this established connection is substantially identical to that previously described in Section 19.

Recapitulating, it will be understood that the character of the fourth digit 4 transmitted to the incoming selector 1000 determines that the lower wiper set of the Strowger mechanism 1001 is to be employed in the subsequent extension of the connection and that the trunk ultimately selected is momentarily unbalanced, which circumstance determines that the connector 633 is operated to select the lower wiper set of the associated Strowger mechanism.

*Section 23.—A regular service call from the subscriber substation T in the central office A to the P. B. X 1 in the satellite office D2*

In extending a regular service call from the subscriber substation T in the central office A to the P. B. X 1 in the satellite office D2 the subscriber at the calling subscriber substation T first initiates the call and dials the directory number 5251211. This call may be extended from the calling subscriber substation T via the subscriber line 601 and the finder 604 to the first selector 605; and the first selector 605 may respond to the first digit 5 to select the trunk 623 extending to the second selector 500. The second selector 500 may respond to the second digit 2 followed by the third digit 5 to select the trunk 617 extending to the repeater 616, causing the repeater 616 to seize the incoming selector 1000 over the trunk line 618, as explained in Section 19. The rotary magnet M1011 of the rotary switch 1010 in the incoming selector 1000 responds to the fourth digit 1 to drive the cam shaft 1013 from its normal or first position into its second position; and the vertical magnet M1002 responds to the fifth digit 2 to drive the wiper shaft of the Strowger mechanism two steps in the vertical direction so that the upper wiper set selects the group of trunks including the trunk 1014, and the lower wiper set selects the group of trunks, including the trunk 640. Since the cam shaft 1013 occupies its second position, in the present example, the upper wiper set of the Strowger mechanism 1001 is effectively selected, whereby the incoming selector 1000 operates automatically to select an idle trunk in the group, including the trunk 1014. For example, the incoming selector 1000 may select the particular trunk 1014 terminating the connector 900, the trunk 1014 being marked as idle by the presence of battery potential upon the control conductor thereof, the marking path including the contacts 983 and the upper winding of the transfer relay R975 in the connector 900.

When the incoming selector 1000 switches through, ground potential is applied to the control wiper of the upper wiper set of the Strowger mechanism 1001 completing a circuit for energizing the upper winding of the transfer relay R975 in order to cause the latter relay to operate. Also the loop circuit is extended from the line conductors of the trunk line 618 to the line wipers of the upper wiper set of the Strowger mechanism 1001 completing a loop circuit, including the contacts 907 and 909, for energizing in series the upper and lower windings of the line relay R990 and the night service relay R995. When this loop circuit is thus completed, the line relay R990 operates; however, the night service relay R995 does not operate as it is of the differential type. Upon operating, the line relay R990 completes, at the contacts R991, a circuit for operating the hold relay R985. Upon operating, the hold relay R985 completes, at the contacts 987, a path for applying ground potential to the control conductor of the trunk 1014, in order to retain the switch-through relay R1080 in the incoming selector 1000 in its operated position and to mark the trunk 1014 as busy to the other incoming selectors having access thereto. Also, the hold relay R985 completes, at the contacts 986′, a circuit, including the set of R. O. N. switch springs S907, for energizing the upper windings of the R. O. N. relay R950, so as to cause the latter relay to operate. Upon operating, the transfer relay R975 prepares, at the contacts 976, a multiple circuit for energizing the lower winding thereof and for operating the vertical magnet M902 of the Strowger mechanism 901.

The line relay R990 follows the sixth digit 1, retaining operated the hold relay R985 since the latter relay is of the slow-to-operate type. Also the line relay R990 completes and then interrupts, at the contacts R992, a circuit, including the contacts 988 and 976, for energizing the lower winding of the transfer relay R975 and for operating the vertical magnet M902. Accordingly the transfer relay R975 is retained in its operated position during impulsing as it is of the slow-to-release type, while the vertical magnet M902 is operated and then restored in order to drive the wiper shaft of the Strowger mechanism 901 one step in the vertical direction, so that the wiper shaft selects the group of P. B. X trunks, including the P. B. X trunks 913 and 915. Also when the wiper shaft of the Strowger mechanism 901 is driven one step in the vertical direction away from its normal vertical position, the set of V. O. N. springs S906 is operated to effect operation of the V. O. N. relay R980. Upon operating, the V. O. N. relay R980 completes, at the contacts 981 and 982, paths for short-circuiting the upper and lower windings of the night service relay R995 in order to improve impulsing over the loop circuit to the line relay R990. Further, the V. O. N. relay R980 interrupts, at the contacts 983, the circuit for energizing the upper winding of the transfer relay R975.

At the conclusion of the sixth digit 1, the line relay R990 is retained in its operated position retaining the hold relay R985 in its operated position and causing the transfer relay R975 to restore shortly thereafter, the latter relay being of the slow-to-release type. Upon restoring, the transfer relay R975 prepares, at the contacts 977, a series circuit traced hereinafter for energizing the winding of the series relay R925 and the rotary magnet M903 of the Strowger mechanism 901. The line relay R990 then follows the seventh digit 1, retaining the hold relay R985 in its operated position, as it is of the slow-to-release type. Also the line relay R990 completes and then interrupts, at the contacts 992, a circuit, including the contacts 988, 977, 964 and 947, for energizing in series the winding of the series relay R925 and the rotary magnet M903 of the Strowger mechanism 901. The series relay R925 operates and remains operated during impulsing as it is of the slow-to-release type; while the rotary magnet M903 operates and restores driving the wiper shaft of the Strowger mechanism 901 one step in the rotary direction away from its normal rotary position. Upon operating, the series relay R925 completes, at the contacts 926, a multiple around the contacts 964, in the series circuit for energizing the winding of the series relay R925 and the rotary magnet M903; and completes, at the contacts 927, a holding circuit for energizing the lower winding of the R. O. N. relay B950. When the wiper shaft of the Strowger mechanism 901 is driven one step in the rotary direction away from its normal rotary position the set of R. O. N. springs S907 is opened to interrupt the circuit for energizing the upper winding of the R. O. N. relay R950; however, the latter relay does not restore at this time since the previously traced holding circuit is completed by the operated series relay R925.

At this time, the wiper set of the Strowger mechanism 901 has selected the first P. B. X trunk 913 extending to the P. B. X 1 and the idle or busy condition of the P. B. X trunk 913 is tested by the busy test relay R960. Specifically, ground potential appears upon the control conductor of the P. B. X trunk 913 in the event it is busy; while battery potential appears upon the control conductor of the P. B. X trunk 913 in the event it is idle. In passing, it is noted that in the contact set terminating the P. B. X trunk 913 in the contact bank of the Strowger mechanism 901, the control contact is connected by the strap 918 to the E. C. contact, whereby the potential appearing upon the control conductor of the P. B. X trunk 913 is connected both to the control contact and to the E. C. contact in the terminating contact set, and is consequently applied both to the control wiper and to the E. C. wiper of the wiper set of the Strowger mechanism 901 at this time. This arrangement, comprising the strap between the control contact and the E. C. contact of the contact set terminating the P. B. X trunk is employed in conjunction with each P. B. X trunk in the group, with the exception of the last P. B. X trunk 915. Specifically, the last P. B. X trunk 915 in this group is not provided with a strap between the control contact and the E. C. contact in the terminating contact set. This arrangement of the straps 918, etc., is employed in carrying out a trunk-hunting operation in the connector 900, as explained below. Also at the conclusion of the seventh digit 1, the line relay R990 is retained in its operated position in order to retain the hold relay R985 in its operated position. Further, the line relay R990 interrupts, at the contacts 992, the previously traced circuit for energizing in series the winding of the series relay R925 and the rotary magnet M903 in order to cause the series relay R925 to restore shortly following the seventh digit 1.

First assuming that the first P. B. X trunk 913 in the previously selected group is busy at this time, ground potential appearing upon the control conductor thereof and applied to the control wiper of the wiper set of the Strowger mechanism 901 completes a circuit, including the contacts 953 for energizing the winding of the busy test relay R960 in order to cause the latter relay to operate. Upon operating, the busy test relay R960 completes, at the contacts 965, a circuit, including the contacts 904, 955, 932, and 929 and E. C. wiper of the wiper set for energizing the winding of the step relay R920, since ground potential is applied to the E. C. wiper of the wiper set via the strap 918 at this time. When the winding of the step relay R920 is thus energized, the latter relay operates. Upon operating, the step relay R920 completes, at the contacts 922, a holding circuit, including the contacts 986 and 904, for energizing the winding thereof; and completes, at the contacts 921, a circuit for energizing the rotary magnet M903 in order to cause operation thereof. Upon operating, the rotary magnet M903 interrupts, at the contacts 904, the holding circuit for retaining operated the step relay R920, and drives the wiper shaft of the Strowger mechanism 901, an additional step in the rotary direction. The step relay R920 then restores, interrupting at the contacts 921, the circuit for energizing the rotary magnet M903 so that the rotary magnet M903 restores to prepare, at the contacts 904, the previously traced original circuit for again energizing the winding of the step relay R920. Shortly following the conclusion of the seventh digit 1, the series relay R925 restores as it is of the slow-to-release type, interrupting, at the contacts 927, the circuit for energizing the lower winding of the R. O. N. relay R950; however, the R. O. N. relay R950 does not immediately restore as it is of the slow-to-release type. Moreover each time the step relay R920 operates, it completes at the contacts 921, in multiple with the previously traced circuit for operating the rotary magnet M903, a circuit including the contacts 928, for energizing the lower winding of the R. O. N. relay R950. Accordingly, the R. O. N. relay R950 being of the slow-to-release type is retained in its operated position following the restoration of the series relay R925 and during the trunk-hunting operation of the connector 900, as described above.

Now assuming that the first P. B. X trunk 913 is idle when it is selected, battery potential appearing upon the control conductor thereof completes a path substantially identical to that traced above for short-circuiting the winding of the busy test relay R960 in order to prevent operation thereof. Accordingly when the series relay R925 restores it interrupts, at the contacts 927, the holding circuit for energizing the lower winding of the R. O. N. relay R950 in order to cause the latter relay to restore shortly thereafter, it being of the slow-to-release type. Upon restoring, the R. O. N. relay R950 completes, at the contacts 952, a circuit, including the contacts 962 and 986 and the control wiper of the wiper set, for energizing the upper winding of the switch-through relay R940 so as to cause the latter relay to operate. Upon operating, the switch-through relay R940 completes, at the contacts 944, a holding circuit, including the contacts 986', for energizing the lower winding thereof in series with the winding of the series relay R925 and the rotary magnet M903. When this series holding circuit is thus completed, the switch-through relay R940 is retained in its operated position, however, the series relay R925 and the rotary magnet M903 are not reoperated, the series relay R925 also being marginal. Further, the switch-through relay R940 completes, at the contacts 943, a path for applying ground potential to the control conductor of the P. B. X trunk 913 in order to mark the P. B. X trunk 913 as busy to the other connectors having access thereto. Finally the switch-through relay R940 completes, at the contacts 941 and 942, a circuit for projecting ringing current over the P. B. X trunk 913 to the operator position 917 at the P. B. X 1. More particularly, ground potential is applied via the contacts 973 and 942 to the positive line conductor of the P. B. X trunk 913; and a battery potential is applied via the generator conductor C919, the upper winding of the ring cutoff relay R970 and the contacts 971 and 941 to the negative line conductor of the P. B. X trunk 913. Accordingly ringing current is projected over the P. B. X trunk 913 to the P. B. X operator position 917; and when the operator at the position 917 answers the call a low resistance circuit substantially identical to that previously traced is completed for energizing the upper winding of the ring cutoff relay R970 so as to cause the latter relay to operate shortly thereafter, the ring cutoff relay R970 being of the combination slow-to-operate and slow-to-release type.

Upon operating, the ring cutoff relay R970 completes, at the contacts 971', a holding circuit, including the contacts 943 for energizing the lower winding thereof; interrupts, at the contacts 971 and 973, the circuit for projecting ringing current over the P. B. X trunk 913; and completes, at the contacts 972 and 974, a loop circuit between the line conductors of the P. B. X trunk 913 and the upper and lower windings of the answer relay R905 in order to cause the latter relay to operate. Upon operating, the answer relay R905 reverses, at the contacts 906, 907, 908 and 909, the polarity of the loop circuit extending between the repeater 616 and the upper and lower windings of the line relay R990; which reversal of polarity may be employed in the repeater 616 for metering purposes in a conventional manner. Also the answer relay R905 completes, at the contacts 906', a multiple holding circuit for energizing the lower winding of the switch-through relay R940 in series with the winding of the series relay R925 and the rotary magnet M903 in order to insure that the switch-through relay R930 is retained in its operated position rendering the connector 900 of the last-party-to-release type. At this time, an established connection is completed between the calling subscriber substation T and the operator position 917 in the P. B. X 1, whereby the operator at the position 917 may extend the connection in the P. B. X 1, as required by the subscriber at the calling subscriber substation T.

At the conclusion of the established connection, the subscriber, at the calling subscriber substation T disconnects and the operator at the position 917 in the P. B. X 1 disconnects. When the subscriber at the calling subscriber substation T disconnects, the repeater 616 is released effecting the release of the second selector 500, the first selector 605 and the finder 604 in the manner explained in Section 19. Also the repeater 616 interrupts the loop circuit extending to the line relay R990, whereby the latter relay restores interrupting, at the contacts 991, the circuit for retaining operated the hold relay R985, whereby the latter relay restores shortly thereafter, it being of the slow-to-release type. When the operator at the position 917 in the P. B. X 1 disconnects, the loop circuit extending to the answer relay R905 is interrupated causing the latter relay to restore. Upon restoring, the answer relay R905 interrupts, at the contacts 906', the multiple holding circuit for energizing the lower winding of the switch-through relay R940 in order to cause the latter relay to restore. Upon restoring, the switch-through relay R940 interrupts, at the contacts 943, the hold circuit for energizing the lower winding of the ring cutoff relay R970 in order to cause the latter relay to restore shortly thereafter, it being of the combination slow-to-operate and slow-to-release type. Also the switch-through relay R940 interrupts, at the contacts 943, the path for applying ground potential to the control conductor of the P. B. X trunk 913, whereby the trunk circuit 914 returns battery potential to the control conductor of the P. B. X trunk 913 again marking the P. B. X trunk 913 as idle to the connectors having access thereto. Further, the switch-through relay R940 completes, at the contacts 946, a circuit, including the contacts 984, 989 and 992 for operating the release magnet M905, whereby the wiper shaft of the Strowger mechanism 901 is released and returned to its normal rotary and vertical positions. When the wiper shaft of the Strowger mechanism 901 is returned to its normal rotary position, the set of R. O. N. switch springs S907 is closed in order again to prepare the circuit for energizing the upper winding of the R. O. N. relay R950; and when the wiper shaft of the Strowger mechanism 901 is returned to its normal vertical position, the set of V. O. N. switch springs S906 is opened to effect the restoration of V. O. N. relay R980. Upon restoring, the V. O. N. relay R980 interrupts, at the contacts 984, the circuit for energizing the release magnet M905 of the Strowger mechanism 901; and recompletes, at the contacts 983, the path for returning battery potential by way of the upper winding of the transfer relay R975 to the control conductor of the trunk 1014, in order again to mark the trunk 1014 as idle to the incoming selectors having access thereto. Finally when ground potential is removed from the control conductor of the trunk 1014, the incoming selector 1000 is released in the manner explained in Section 19. At this time, the established connection between the calling subscriber substation T and the called P. B. X 1 is released and all of the apparatus involved therein is completely released and available for further use.

Reconsidering the extension of the connection from the calling subscriber substation T to the P. B. X 1, it is pointed out that in the event all of the trunks in the group including the P. B. X trunks 913 and 915 are busy when the trunk-hunting operation is initiated in the connector 900, the trunk-hunting operation continues until the rotary magnet M903 of the Strowger mechanism 901 drives the wiper shaft ten steps in the rotary direction away from its normal rotary position. At this time, the tenth or last P. B. X trunk 915 in the group noted is selected by the wiper set of the Strowger mechanism and being busy effects the reoperation of the busy test relay R960. However this operation of the busy test relay R960 does not effect reoperation of the step relay R920 since there is no strap between the control contact and the E. C. contact in the contact set terminating the last P. B. X trunk 915 in the contact bank of the Strowger mechanism 901. Thus since the step relay R920 is not reoperated, the holding circuit for energizing the lower winding of the R. O. N. relay R950 is not recompleted, whereby the latter relay restores shortly thereafter as it is of the slow-to-release type. Upon restoring, the R. O. N. relay R950 completes, at the contacts 954, a holding circuit, including the contacts 963 and 986, for retaining operated the busy test relay R960; and completes, at the contacts 951, a connection, including the contacts 961 and the condensers 912 and 909' between the busy conductor C908 and the positive line conductor of the trunk 1014, whereby busy-tone is returned over the connection to the calling subscriber substation T. In this case, the subscriber at the calling subscriber substation T disconnects effecting the release of the apparatus in a manner substantially identical to that described above.

*Section 24.—A night service call from the subscriber substation T in the central office A to the P. B. X 1 in the satellite office D2*

In extending a night service call from the subscriber substation T in the central office A to the P. B. X 1 in the satellite office D2, the subscriber at the calling subscriber substation T first initiates the call and dials the directory number 5252211. This call may be extended from the calling subscriber substation T via the subscriber line 601 and the finder 604 to the first selector 605; and the first selector 605 may respond to the first digit 5 to select the trunk 623 extending to the second selector 500. The second selector 500 may respond to the second digit 2 followed by the third digit 5 to select the trunk 617 extending to the repeater 616, causing the repeater 616 to seize the incoming selector 1000 over the trunk line 618, as explained in Section 19. The repeater 616 then repeats the fourth digit 2, the fifth digit 2, the sixth digit 1 and the seventh digit 1, over the trunk line 618. The incoming selector 1000 may respond to the fourth digit 2 followed by the fifth digit 2 to select the trunk 1014 extending to the connector 900 in order to effect seizure of the connector 900, all in the manner previously described in Section 23. However, in this case, since the fourth digit is 2, the cam shaft 1013 of the rotary switch 1010 occupies its third position at the conclusion of the fourth digit 2, whereby the cam C3 closes the switch S3. Hence in the present example, when the switch-through relay R1080 operates it completes, at the contacts 1082, a path for applying ground potential to the negative line wiper of the upper wiper set of the Strowger mechanism 1001, this path when completed including the switch S3, the resistor 1056, the contacts 1052, 1082, 1085 and contacts 2 of the switch S2. Upon operating, the switch-through relay R1080 effects restoration of the hold relay R1060 shortly thereafter in order to effect restoration of the cam relay R1050, as previously explained.

Upon restoring, the cam relay R1050 interrupts, at the contacts 1052, the above-traced path for applying ground potential to the negative line wiper of the upper wiper set, whereby the ground potential applied to the negative line wiper of the upper wiper set of the Strowger mechanism 1001 is applied to the negative line conductor of the trunk 1014 so that the trunk 1014 is thus momentarily unbalanced, effecting energization of the upper windings of the line relay R990 and the night service relay R995 in the connector 900, while the lower windings of these relays are short-circuited. Accordingly, the night service relay R995 operates as it is of the differential type completing, at the contacts 996, a circuit for operating the night service relay R930. Upon operating, the night service relay R930 completes, at the contacts 931, a hold circuit, including the contacts 986′, for energizing the winding thereon; and interrupts, at the contacts 932, a further point in the circuit between the E. C. wiper of the wiper set of the Strowger mechanism 901 and the winding of the step relay R920. When the night service relay R930 occupies its operated position, the normal P. B. X trunk-hunting operation in the connector 900 is prevented, as explained below.

The connector 900 then responds to the sixth digit 1 and the seventh digit 1 in order to select the first P. B. X trunk 913 in the group extending to the operator position 917 in the P. B. X 1, whereupon the idle or busy condition of the first P. B. X trunk 913 is tested by the busy test relay R960. In the event the first P. B. X trunk 913 is idle, the busy test relay R960 is not operated; and on the other hand, in the event the first P. B. X trunk 913 is busy, the busy test relay R960 is operated; all in the manner explained in Section 23. Of course, in the event the first P. B. X trunk 913 is tested as idle, the switch-through relay R940 is operated effecting ringing over the first P. B. X trunk 913 in the manner explained in Section 23. On the other hand, in the event the first P. B. X 913 is tested as busy, the busy test relay R960 is retained in its operated position upon the restoration of the R. O. N. relay R950, effecting the return of busy-tone to the calling subscriber substation T, in the manner explained in Section 23. It will be appreciated that the busy test relay R960 upon operating attempts to complete, at the contacts 965, the circuit for operating the step relay R920; however, this circuit cannot be completed at this time due to the operated night service relay R930, interrupting, at the contacts 932, a further point in the circuit for operating the step relay R920. Accordingly, in the present example, when the night service relay R930 occupies its operated position, only the first P. B. X trunk 913 extending to the operator position 917 at the P. B. X 1 is selected and tested by the connector 900, the normal B. P. X trunk-hunting operation of the connector 900 being prevented. When night service is in force in the P. B. X 1 the operator before vacating the position 917 plugs or connects the first P. B. X trunk 913 to a predetermined one of the telephone stations in the P. B. X 1 whereby all incoming calls must be answered at the predetermined telephone station noted. Thus the completion of the present connection to the predetermined telephone station in the P. B. X 1 when night service is in effect depends entirely upon whether the predetermined telephone station is idle or busy when the connected first P. B. X trunk 913 is selected and tested by the connector 900. The completion of the connection as a consequence of answering of the call at the predetermined telephone station in the P. B. X 1 is substantially the same as that described in Section 23. Moreover the subsequent release of the apparatus involved in this established connection between the calling subscriber substation T and the predetermined telephone station in the P. B. X 1 is substantially identical to that previously described in Section 23.

Recapitulating, it will be understood that the character of the fourth digit 2 transmitted to the incoming selector 1000 determines that the trunk 1014 is momentarily unbalanced; which circumstance determines that the P. B. X trunk-hunting operation in the connector 900 is subsequently omitted, whereby only the first P. B. X trunk 913 subsequently selected by the connector 900 is tested in response to the sixth digit 1 and the seventh digit 1.

*Section 25.—A regular service call from the subscriber substation T in the central office A to the P. B. X 2 in the satellite office D2*

In extending a regular service call from the subscriber substation T in the central office A to the P. B. X 2 in the satellite office D2, the subscriber at the calling subscriber substation T first initiates the call and dials the directory number 5253211. This call may be extended from the calling subscriber substation T via the subscriber line 601 and the finder 604 to the first selector 605; and the first selector 605 may respond to the first digit 5 to select the trunk 623 extending to the second selector 500. The second selector 500 may respond to the second digit 2 followed by the third digit 5 to select the trunk 617 extending to the repeater 616, causing the repeater 616 to seize the incoming selector 1000 over the trunk line 618, as explained in Section 19. The repeater then repeats the fourth digit 3, the fifth digit 2, the sixth digit 1 and the seventh digit 1 over the trunk line 618.

The rotary magnet M1011 of the rotary switch 1010 in the incoming selector 1000 then responds to the fourth digit 3 and at the conclusion thereof the cam shaft 1013 occupies its fourth position, whereby the cam C2 operates the switch S2. More particularly, the switch S2 is operated to open the contacts 2, 4 and 6 thereof and to close the contacts 1, 3 and 5 thereof, whereby the normal connections to the upper wiper set of the Strowger mechanism 1001 are interrupted, at the contacts 2, etc., and connections are completed to the lower wiper set of the Strowger mechanism 1001, at the contacts 1, etc. The incoming selector 1000 then responds to the fifth digit 2, whereby the group of trunks, including the trunk 1014 is selected by the upper wiper set of the Strowger mechanism 1001, and the group of trunks, including the trunk 640, is selected by the lower wiper set of the Strowger mechanism 1001. The incoming selector 1000 then operates automatically to select an idle trunk in the group, including the trunk 640, since the lower wiper set of the Strowger mechanism 1001 is effectively selected by the operated portion of the switch S2.

It may be assumed that the incoming selector 1000 operates to select the particular trunk 640 extending to the connector 634. Accordingly, the connector 634 then responds to the sixth digit 1 and the seventh digit 1 to select one of the P. B. X trunks in the group including the P. B. X trunk 636 and 638 extending to the P. B. X 2. The subsequent operation of the connector 634 is dependent upon the idle or busy conditon of the P. B. X trunks 636, etc., a trunk-hunting operation taking place in the connector 634 in the manner described in Section 23. For the present purposes, it may be assumed that the P. B. X trunk 638 is idle at this time so that this trunk is selected by the connector 634, and the call is subsequently answered by the operator at the position 635 and extended in the P. B. X 2 as required by the subscriber at the calling subscriber substation T. The subsequent release of the apparatus involved in this established connection is substantially identical to that previously described in Section 23.

Recapitulating, it will be understood that the character of the fourth digit 3 transmitted to the incoming selector 1000 determines that the lower wiper set of the Strowger mechanism 1001 is selected and consequently determines the selection of the trunks in the group, including the trunk 640, whereby the connection is extended to the connector 634 having access to the P. B. X trunks extending to the P. B. X 2 in the satellite office D2.

*Section 26.—A night service call from the subscriber substation T in the central office A to the P. B. X 2 in the satellite office D2*

In extending a night service call from the subscriber substation T in the central office A to the P. B. X 2 in the satellite office D2, the subscriber at the calling subscriber substation T first initiates the call and dials the directory number 5264211. This call may be extended from the calling subscriber substation T via the subscriber line 601 and the finder 604 to the first selector 605; and the first selector 605 may respond to the first digit 5 to select the trunk 623 extending to the second selector 500. The second selector 500 may respond to the second digit 2 followed by the third digit 6 to select the trunk 617 extending to the repeater 616, causing the repeater 616 to seize the incoming selector 1000 over the trunk line 618, as explained in Section 19. The repeater then repeats the fourth digit 4, the fifth digit 2, the sixth digit 1 and the seventh digit 1 over the trunk line 618.

The rotary magnet M1011 of the rotary switch 1010 in the incoming selector 1000 then responds to the fourth digit 4, whereby the cam shaft 1013 is driven into its fifth position causing the cam C2 to operate the switch S2 and the cam C3 to operate the switch S3. Accordingly the switch S2 effects the selection of the lower wiper set of the Strowger mechanism 1001, and the switch S3 prepares the grounding path for momentarily unbalancing the trunk ultimately selected. The incoming selector 1000 then responds to the fifth digit 2 and may operate to select the trunk 640 extending to the connector 634, as previously explained in Section 25. Incident to the operation of the incoming selector 1000 to select the trunk 640, the trunk 640 is momentarily unbalanced in order to effect operation of the night service relays in the connector 634. Thus when the connector 634 responds to the sixth digit 1 and the seventh digit 1, it selects and tests only the first P. B. X trunk 636 in the group extending to the P. B. X 2, the normal P. B. X trunk-hunting operation of the connector 634 being omitted by virtue of the operated portion of the night service relays therein, as explained in Section 24. For the present purposes, it may be assumed that the first P. B. X trunk 636 in the P. B. X trunk group extending to the P. B. X 2 is idle at this time so that the call is extended to the predetermined telephone station in the P. B. X 2 that is connected to the first P. B. X trunk 636 when the operator vacated the position 635, as explained in Section 24. A connection is completed when the subscriber at the predetermined telephone station noted answers the call. The subsequent release of the apparatus involved in this established connection is substantially identical to that previously described in Section 23.

Recapitulating, it will be understood that the character of the fourth digit 4 transmitted to the incoming selector 1000 determines that the lower wiper set of the Strowger mechanism 1001 is to be employed in the subsequent extension of the connection and that the connection thus ultimately selected is momentarily unbalanced, which circumstance determines that the connector 634 is controlled to eliminate P. B. X trunk-hunting therein.

*Section 27. Conclusion*

In view of the foregoing, it is apparent that there has been provided an automatic telephone system comprising a central office and a plurality of satellite offices and incorporating an improved trunking arrangement involving improved automatic switching apparatus, whereby a first automatic switch in a first switching stage responds to one or more routing digits not only to effect the selection of a second automatic switch in a second switching stage but to determine the operation of the second automatic switch when the second automatic switch subsequently responds to one or more routing digits. For example, the first automatic switch may select the second automatic switch and determine that the second automatic switch will subsequently extend the connection over a particular one of its pair of wiper sets; also the first automatic switch may select the second automatic switch and determine that the second automatic switch will subsequently ring over one or the other of the line conductors of a two-party subscriber line subsequently selected by the second automatic switch for the purpose of selectively signaling the two party subscriber substations connected to the two-party subscriber line; and further, the first automatic switch may select the second automatic switch and determine that the second automatic switch will subsequently selectively perform or prevent an automatic P. B. X trunk-hunting operation therein in order that the second automatic switch may be selectively controlled to render either regular service or night service to a group of P. B. X trunks accessible thereto and extending to an associated P. B. X.

While the three species of switching controls noted above have been disclosed in detail, it will be understood that the second automatic switches may be constructed and arranged to perform selectively a wide variety of controls dependent upon the operation and control of the first automatic switch having access thereto.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first automatic switch, a trunk including a pair of line conductors and terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for transmitting a control signal over the line conductors of said trunk to said second switch, means then for transmitting a third call signal over said first switch and said trunk to said second switch, means included in said second switch and normally controlled by said third call signal for operating said second switch to perform a first predetermined switching control, and additional means included in said second switch and controlled jointly by said control signal and by said third call signal for operating said second switch to perform a second predetermined switching control.

2. In a telephone system, a first automatic switch, a trunk including a pair of line conductors and terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for momentarily unbalancing the line conductors of said trunk, means then for transmitting a third call signal over said first switch and said trunk to said second switch, means included in said second switch and normally controlled by said third call signal for operating said second switch to perform a first predetermined switching control, and additional means included in said second switch and controlled jointly by said momentary unbalancing of the line conductors of said trunk and by said third call signal for operating said second switch to perform a second predetermined switching control.

3. In a telephone system, a first automatic switch, a trunk including a pair of line conductors and terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for momentarily unbalancing the line conductors of said trunk, said second switch including a differential relay connected to the line conductors of said trunk and operated by the momentary unbalancing of the line conductors of said trunk, means then for transmitting a third call signal over said first switch and said trunk to said second switch, means included in said second switch and normally controlled by said third call signal for operating said second switch to perform a first predetermined switching control, and additional means included in said second switch and controlled jointly by operation of said differential relay and by said third call signal for operating said second switch to perform a second predetermined switching control.

4. In a telephone system, a first automatic switch, a trunk terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for transmitting a control signal over said trunk to said second switch, said second switch including first and second wiper sets, first and second lines respectively accessible to said first and second wiper sets, means then for transmitting a third call signal over said first switch and said trunk to said second switch, means included in said second switch and controlled by said third call signal for operating said first and second wiper sets respectively to select said first and second lines, means included in said second switch for normally connecting said trunk to said first wiper set, and additional means included in said second switch and controlled by said control signal for connecting said trunk to said second wiper set.

5. In a telephone system, a first automatic switch, a trunk terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for transmitting a control signal over said trunk to said second switch, a party subscriber line including a pair of line conductors, means then for transmitting a third call signal over said first switch and said trunk to said second switch, means included in said second switch and controlled by said third call signal for operating said second switch to select said party subscriber line, said second switch including a divided ringing circuit normally set to ring over one of the line conductors of said party subscriber line, and additional means included in said second switch and controlled by said control signal for setting said divided ringing circuit to ring over the other of the line conductors of said party subscriber.

6. In a telephone system, a first automatic switch, a trunk terminating in a second automatic switch, means for seizing said first switch and for transmitting thereto either a first call signal or a second call signal, means included in said first switch and controlled by either said first call signal or said second call signal for operating said first switch to seize said second switch over said trunk, additional means included in said first switch and controlled by said second call signal for transmitting a control signal over said trunk to said second switch, a group of lines, means then for transmitting a third call signal over said first switch and said trunk to said second switch, means included in said second switch and controlled by said third call signal for operating said second switch to select the first line in said group, said second switch including a hunting circuit normally set to effect subsequent operation of said second switch to select an idle line in said group in the event said first line in said group is busy, and additional means included in said second switch and controlled by said signal for altering the setting of said hunting circuit to prevent subsequent operation of said second switch to select an idle line in said group in the event said first line in said group is busy.

7. In a telephone system, a first automatic switch, a repeater provided with an incoming trunk and an outgoing trunk, a second automatic switch, means for seizing said first switch and for transmitting thereto either a first call signal or a second call signal, means included in said first switch and controlled by either said first call signal or said second call signal for operating said first switch to seize said repeater over said incoming trunk, additional means included in said first switch and controlled by said second call signal for transmitting a control signal over said incoming trunk to said repeater, means included in said repeater and controlled by the seizure thereof for seizing said second switch over said outgoing trunk, additional means included in said repeater and controlled by said control signal for repeating said control signal over said outgoing trunk to said second switch, means then for transmitting a third call signal over said first switch and said incoming trunk to said repeater, further means included in said repeater and controlled by said third call signal for repeating said third call signal over said outgoing trunk to said second switch, means included in said second switch and normally controlled by said third call signal for operating said second switch to perform a first predetermined switching control, and additional means included in said second switch and controlled jointly by said control signal and said third call signal for operating said second switch to perform a second predetermined switching control.

8. In a telephone system, a first automatic switch, a repeater provided with an incoming trunk including a pair of line conductors and an outgoing trunk including a pair of line conductors, a second automatic switch, means for seizing said first switch and for transmitting thereto either a first call signal or a second call signal, means included in said first switch and controlled by either said first call signal or said second call signal for operating said first switch to seize said repeater over said incoming trunk, additional means included in said first switch and controlled by said second call signal for momentarily unbalancing the line conductors of said incoming trunk, means included in said repeater and controlled by the seizure thereof for seizing said second switch over said outgoing trunk, additional means included in said repeater and controlled by said momentary unbalancing of the line conductors of said incoming trunk for momentarily unbalancing the line conductors of said outgoing trunk, means then for transmitting a third call signal over said first switch and said incoming trunk to said repeater, further means included in said repeater and controlled by said third call signal for repeating said third call signal over said outgoing trunk to said second switch, means included in said second switch and normally controlled by said third call signal for operating said second switch to perform a first predetermined switching control, and additional means included in said second switch and controlled jointly by said momentary unbalancing of the line conductors of said outgoing trunk and by said third call signal for operating said second switch to perform a second predetermined switching control.

9. In a telephone system, a first automatic switch, a repeater provided with an incoming trunk including a pair of line conductors and an outgoing trunk including a pair of line conductors, a second automatic switch, means for seizing said first switch and for transmitting thereto either a first call signal or a second call signal, means included in said first switch and controlled by either said first call signal or said second call signal for operating said first switch to seize said repeater over said incoming trunk, additional means included in said first switch and controlled by said second call signal for momentarily unbalancing the line conductors of said incoming trunk, means included in said repeater and controlled by the seizure thereof for seizing said second switch over said outgoing trunk, said repeater including a first differential relay connected to the line conductors of said incoming trunk and operated by the momentary unbalancing of the line conductors of said incoming trunk, additional means included in said repeater and controlled by operation of said first differential relay for momentarily unbalancing the line conductors of said outgoing trunk, means then for transmitting a third call signal over said first switch and said incoming trunk to said repeater, further means included in said repeater and controlled by said third call signal for repeating said third call signal over said outgoing trunk to said second switch, means included in said second switch and normally controlled by said third call signal for operating said second switch to perform a first predetermined switching control, said second switch including a second differential relay connected to the line conductors of said outgoing trunk and operated by the momentary unbalancing of the line conductors of said outgoing trunk, and additional means included in said second switch and controlled jointly by operation of said second differential relay and by said third call signal for operating said second switch to perform a second predetermined switching control.

10. In a telephone system, a repeater comprising an incoming trunk provided with a pair of line conductors, an outgoing trunk provided with a pair of line conductors, a line relay provided with a pair of windings respectively included in the line conductors of said incomng trunk, a test relay provided with a pair of windings respectively included in the line conductors of said incoming trunk, said line relay being respectively operated and restored by completion and by interruption of a bridge connection between the line conductors of said incoming trunk, said test relay being of the differential type and remaining restored upon completion and upon interruption of said bridge connection, said test relay being operated by the completion of an unbalancing connection to one of the line conductors of said incoming trunk, means controlled by operation and by restoration of said line relay for respectively completing and interrupting an impulsing path between the line conductors of said outgoing trunk, means controlled by operation of said test relay for completing an unbalancing path to one of the line conductors of said outgoing trunk, a cutoff relay, means controlled by operation followed by restoration of said line relay for operating said cutoff relay, additional means controlled by operation of said test relay for operating said cutoff relay, and means controlled by operation of said cutoff relay for short-circuiting the windings of said test relay so as to improve impulsing over the line conductors of said incoming trunk to said line relay.

11. In a telephone system, a repeater comprising an incoming trunk provided with a pair of line conductors, an outgoing trunk provided with a pair of line conductors, a line relay provided with a pair of windings respectively included in the line conductors of said incoming trunk, a test relay provided with a pair of windings respectively included in the line conductors of said incoming trunk, said line relay being respectively operated and restored by completion and by interruption of a bridge connection between the line conductors of said incoming trunk, said test relay being of the differential type and remaining restored upon completion and upon interruption of said bridge connection, said test relay being operated by the completion of an unbalancing connection to one of the line conductors of said incoming trunk, means controlled by operation and by restoration of said line relay for respectively completing and interrupting an impulsing path between the line conductors of said outgoing trunk, means controlled by operation of said test relay for completing an unbalancing path to one of the line conductors of said outgoing trunk, a dial relay, means controlled by operation followed by restoration of said line relay for operating said dial relay, said impulsing path initially including an impedance element, means controlled by operation of said dial relay for short-circuiting said impedance element so as to improve impulsing over the line conductors of said outgoing trunk, a cutoff relay, additional means controlled by operation of said dial relay for operating said cutoff relay, additional means controlled by operation of said test relay for operating said cutoff relay, and means controlled by operation of said cutoff relay for short-circuiting the windings of said test relay so as to improve impulsing over the line conductors of said incoming trunk to said line relay.

12. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, means for imparting selective primary movement to said first and second wiper sets respectively to select said first and second groups of trunks or respectively to select said third and fourth groups of trunks, a tester, first means controlled in the event of primary movement of said first and second wiper sets respectively to select said first and second groups of trunks for selecting one of said wiper sets and for initiating secondary movement of said first and second wiper sets respectively and successively to select the individual trunks in said first and second groups, means controlled jointly by said first means and by said tester upon the selection by said selected one wiper set of an idle one of the trunks in the selected one of said groups for arresting said secondary movement of said wiper sets and for completing a connection between said incoming terminals and said selected one wiper set, second means controlled in the event of primary movement of said first and second wiper sets respectively to select said third and fourth groups of trunks for initiating secondary movement of said first and second wiper sets respectively and successively to select the individual trunks in said third and fourth groups, and means controlled jointly by said second means and by said tester upon the selection by either one of said wiper sets of an idle one of the trunks in the selected one of said groups for arresting said secondary movement of said wiper sets and for selecting said one wiper set and for completing a connection between said line and said selected one wiper set.

13. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, means for imparting selective primary movement to said first and second wiper sets respectively to select said first and second groups of trunks or respectively to select said third and fourth groups of trunks, first and second test relays, first means controlled in the event of primary movement of said first and second wiper sets respectively to select said first and second groups of trunks for selecting one of said wiper sets and for connecting said selected one wiper set to said first test relay and for initiating secondary movement of said first and second wiper sets respectively and successively to select the individual trunks in said first and second groups, said first test relay being operated upon the selection by said selected and connected one wiper set of an idle one of the trunks in the selected one of said groups, means controlled by operation of said first test relay for arresting said secondary movement of said wiper sets and for completing a connection between said incoming terminals and said selected one wiper set, second means controlled in the event of primary movement of said first and second wiper sets respectively to select said third and fourth groups of trunks for respectively connecting said first and second wiper sets to said first and second test relays and for initiating secondary movement of said first and second wiper sets respectively and successively to select the individual trunks in said third and fourth groups, said first test relay being operated upon the selection by said connected first wiper set of an idle one of the trunks in said third group and said second test relay being operated upon the selection by said connected second wiper set of an idle one of the trunks in said fourth group, means controlled by operation of either one of said test relays for preventing operation of the other of said test relays and for arresting said secondary movement of said wiper sets, and means controlled by operation of said first test relay for completing a connection between said incoming terminals and said first wiper set and controlled by operation of said second test relay for completing a connection between said incoming terminals and said second wiper set.

14. An automatic switch comprising an incoming line provided with a pair of line conductors, first and second wiper sets mounted for simultaneous selective primary and secondary motions, first and second groups of trunks respectively accessible to said first and second wiper sets, a line relay provided with a pair of windings respectively included in the line conductors of said incoming line, a wiper switch relay provided with a pair of windings respectively included in the line conductors of said incoming line, said line relay being respectively operated and restored by completion and by interruption of a bridge connection between the line conductors of said incoming line, said wiper switch relay being of the differential type and remaining restored upon completion and upon interruption of said bridge connection, said wiper switch relay being operated by the completion of an unbalancing connection to one of the line conductors of said incoming line, means controlled by a series of operations and restorations of said line relay for imparting corresponding primary movement to said first and second wiper sets respectively to select said first and second groups of trunks, means normally selecting said first wiper set and controlled by operation of said wiper switch relay for selecting said second wiper set, means controlled by said primary movement of said wiper sets for initiating secondary movement thereof so that said first and second wiper sets respectively and successively select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming line and said selected one wiper set.

15. An automatic switch comprising an incoming line provided with a pair of line conductors, first and second wiper sets mounted for simultaneous selective primary and secondary motions, first and second groups of trunks respectively accessible to said first and second wiper sets, a line relay provided with a pair of windings respectively included in the line conductors of said incoming line, a wiper switch relay provided with a pair of windings normally respectively included in the line conductors of said incoming line, said line relay being respectively operated and restored by completion and by interruption of a bridge connection between the line conductors of said incoming line, said wiper switch relay being of the differential type and remaining restored upon completion and upon interruption of said bridge connection, said wiper switch relay being operated by the completion of an unbalancing connection to one of the line conductors of said incoming line, means controlled by operation followed by restoration of said line relay for short-circuiting the windings of said wiper switch relay in order to improve impulsing over said incoming line to said line relay, means controlled by a series of operations and restorations of said line relay for imparting corresponding primary movement to said first and second wiper sets respectively to select said first and second groups of trunks, means normally selecting said first wiper set and controlled by operation of said wiper switch relay for selecting said second wiper set, means controlled by said primary movement of said wiper sets for initiating secondary movement thereof so that said first and second wiper sets respectively and successively select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming line and said selected one wiper set.

16. An automatic switch comprising an incoming line provided with a pair of line conductors, first and second wiper sets mounted for simultaneous selective primary and secondary motions, first and second groups of trunks respectively accessible to said first and second wiper sets, a line relay provided with a pair of windings normally respectively included in the line conductors of said incoming line, a wiper switch relay provided with a pair of windings normally respectively included in the line conductors of said incoming line, said line relay being respectively operated and restored by completion and by interruption of a bridge connection between the line conductors of said incoming line, said wiper switch relay being of the differential type and remaining restored upon completion and upon interruption of said bridge connection, said wiper switch relay being operated by the completion of an unbalancing connection to one of the line conductors of said incoming line, means controlled by a series of operations and restorations of said line relay for imparting corresponding primary movement to said first and second wiper sets respectively to select said first and second groups of trunks, means normally selecting said first wiper set and controlled by operation of said wiper switch relay for selecting said second wiper set, means controlled by said primary movement of said wiper sets for initiating secondary movement thereof so that said first and second wiper sets respectively and successively select the individual trunks in said first and second groups, a tester, a switch-through relay, means controlled by said tester upon the selection by said selected one wiper set of an idle one of the trunks in the selected one of said groups for operating said switch-through relay and for arresting said secondary movement of said wiper sets, and means controlled by operation of said switch-through relay for disconnecting said incoming line from said line relay and said wiper switch relay and for connecting said incoming line to said selected one wiper set.

17. An automatic switch comprising an incoming line provided with a pair of line conductors, a wiper set, groups of two-party subscriber lines accessible to said wiper set, each of said two-party subscriber lines having two party subscriber substations connected thereto, a line relay provided with a pair of windings respectively included in the line conductors of said incoming line, a party relay provided with a pair of windings respectively included in the line conductors of said incoming line, said line relay being respectively operated and restored by completion and by interruption of a bridge connection between the line conductors of said incoming line, said party relay being of the differential type and remaining restored upon completion and upon interruption of said bridge connection, said party relay being operated by the completion of an unbalancing connection to one of the line conductors of said incoming line, means controlled by two series of operations and restorations of said line relay for correspondingly operating said wiper set to select one of said groups of two-party subscriber lines and then to select one of said two-party subscriber lines in said selected one group, a ringer normally set to signal one of the subscriber substations connected to said selected one two-party subscriber line, means controlled by operation of said party relay for altering the setting of said ringer to signal the other of the subscriber substations connected to said selected one two-party subscriber line, and means controlled by answering on said selected one two-party subscriber line for completing a connection between said incoming line and said wiper set.

18. An automatic switch comprising an incoming line provided with a pair of line conductors, a wiper set, groups of two-party subscriber lines accessible to said wiper set, each of said two-party subscriber lines being provided with a pair of line conductors, a line relay provided with a pair of windings respectively included in the line conductors of said incoming line, a party relay provided with a pair of windings respectively included in the line conductors of said incoming line, said line relay being respectively operated and restored by completion and by interruption of a bridge connection between the line conductors of said incoming line, said party relay being of the differential type and remaining restored upon completion and upon interruption of said bridge connection, said party relay being operated by the completion of an unbalancing connection to one of the line conductors of said incoming line, means controlled by two series of operations and restorations of said line relay for correspondingly operating said wiper set to select one of said groups of two-party subscriber lines and then to select one of said two-party subscriber lines in said selected one group, a divided ringing circuit normally set to ring over one of the line conductors of said selected one two-party subscriber line, means controlled by operation of said party relay for altering the setting of said divided ringing circuit to ring over the other of the line conductors of said selected one two-party subscriber line, and means controlled by answering on said selected one two-party subscriber line for completing a connection between said incoming line and said wiper set.

19. An automatic switch comprising an incoming line provided with a pair of line conductors, a wiper set, groups of two-party subscriber lines accessible to said wiper set, each of said two-party subscriber lines being provided with a pair of line conductors, a line relay provided with a pair of windings respectively included in the line conductors of said incoming line, a party relay provided with a pair of windings normally respectively included in the line conductors of said incoming line, said line relay being respectively operated and restored by completion and by interruption of a bridge connection between the line conductors of said incoming line, said party relay being of the differential type and remaining restored upon completion and upon interruption of said bridge connection, said party relay being operated by the completion of an unbalancing line to said line relay, means controlled by two said incoming line, means controlled by operation followed by restoration of said line relay for short-circuiting the windings of said party relay in order to improve impulsing over said incoming line to said line relay, means controlled by two series of operations and restoration of said line relay for correspondingly operating said wiper set to select one of said groups of two-party subscriber lines and then to select one of said two-party subscriber lines in said selected one group, a divided ringing circuit normally set to ring over one of the line conductors of said selected one two-party subscriber line, means controlled by operation of said party relay for altering the setting of said divided ringing circuit to ring over the other of the line conductors of said selected one two-party subscriber line, and means controlled by answering on said selected one two-party subscriber line for completing a connection between said incoming line and said wiper set.

20. An automatic switch comprising an incoming line provided with a pair of line conductors, first and second wiper sets mounted for simultaneous selective primary and secondary motions, first and second groups of subscriber lines respectively accessible to said first and second wiper sets, a line relay provided with a pair of windings respectively included in the line conductors of said incoming line, a wiper switch relay provided with a pair of windings respectively included in the line conductors of said incoming line, said line relay being respectively operated and restored by completion and by interruption of a bridge connection between the line conductors of said incoming line, said wiper switch relay being of the differential type and remaining restored upon completion and upon interruption of said bridge connection, said wiper switch relay being operated by the completion of an unbalancing connection to one of the line conductors of said incoming line, means controlled by a first series of operations and restorations of said line relay for imparting corresponding primary movement to said first and second wiper sets respectively to select said first and second groups of subscriber lines, means controlled by a second series of operations and restorations of said line relay for imparting corresponding secondary movement to said first and second wiper sets respectively to select two of said subscriber lines respectively in said selected first and second groups, means normally selecting said first wiper sets and controlled by operation of said wiper switch relay for selecting said second wiper set, a tester, means controlled by said tester for signaling over the one of said subscriber lines selected by said selected one wiper set, and means controlled by answering on said one subscriber line for completing a connection between said incoming line and selected one wiper set.

21. An automatic switch comprising an incoming line provided with a pair of line conductors, first and second wiper sets mounted for simultaneous selective primary and secondary motions, first and second groups of subscriber lines respectively accessible to said first and second wiper sets, a line relay provided with a pair of windings respectively included in the line conductors of said incoming line, a wiper switch relay provided with a pair of windings normally respectively included in the line conductors of said incoming line, said line relay being respectively operated and restored by completion and by interruption of a bridge connection between the line conductors of said incoming line, said wiper switch relay being of the differential type and remaining restored upon completion and upon interruption of said bridge connection, said wiper switch relay being operated by the completion of an unbalancing connection to one of the line conductors of said incoming line, means controlled by operation followed by restoration of said line relay for short-circuiting the winding of said wiper switch relay in order to improve impulsing over said incoming line to said line relay, means controlled by a first series of operations and restorations of said line relay for imparting corresponding primary movement to said first and second wiper sets respectively to select said first and second groups of subscriber lines, means controlled by a second series of operations and restorations of said line relay for imparting corresponding secondary movement to said first and second wiper sets respectively to select two of said subscriber lines respectively in said selected first and second groups, means normally selecting said first wiper set and controlled by operation of said wiper switch relay for selecting said second wiper set, a tester, means controlled by said tester for signalling over the one of said subscriber lines selected by said selected one wiper set, and means controlled by answering on said one subscriber line for completing a connection between said incoming line and said selected one wiper set.

22. An automatic switch comprising an incoming line provided with a pair of line conductors, a wiper set, a group of trunks accessible to said wiper set, a line relay provided with a pair of windings respectively included in the line conductors of said incoming line, a hunt-control relay provided with a pair of windings respectively included in the line conductors of said incoming line, said line relay being respectively operated and restored by completion and by interruption of a bridge connection between the line conductors of said incoming line, said hunt-control relay being of the differential type and remaining restored upon completion and upon interruption of said bridge connection, said hunt-control relay being operated by the completion of an unbalancing connection to one of the line conductors of said incoming line, means controlled by two series of operations and restorations of said line relay for correspondingly operating said wiper set to select said group of trunks and then to select the first trunk in said selected group, a hunt circuit normally set to effect further operation of said wiper set to select an idle one of the trunks in said selected group in the event said selected first trunk in said selected group is busy, means controlled by operation of said hunt-control relay for altering the setting of hunt circuit to prevent said further operation of said wiper set, means for signaling over an idle one of said trunks in said group selected by said wiper set, and means controlled by answering on said selected one trunk for completing a connection between said incoming line and said wiper set.

23. An automatic switch comprising an incoming line provided with a pair of line conductors, a wiper set, a group of trunks accessible to said wiper set, a line relay provided with a pair of windings respectively included in the line conductors of said incoming line, a hunt-control relay provided with a pair of windings normally respectively included in the line conductor of said incoming line, said line relay being respectively operated and restored by completion and by interruption of a bridge connection between the line conductors of said incoming line, said hunt-control relay being of the differential type and remaining restored upon completion and upon interruption of said bridge connection, said hunt-control relay being operated by the completion of an unbalancing connection to one of the line conductors of said incoming line, means controlled by operation followed by restoration of said line relay for short-circuiting the windings of said hunt-control relay in order to improve impulsing over said incoming line to said line relay, means controlled by two series of operations and restorations of said line relay for correspondingly operating said wiper set to select said group of trunks and then to select the first trunk in said selected group, a hunt circuit normally set to effect further operation of said wiper set to select an idle one of the trunks in said selected group in the event said selected first trunk in said selected group is busy, means controlled by operation of said hunt-control relay for altering the setting of hunt circuit to prevent said further operation of said wiper set, means for signaling over an idle one of said trunks in said group selected by said wiper set, and means controlled by answering on said selected one trunk for completing a connection between said incoming line and said wiper set.

24. An automatic switch comprising incoming terminals, first and second wiper sets mounted for simultaneous selective primary and secondary motions, first and second groups of trunks respectively accessible to said first and second wiper sets, means for imparting primary movement to said first and second wiper sets respectively to select said first and second groups of trunks, a register, means for registering a digit signal of first or second or third or fourth values in said register, a signal source, means controlled by the registration of said digit signal of said first value in said register for selecting said first wiper set and controlled by the registration of said digit signal of said second value in said register for selecting both said first wiper set and said signal source and controlled by the registration of said digit signal of said third value in said register for selecting said second wiper set and controlled by the registration of said digit signal of said fourth value in said register for selecting both said second wiper set and said signal source, means controlled jointly by primary movement of said wiper sets and by the registration of said digit signal in said register for initiating secondary movement of said first and second wiper sets respectively and successively to select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming terminals and said selected one wiper set and for connecting said signal source in the event it is selected to said selected one wiper set.

25. An automatic switch comprising incoming terminals, first and second wiper sets mounted for simultaneous selective primary and secondary motions, first and second groups of trunks respectively accessible to said first and second wiper sets, a digit signal relay controllable over said incoming terminals, means including said digit signal relay for imparting corresponding primary movement to said first and second wiper sets respectively to select said first and second groups of trunks, a register, means, including said digit signal relay for registering a digit signal of first or second or third or fourth values in said register, a signal source, controlled by the registration of said digit signal of said first value in said register for selecting said first wiper set and controlled by the registration of said digit signal of said second value in said register for selecting both said first wiper set and said signal source and controlled by the registration of said digit signal of said third value in said register for selecting said second wiper set and controlled by the registration of said digit signal of said fourth value in said register for selecting both said second wiper set and said signal source, means controlled jointly by primary movement of said wiper sets and by the registration of said digit signal in said register for initiating secondary movement of said first and second wiper sets respectively and successively to select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming terminals and said selected one wiper set and for connecting said signal source in the event it is selected to said selected one wiper set.

26. An automatic switch comprising incoming terminals, first and second wiper sets mounted for simultaneous selective primary and secondary motions, first and second groups of trunks respectively accessible to said first and second wiper sets, a digit signal relay controllable over said incoming terminals, means controlled by a first operation of said digit signal relay for imparting corresponding primary movement to said first and second wiper sets respectively to select said first and second groups of trunks, a register, means governed by a second operation of said digit signal relay for registering a digit signal of first or second or third or fourth values in said register, a signal source, means controlled by the registration of said digit signal of said first value in said register for selecting said first wiper set and controlled by the registration of said digit signal of said second value in said register for selecting both said first wiper set and said signal source and controlled by the registration of said digit signal of said third value in said register for selecting said second wiper set and controlled by the registration of said digit signal of said fourth value in said register for selecting both said second wiper set and said signal source, means controlled jointly by primary movement of said wiper sets and by the registration of said digit signal in said register for initiating secondary movement of said first and second wiper sets respectively and successively to select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming terminals and said selected one wiper set and for connecting said signal source in the event it is selected to said selected one wiper set.

27. An automatic switch comprising incoming terminals, first and second wiper sets mounted for simultaneous selective primary and secondary motions, first and second groups of trunks respectively accessible to said first and second wiper sets, a line relay normally connected to said incoming terminals and controllable thereover, means including said line relay for imparting corresponding primary movement to said first and second wiper sets respectively to select said first and second groups of trunks, a register, means including said line relay for registering a digit signal of first or second or third or fourth values in said register, a signal source, means controlled by the registration of said digit signal of said first value in said register for selecting said first wiper set and controlled by the registration of said digit signal of said second value in said register for selecting both said first wiper set and said signal source and controlled by the registration of said digit signal of said third value in said register for selecting said second wiper set and controlled by the registration of said digit signal of said fourth value in said register for selecting both said second wiper set and said signal source, means controlled jointly by primary movement of said wiper sets and by the registration of said digit signal in said register for initiating secondary movement of said first and second wiper sets respectively and successively to select the individual trunks in said first and second groups, a tester, a switch-through relay, means controlled by said tester upon the selection by said selected one wiper set of an idle one of the trunks in the selected one of said groups for operating said switch-through relay, means controlled by operation of said switch-through relay for arresting said secondary movement of said wiper sets and for disconnecting said line relay from said incoming terminals and for connecting said incoming terminals to said selected one wiper set, a slow-acting relay, additional means controlled by operation of said switch-through relay for connecting said signal source in the event it is selected to said selected one wiper set and for initiating the control of said slow-acting relay, and means controlled by the complete control of said slow-acting relay for disconnecting said signal source in the event it is connected from said selected one wiper set.

28. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, a digit signal relay controllable over said incoming terminals, means including said digit signal relay for imparting corresponding selective primary movement to said first and second wiper sets respectively to select said first and second groups of trunks or respectively to select said third and fourth groups of trunks, a register, means including said digit signal relay for registering a digit signal of first or second values in said register, means controlled by the registration of said digit signal of said first value in said register for selecting said first wiper set and controlled by the registration of said digit signal of said second value in said register for selecting said second wiper set, a tester, first means controlled jointly by primary movement of said first and second wiper sets respectively to select said first and second groups of trunks and by the registration of said digit signal in said register for initiating secondary movement of said first and second wiper sets respectively and successively to select the individual trunks in said first and second groups, means controlled jointly by said first means and by said tester upon the selection by said selected one wiper set of an idle one of the trunks in the selected one of said groups for arresting said secondary movement of said wiper sets and for completing a connection between said incoming terminals and said selected one wiper set, second means controlled by primary movement of said first and second wiper sets respectively to select said third and fourth groups of trunks for initiating secondary movement of said first and second wiper sets respectively and successively to select the individual trunks in said third and fourth groups, means controlled jointly by said second means and by said tester upon the selection by either one of said wiper sets of an idle one of the trunks in the selected one of said groups for arresting said secondary movement of said wiper sets and for selecting said one wiper set and for completing a connection between said incoming terminals and said selected one wiper set.

29. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, a digit signal relay controllable over said incoming terminals, means controlled by a first operation of said digit signal relay for imparting corresponding selective primary movement to said first and second wiper sets respectively to select said first and second groups of trunks or respectively to select said third and fourth groups of trunks, a register, means controlled by a second operation of said digit signal relay for registering a digit signal of first or second values in said register, means controlled by the registration of said digit signal of said first value in said register for selecting said first wiper set and controlled by the registration of said digit signal of said second value in said register for selecting said second wiper set, a tester, first means controlled jointly by the primary movement of said first and second wiper sets respectively to select said first and second groups of trunks and by the registration of said digit signal in said register for initiating secondary movement of said first and second wiper sets respectively and successively to select the individual trunks in said first and second groups, means controlled jointly by said first means and by said tester upon the selection by said selected one wiper set of an idle one of the trunks in the selected one of said groups for arresting said secondary movement of said wiper sets and for completing a connection between said incoming terminals and said selected one wiper set, second means controlled by primary movement of said first and second wiper sets respectively to select said third and fourth groups of trunks for initiating secondary movement of said first and second wiper sets respectively and successively to select the individual trunks in said third and fourth groups, and means controlled jointly by said second means and by said tester upon the selection by either one of said wiper sets of an idle one of the trunks in the selected one of said groups for arresting said secondary movement of said wiper sets and for selecting said one wiper set and for completing a connection between said incoming terminals and said selected one wiper set.

30. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, a digit signal relay controllable over said incoming terminals, means including said digit signal relay for imparting corresponding selective primary movement to said first and second wiper sets respectively to select said first and second groups of trunks or respectively to select said third and fourth groups of trunks, a register, means including said digit signal relay for registering a digit signal of first or second values in said register, first and second test relays, means controlled by the registration of said digit signal of said first value in said register for selecting said first wiper set and for connecting said first wiper set to said first test relay and controlled by the registration of said digit signal of said second value in said register for selecting said second wiper set and for connecting said second wiper set to said first test relay, first means controlled jointly by primary movement of said first and second wiper sets respectively to select said first and second groups of trunks and by the registration of said digit signal in said register for initiating secondary movement of said first and second wiper sets respectively and successively to select the individual trunks in said first and second groups, said first test relay being operated upon the selection by said selected and connected one wiper set of an idle one of the trunks in the selected one of said groups, means controlled by operation of said first test relay for arresting said secondary movement of said wiper sets and for completing a connection between said incoming terminals and said selected one wiper set, second means controlled by primary movement of said first and second wiper sets respectively to select said third and fourth groups of trunks for respectively connecting said first and second wiper sets to said first and second test relays and for initiating secondary movement of said first and second wiper sets respectively and successively to select the individual trunks in said third and fourth groups, said first test relay being operated upon the selection by said connected first wiper set of an idle one of the trunks in said third group and said second test relay being operated upon the selection by said connected second wiper set of an idle one of the trunks in said fourth group, means controlled by operation of either one of said test relays for preventing operation of the other of said test relays and for arresting said secondary movement of said wiper sets, and means controlled by operation of said first test relay for completing a connection between said incoming terminals and said first wiper set and controlled by operation of said second test relay for completing a connection between said incoming terminals and said second wiper set.

31. An automatic switch comprising incoming terminals, first and second wiper sets mounted for simultaneous selective primary and secondary motions, first and second groups of trunks respectively accessible to said first and second wiper sets, third and fourth groups of trunks respectively accessible to said first and second wiper sets, a digit signal relay controllable over said incoming terminals, means including said digit signal relay for imparting corresponding selective primary movement to said first and second wiper sets respectively to select said first and second groups of trunks or respectively to select said third and fourth groups of trunks, a register, means including said digit signal relay for registering a digit signal of first or second values in said register, first and second test relays, first and second switch-through relays, means controlled by the registration of said digit signal of said first value in said register for selecting said first wiper set and for connecting said first wiper set to said first test relay and controlled by the registration of said digit signal of said second value in said register for selecting said second wiper set and for connecting said second wiper set to said first test relay, first means controlled jointly by the primary movement of said first and second wiper sets respectively to select said first and second groups of trunks and by the registration of said digit signal in said register for initiating secondary movement of said first and second wiper sets respectively and successively to select the individual trunks in said first and second groups, said first test relay being operated upon the selection by said selected and connected one wiper set of an idle one of the trunks in the selected one of said group, means controlled by operation of said first test relay for arresting said secondary movement of said wiper sets and for operating said first switch-through relay, means controlled by operation of said first switch-through relay for completing a connection between said incoming terminals and said selected one wiper set, second means controlled by primary movement of said first and second wiper sets respectively to select said third and fourth groups of trunks for respectively connecting said first and second wiper sets to said first and second test relays and for initiating secondary movement of said first and second wiper sets respectively and successively to select the individual trunks in said third and fourth groups, said first test relay being operated upon the selection by said connected first wiper set of an idle one of the trunks in said third group and said second test relay being operated upon the selection by said connected second wiper set of an idle one of the trunks in said fourth group, means controlled by operation of said second test relay for operating said second switch-through relay, means controlled by operation of said first switch-through relay for disconnecting said second wiper set from said second test relay and controlled by operation of said second switch-through relay for disconnecting said first wiper set from said first test relay, means controlled by operation of either one of said test relays for arresting said secondary movement of said wiper sets, and means controlled by said second means and governed by operation of said first switch-through relay for completing a connection between said incoming terminals and said first wiper set and governed by operation of said second switch-through relay for completing a connection between said incoming terminals and said second wiper set.

32. An automatic switch comprising incoming terminals, first and second wiper sets mounted for simultaneous selective primary and secondary motions, first and second groups of trunks respectively accessible to said first and second wiper sets, a digit signal relay controllable over said incoming terminals, means including said digit signal relay for imparting corresponding primary movement to said first and second wiper sets respectively to select said first and second groups of trunks, a register, means including said digit signal relay for registering a digit signal of first or second or third values in said register, means controlled by the registration of said digit signal of said first value in said register for finally selecting said first wiper set and controlled by the registration of said digit signal of said second value in said register for finally selecting said second wiper set and controlled by the registration of said digit signal of said third value in said register for preliminarily selecting both of said wiper sets, additional means jointly controlled by operation of said first and second wiper sets respectively to select said first and second groups of trunks and by the registration of a digit signal in said register for initiating secondary movement of said first and second wiper sets respectively and successively to select the individual trunks in said first and second groups, a tester, means controlled by said tester upon the selection by either one of said preliminarily selected wiper sets of an idle one of the trunks in the selected one of said groups for finally selecting said one wiper set, and additional means controlled by said tester upon the selection by said finally selected one wiper set of an idle one of the trunks in the selected one of said groups for arresting said secondary movement of said wiper sets and for completing a connection between said incoming terminals and said finally selected one wiper set.

33. An automatic switch comprising incoming terminals first and second wiper sets mounted for simultaneous selective primary and secondary motions, first and second groups of trunks respectively accessible to said first and second wiper sets, a digit signal relay controllable over said incoming terminals, means including said digit signal relay for imparting corresponding primary movement to said first and second wiper sets respectively to select said first and second groups of trunks, a register, means including said digit signal relay for registering a digit signal of first or second or third values in said register, means controlled by the registration of said digit signal of said first value in said register for finally selecting said first wiper set and controlled by the registration of said digit signal of said second value in said register for finally selecting said second wiper set and controlled by the registration of said digit signal of said third value in said register for preliminarily selecting both of said wiper sets, additional means jointly controlled by operation of said first and second wiper sets respectively to select said first and second groups of trunks and by the registration of said digit signal in said register for initiating secondary movement of said first and second wiper sets respectively and successively to select the individual trunks in said first and second groups, a tester, means controlled by said tester upon the selection by either one of said preliminarily selected wiper sets of an idle one of the trunks in the selected one of said groups for finally selecting said one wiper set, and additional means controlled by said tester upon the selection by said finally selected one wiper set of an idle one of the trunks in the selected one of said groups for arresting said secondary movement of said wiper sets and for completing a connection between said incoming terminals and said finally selected one wiper set.

34. An automatic switch comprising incoming terminals, first and second wiper sets mounted for simultaneous selective primary and secondary motions, first and second groups of trunks respectively accessible to said first and second wiper sets, a digit signal relay controllable over said incoming terminals, means including said digit signal relay for imparting corresponding primary movement to said first and second wiper sets respectively to select said first and second groups of trunks, a register, means including said digit signal relay for registering a digit signal of first or second or third values in said register, first and second test relays, means controlled by the registration of said digit signal of said first value in said register for connecting said first wiper set to said first test relay and controlled by the registration of said digit signal of said second value in said register for connecting said second wiper set to said first test relay and controlled by the registration of said digit signal of said third value in said register for respectively connecting said first and second wiper sets to said first and second test relays, additional means jointly controlled by operation of said first and second wiper sets respectively to select said first and second groups of trunks and by the registration of said digit signal in said register for initiating secondary movement of said first and second wiper sets respectively and successively to select the individual trunks in said first and second groups, said first test relay being operated upon the selection by the connected one of said wiper sets of an idle one of the trunks in the selected one of said groups, said second test relay being operated upon the selection by said connected second wiper set of an idle one of the trunks in said selected second group, and means controlled by operation of either one of said test relays and for arresting said secondary movement of said wiper sets and for completing a connection between said incoming terminals and the connected one of said wiper sets.

35. An automatic switch comprising incoming terminals, first and second wiper sets mounted for simultaneous selective primary and secondary motions, first and second groups of trunks respectively accessible to said first and second wiper sets, a digit signal relay controllable over said incoming terminals, means including said digit signal relay for imparting corresponding primary movement to said first and second wiper sets respectively to select said first and second groups of trunks, a register, means including said digit signal relay for registering a digit signal of first or second or third values in said register, first and second test relays, means controlled by the registration of said digit signal of said first value in said register for connecting said first wiper set to said first test relay and controlled by the registration of said digit signal of said second value in said register for connecting said second wiper set to said first test relay and controlled by the registration of said digit signal of said third value in said register for respectively connecting said first and second wiper sets to said first and second test relays, additional means jointly controlled by operation of said first and second wiper sets respectively to select said first and second groups of trunks and by the registration of said digit signal in said register for initiating secondary movement of said first and second wiper sets respectively and successively to select the individual trunks in said first and second groups, said first test relay being operated upon the selection by the connected one of said wiper sets of an idle one of the trunks in the selected one of said groups, said second test relay being operated upon the selection by said connected second wiper set of an idle one of the trunks in said selected second group, first and second switch-through relays, means controlled by operation of said first test relay for operating said first switch-through relay, means controlled by operation of said second test relay for operating said second switch-through relay, means controlled by operation of said first switch-through relay for disconnecting said second wiper set from said second test relay and controlled by operation of said second switch-through relay for disconnecting said first wiper set from said first test relay, means controlled by operation of either one of said test relays for arresting said secondary movement of said wiper sets, and means controlled by operation of said first switch-through relay for completing a connection between said incoming terminals and the one of said wiper sets connected to said first test relay and controlled by operation of said second switch-through relay for completing a connection between said incoming terminals and said second wiper set.

36. An automatic switch comprising incoming terminals, first and second wiper sets mounted for simultaneous selective primary and secondary motions, first and second groups of trunks respectively accessible to said first and second wiper sets, a register, a digit signal relay controllable over said incoming terminals, means controlled by a first operation of said digit signal relay for registering a digit signal of first or second values in said register, means controlled by the registration of said digit signal of said first value in said register for selecting said first wiper set and controlled by the registration of said digit signal of said second value in said register for selecting said second wiper set, means controlled by a second operation of said digit signal relay for imparting corresponding primary movement to said first and second wiper sets respectively to select said first and second groups of trunks, means controlled jointly by the registration of said digit signal in said register and to primary movement of said wiper sets for initiating secondary movement of said first and second wiper sets respectively and successively to select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming terminals and said selected one wiper set.

37. An automatic switch comprising incoming terminals, first and second wiper sets mounted for simultaneous selective primary and secondary motions, first and second groups of trunks respectively accessible to said first and second wiper sets, a register, a digit signal relay controllable over said incoming terminals, means controlled by a first operation of said digit signal relay for registering a digit signal of first or second or third or fourth values in said register, a signal source, means controlled by the registration of said digit signal of said first value in said register for selecting said first wiper set and controlled by the registration of said digit signal of said second value in said register for selecting both said first wiper set and said signal source and controlled by the registration of said digit signal of said third value in said register for selecting said second wiper set and controlled by the registration of said digit signal of said fourth value in said register for selecting both said second wiper set and said signal source, means controlled by a second operation of said digit signal relay for imparting corresponding primary movement to said first and second wiper sets respectively to select said first and second groups of trunks, means controlled jointly by the registration of said digit signal in said register and by primary movement of said wiper sets for initiating secondary movement of said first and second wiper sets respectively and successively to select the individual trunks in said first and second groups, a tester, and means controlled by said tester upon the selection by said selected one wiper set of an idle one of the trunks in the selected one of said groups for arresting said secondary movement of said wiper sets and for completing a connection between said incoming terminals and said selected one wiper set and for connecting said signal source in the event it is selected to said selected one wiper set.

38. In a telephone system, an automatic switch comprising incoming terminals, first and second wiper sets mounted for simultaneous selective primary and secondary movements, a first group of trunks accessible to said first wiper set, second and third groups of trunks respectively accessible to said first and second wiper sets, a digit signal relay controllable over said incoming terminals, means including said digit signal relay for imparting corresponding selective primary movement to said wiper sets to cause said first wiper set to select said first group of trunks or to cause said first and second wiper sets respectively to select said second and third groups of trunks, first means controlled by primary movement of said wiper sets to cause said first wiper set to select said first group of trunks for initiating secondary movement of said wiper sets so that said first wiper set successively selects the individual trunks in said first group, a register, means including said digit signal relay for registering a digit signal in said register, means normally selecting said first wiper set, additional means controlled by the registration of said digit signal of a predetermined value in said register for selecting said second wiper set, second means controlled jointly by primary movement of said first and second wiper sets respectively to select said second and third groups of trunks and by the registration of said digit signal in said register for initiating secondary movement of said wiper sets so that said first and second wiper sets successively select the individual trunks in said second and third groups respectively, a tester, and means controlled by said tester upon the selection by said selected wiper set of an idle trunk in the selected group for arresting said secondary movement of said wiper sets and for completing a connection between said incoming terminals and said selected wiper set.

39. In a telephone system, an automatic switch comprising incoming terminals, first and second wiper sets mounted for simultaneous selective primary and secondary movements, a first group of trunks accessible to said first wiper set, second and third groups of trunks respectively accessible to said first and second wiper sets, a digit signal relay controllable over said incoming terminals, means including said digit signal relay for imparting corresponding selective primary movement to said wiper sets to cause said first wiper set to select said first group of trunks or to cause said first and second wiper sets respectively to select said second and third groups of trunks, first means controlled by primary movement of said wiper sets to cause said first wiper set to select said first group of trunks for initiating secondary movement of said wiper sets so that said said first wiper set successively selects the individual trunks in said first group, a register, means including said digit signal relay for registering a digit signal in said register, switching contacts having a normal restored position selecting said first wiper set and an operated position selecting said second wiper set, means controlled by the registration of said digit signal of a predetermined value in said register for operating said switching contacts, second means controlled jointly by primary movement of said first and second wiper sets respectively to select said second and third groups of trunks and by the registration of said digit signal in said register for initiating secondary movement of said wiper sets so that said first and second wiper sets successively select the individual trunks in said second and third groups respectively, a tester, and means controlled by said tester upon the selection by said selected wiper set of an idle trunk in the selected group for arresting said secondary movement of said wiper sets and for completing a connection between said incoming terminals and said selected wiper set.

CLARENCE E. LOMAX.

References Cited in the file of this patent

UNITED STATES PATENTS

| Number | Name | Date |
|---|---|---|
| 1,268,072 | Martin | May 28, 1918 |
| 1,407,985 | Clausen | Feb. 22, 1922 |
| 1,886,613 | Wicks | Nov. 8, 1932 |
| 1,900,969 | Wright | Mar. 14, 1933 |
| 1,903,211 | Christian | Mar. 28, 1933 |
| 1,910,393 | Kahn | May 23, 1933 |